(12) United States Patent
Hashimoto et al.

(10) Patent No.: US 6,564,445 B1
(45) Date of Patent: May 20, 2003

(54) MAGNETIC HEAD MANUFACTURING METHOD

(75) Inventors: Susumu Hashimoto, Ebina (JP); Michiko Hara, Yokohama (JP); Tomohiko Nagata, Yokohama (JP); Kohichi Tateyama, Ichikawa (JP); Masatoshi Yoshikawa, Yokohama (JP); Takeo Sakakubo, Yokohama (JP); Hiroaki Yoda, Kawasaki (JP); Akio Hori, Kawasaki (JP); Takashi Koizumi, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/536,743

(22) Filed: Mar. 28, 2000

(30) Foreign Application Priority Data

Mar. 29, 1999 (JP) ............................................ 11-087089

(51) Int. Cl.⁷ .............................................. G11B 5/127
(52) U.S. Cl. .................................................. 29/603.14
(58) Field of Search .................... 209/603.13, 603.14, 209/603.15, 603.16, 603.8; 360/119, 122, 126, 120, 121

(56) References Cited

U.S. PATENT DOCUMENTS

| | | | |
|---|---|---|---|
| 4,947,541 A | * 8/1990 | Toyoda et al. | ............ 29/603.14 |
| 5,283,942 A | 2/1994 | Chen et al. | ................... 29/603 |
| 5,483,735 A | * 1/1996 | Postma et al. | ........... 29/603.16 |
| 5,633,771 A | 5/1997 | Yoda et al. | ................. 360/121 |
| 5,872,693 A | 2/1999 | Yoda et al. | ................. 360/126 |
| 6,108,167 A | 8/2000 | Tateyama et al. | ........... 360/126 |
| 6,115,216 A | 9/2000 | Yoda et al. | ................. 360/113 |
| 6,198,597 B1 | 3/2001 | Tateyama et al. | ........... 360/126 |
| 6,304,415 B1 | * 10/2001 | Tateyama et al. | ........... 360/126 |
| 6,305,072 B1 | * 10/2001 | Yoda et al. | ............. 29/603.14 |

OTHER PUBLICATIONS

H. Yoda et al., "Self–Alignment Trench–Pole Writer.", IEEE Transactions on Magnetics, vol. 35, No. 5, Sep. 1999, pp. 2535–2537.

* cited by examiner

Primary Examiner—Gregory Huson
Assistant Examiner—Huyen Le
(74) Attorney, Agent, or Firm—Foley & Lardner

(57) ABSTRACT

A method for manufacturing a magnetic head which includes a lower write pole having a projection, an upper write pole having a projection opposed to the projection of the lower write pole, and a magnetic gap interposed between the projection of the upper write pole and the projection of the upper write pole, comprising: a first step of making the magnetic gap on the projection of the lower write pole; a second step of making a non-magnetic material layer on the lower write pole, the non-magnetic material layer having a projection on its top surface in positional alignment with the projection of the lower write pole; a third step of making a mask layer on the non-magnetic material layer, the mask layer having an opening in which the top surface of the projection of the non-magnetic material layer is exposed; a fourth step of making a curved recess in the non-magnetic material layer by isotropically etching the non-magnetic material layer through the opening of the mask layer; a fifth step of making an approximately tapered recess down from the bottom of the curved recess by anisotropically etching the non-magnetic material layer through the opening of the mask layer; and a sixth step of making the upper write pole by burying a magnetic material in the tapered recess and the curved recess is provided.

13 Claims, 38 Drawing Sheets ns/MAGNETIC HEAD MANUFACTURING METHOD

BACKGROUND OF THE INVENTION

This invention relates to a magnetic head manufacturing method and a magnetic head used in a magnetic disc device.

The recording density upon recording information on magnetic recording media are under progress. For HDD (hard disc drive), a system having the recording density as high as 5 to 7 Gbit/inch$^2$ has actually been brought into practice for HDD (hard disc drive), and higher densities are still being demanded. An answer to this demand is to realize a magnetic head with "tracks" whose recording track width is not larger than 1 μm.

Also for thin-film magnetic head incorporating recording and reproducing functions, various structures have been proposed toward realization of narrow tracks.

For example, Japanese Patent Laid-Open Publication No. H10-214407 discloses a record/reproduce integral thin-film magnetic head having the structure shown in FIG. 42.

FIG. 42 is an elevational view which shows the medium facing surface of the record/reproduce integral thin-film magnetic head. Formed on a substrate (not shown) is a lower magnetic shield layer 1 made of a soft-magnetic material. Formed on the lower magnetic shield 1 is a magnetoresistance effect film (MR film) via a lower reproducing magnetic gap 2 made of a non-magnetic insulating material. A pair of leads 4 are connected to opposite ends of the MR film 3. These elements constitute a MR element portion 5. Formed on the MR element portion 5 is an upper reproducing gap 6 made of a non-magnetic insulating material. Further formed thereon is an upper magnetic shield layer 7 made of the same material as that of the lower magnetic shield layer 1. These elements constitutes a shield type MR head 8 which functions as a reproducing head.

On the reproducing head made up of the shield type MR head 8, a recording head made up of an inductive-type thin-film magnetic head 9. These elements constitutes a record/reproduce integral magnetic head 10.

The lower write pole of the inductive-type thin-film magnetic head 9 is composed of the soft-magnetic layer forming the upper magnetic shield layer 7 on the shield type MR head 8. That is, the upper magnetic shield layer 7 also functions as the lower write pole of the recording head. On the lower write pole 7 commonly used as the upper magnetic shield layer (hereinbelow simply called lower write pole), a write magnetic gap 12 made of a non-magnetic material is provided. The lower write pole 7 has a projection as a magnetic pole tip portion (gap facing portion) 11. The top surface of the projecting lower tip portion 11 for contact with the write magnetic gap 12 has the width corresponding to the record track width Tw. The write magnetic gap 12 is formed to extend along the contour of the lower write pole having the projecting lower write pole tip portion 11. A non-magnetic material layer 13 is formed to sandwich the lower write pole tip portion (projection) 11 including the write magnetic gap 12 from track width directions. The non-magnetic material layer 13 has a recess 14 positionally aligned with the projection 11. The recess 14 is buried with the magnetic material which constitutes the upper magnetic tip portion 16 of the upper write pole 15. The upper write pole tip portion 16 projects toward the write magnetic gap 12. On the back side (remoter from the viewer of FIG. 42) of the upper write pole 15 including the magnetic pole tip portion 16 buried in the recess 14, a coil (not shown) buried in an insulating layer is provided on the non-magnetic material layer 13. These components explained above make up the record/reproduce integral magnetic head 10.

In magnetic heads having this type of structure, the tip portion 11 of the lower write pole and the tip portion 16 of the upper write pole opposed to each other via the write magnetic gap 12 are equal in width. Therefore, it is free from the problem which occurs upon making narrower tracks in magnetic heads in which the upper write pole and the lower write pole are different in width, that it, the problem of offsets of record bit lines at edges due to a leak magnetic field from the record track side and reproduction writing.

In the record/reproduce integral magnetic head shown in FIG. 42, the top end of the lower magnetic head 7 is previously shaped to project, the non-magnetic material layer 13 is formed to have a recess above the projection, and a magnetic material is buried in the recess and used as the upper write pole 15.

Although various methods such as plating and collimation sputtering are considered usable for making the upper write pole 15 to bury the recess, plating is much more advantageous than others because of the low process cost and its actual results. However, in order to bury and make the upper write pole 15 without any empty spaces, it is necessary to previously provide a conductive layer in the recess, which is used as a plating electrode film.

For this purpose, it would be possible to use the method which makes the write magnetic gap 12 by a conductive material and buries in one recess the lower write pole tip portion 11, write magnetic gap 12 and upper write pole tip portion 16 altogether by plating. However, if a conductive film is used as the write magnetic gap 12, an overcurrent loss occurs, and the magnetic property of the magnetic head degrades.

Additionally, in the case where the width of the upper write pole tip portion 16 is narrower than the width of the top portion (supplemental magnetic pole 15B) of the upper write pole 15 as shown in FIG. 42, intensity of the magnetic field which leaks from corners E made by the upper write pole 15 on the side nearer to the magnetic gap is liable to increase, and causes the problem that, during writing of a signal into the recording medium, it is written to an adjacent track, or information on an adjacent track is erased.

On the other hand, when the upper write pole 15 shown in FIG. 42 is made, U.S. Pat. No. 5,283,942, among others, teaches first forming a layer mainly forming the upper write pole tip portion 16 and thereafter making the remainder layer mainly used as the supplemental magnetic pole 15B. In this case, the interface where the layer first made and the remainder layer connect (which lies in the level shown by the broken line A in FIG. 42) comes inside the upper write pole tip portion 16 or approximately lies on the boundary between the upper write pole tip portion 16 and the supplemental magnetic pole 15B.

However, along the interface between the layer previously made and the remainder layer, there often remain a deteriorated layer made on the surface of the previously stacked layer by oxidation and layers of non-magnetic material such as base layer required for making the remainder layer, although they are thin in thickness. Therefore, the interface between the previously stacked layer and the remainder layer results in lying on the boundary between the upper write pole tip portion 16 and the supplemental magnetic pole 15B, to which is the magnetic flux is concentrated more, and this portion behaves as a pseudo boundary and causes leakage of the magnetic flux and deterioration of the magnetic property thereby.

SUMMARY OF THE INVENTION

This invention has been made remarking these problems.

The first object of the invention is to provide a manufacturing method of a magnetic head, which is effective for manufacturing a record/reproduce integral magnetic head having a head structure suitable for narrower tracks and a higher line recording density, by previously shaping an upper portion of a lower recording magnetic pole to project from the other part so as to bury and form an upper write pole in a recess of a non-magnetic material layer formed above the projection in a self-alignment fashion, and ensures that the upper write pole be made with a good buried property and that the magnetic head be excellent in magnetic property as well.

The second object of the invention is to provide a manufacturing method of a magnetic head which can remove the problems such as undesirable writing into an adjacent track or undesirable erasure of information from an adjacent track during writing of a signal onto a recording medium, which were inevitable when narrowing only the tip of the upper write pole to meet the need for narrower tracks, by reducing the intensity of the magnetic field which leaks from corner portions on one side of an upper portion of the upper write pole (supplemental magnetic pole) nearer to a magnetic gap.

The third object of the invention is to provide a magnetic head capable of reducing the magnetic field which leaks from a pseudo magnetic gap appearing at boundaries of respective layers when the magnetic pole is formed in two or more divisional steps, and a manufacturing method of this magnetic head.

A method for manufacturing a magnetic head which includes a lower write pole having a projection, an upper write pole having a projection opposed to the projection of the lower write pole, and a magnetic gap interposed between the projection of the upper write pole and the projection of the upper write pole, comprising the steps of forming the magnetic gap on the projection of the lower write pole, forming a first non-magnetic material layer stacked on the lower write pole and having on its surface a first recess opposed to the projection of the lower write pole in positional alignment therewith, forming a tip portion of the projection of the upper write pole by burying a magnetic material in the first recess, forming a second non-magnetic material layer on the first non-magnetic material layer, the second non-magnetic material layer including a second recess opening wider than the first recess and having inner wall surfaces curved, and forming the other part of the upper write pole by burying a magnetic material in the second recess.

A method for manufacturing a magnetic head which includes a lower write pole having a projection, an upper write pole having a projection opposed to the projection of the lower write pole, and a magnetic gap interposed between the projection of the upper write pole and the projection of the upper write pole, comprising the steps of forming the magnetic gap on the projection of the lower write pole, forming a non-magnetic material layer on the lower write pole, the non-magnetic material layer having a projection on its top surface in positional alignment with the projection of the lower write pole, forming a mask layer on the non-magnetic material layer, the mask layer having an opening in which the top surface of the projection of the non-magnetic material layer is exposed, forming a first recess in the non-magnetic material layer by isotropically etching the non-magnetic material layer through the opening of the mask layer, forming a second recess down from the bottom of the curved recess by anisotropically etching the non-magnetic material layer through the opening of the mask layer, and forming the projection of the upper write pole by burying a magnetic material in the tapered recess and the curved recess.

A method for manufacturing a magnetic head which includes a lower write pole having a projection, an upper write pole having a projection opposed to the projection of the lower write pole, and a magnetic gap interposed between the projection of the upper write pole and the projection of the upper write pole, comprising the steps of forming the magnetic gap on the projection of the lower write pole, forming a first non-magnetic material layer stacked on the lower write pole and having on its top surface a first recess in positional alignment with the projection of the lower write pole, forming a plugging material different from the first non-magnetic material layer in the first recess, forming a second multi-layered structure on the first non-magnetic material layer, forming on the second non-magnetic material layer a mask layer having an opening in positional alignment with the projection of the lower write pole, forming a second recess by isotropically etching the second non-magnetic material layer through the opening of the mask layer until exposing the plugging material, removing the plugging material from the second recess, and forming the upper write pole by burying a magnetic material in the first recess and the second recess.

A method for manufacturing a magnetic head which includes a lower write pole having a projection, an upper write pole having a projection opposed to the projection of the lower write pole, and a magnetic gap interposed between the projection of the upper write pole and the projection of the upper write pole, comprising the steps of forming the magnetic gap on the projection of the lower write pole, forming a first non-magnetic material layer stacked on the lower write pole and having a first recess on its surface in positional alignment with the projection of the lower write pole, forming an umbrella-shaped mask which includes a foot portion buried in the first recess, a stem portion extending upward from the first non-magnetic material layer, and an overhang portion at a distance from the first non-magnetic material layer, forming a non-magnetic material to make of the first non-magnetic material layer a second non-magnetic material layer having a second recess formed under the overhang portion of the mask, removing the mask, and forming the projection of the upper write pole by burying a magnetic material in the first recess and the second recess.

A method for manufacturing a magnetic head which includes a lower write pole having a projection, an upper write pole having a projection opposed to the projection of the lower write pole, and a magnetic gap interposed between the projection of the upper write pole and the projection of the upper write pole, comprising the steps of forming the magnetic gap on the projection of the lower write pole, forming a first non-magnetic material layer stacked on the lower write pole and having a first recess on its surface in positional alignment with the projection of the lower write pole, forming a plugging material on the first non-magnetic material layer, inviting self-contraction of the plugging material to make a plugging body which has a foot portion buried in the first recess and a round portion spreading out above the foot portion, forming a non-magnetic material to make on the first non-magnetic material layer a second non-magnetic material layer having a second recess made under the liquid drop portion of the plugging body, removing the plugging body, and forming the projection of the upper write pole by burying a magnetic material in the recess of the multi-layered structure and the curved recess.

The present invention having the above-summarized structures has the following effects.

According to the invention, when a record/reproduce integral magnetic head is manufactured by previously shaping an upper part of a lower recording magnetic pole into a projection and making an upper write pole by burying it inside a non-magnetic-material layer stacked on the projection, it is possible to make out the upper write pole with a good buried property by plating and obtain a magnetic head excellent in magnetic property and realizing narrower tracks.

In addition, according to the invention, in the case where only the tip end of the upper write pole is narrowed to meet narrower tracks, it is possible to reduce the leakage of the magnetic intensity from corner portions nearer to the magnetic gap of the upper part of the upper write pole (supplemental magnetic pole portion) and remove the problems of undesirable writing onto an adjacent track or erasure of information from an adjacent track during writing of a signal onto a recording medium.

Furthermore, according to the invention, when the magnetic pole is made in two or more separate steps, it is possible to reduce the leakage of the magnetic field from pseudo gaps produced along boundaries of respective layers and thereby provide a magnetic head excellent in recording property.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DETAILED DESCRIPTION OF THE PREFERRED EMBODIMENTS

Explained below are embodiments of the invention.

Figure 1:
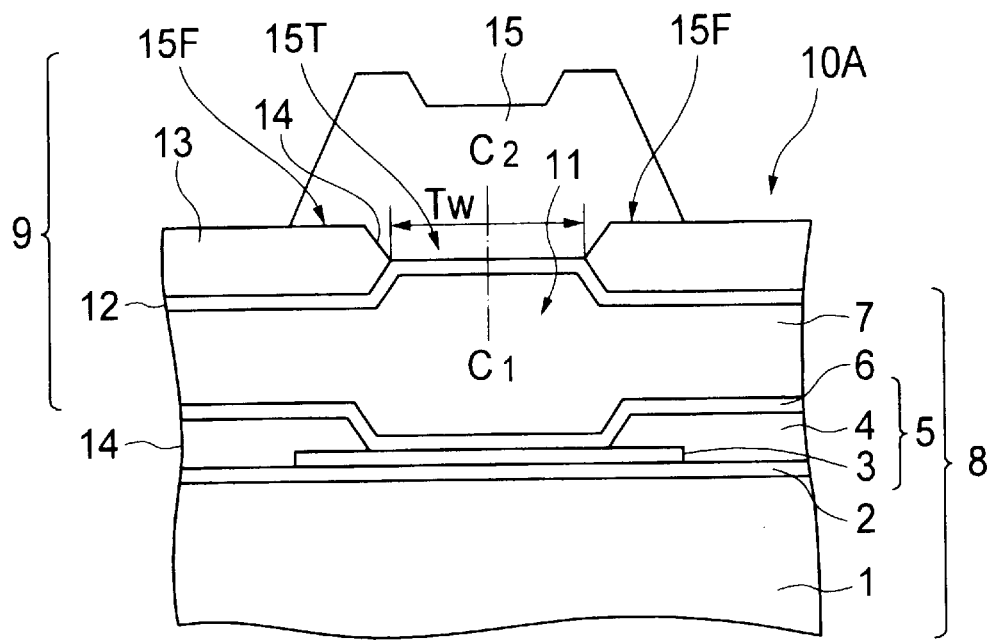
FIG. 1 is an elevational view of a record/reproduce integral magnetic head to be made by methods according to the first to fifth embodiments of the invention, which shows the medium facing surface thereof.
Figure 2:
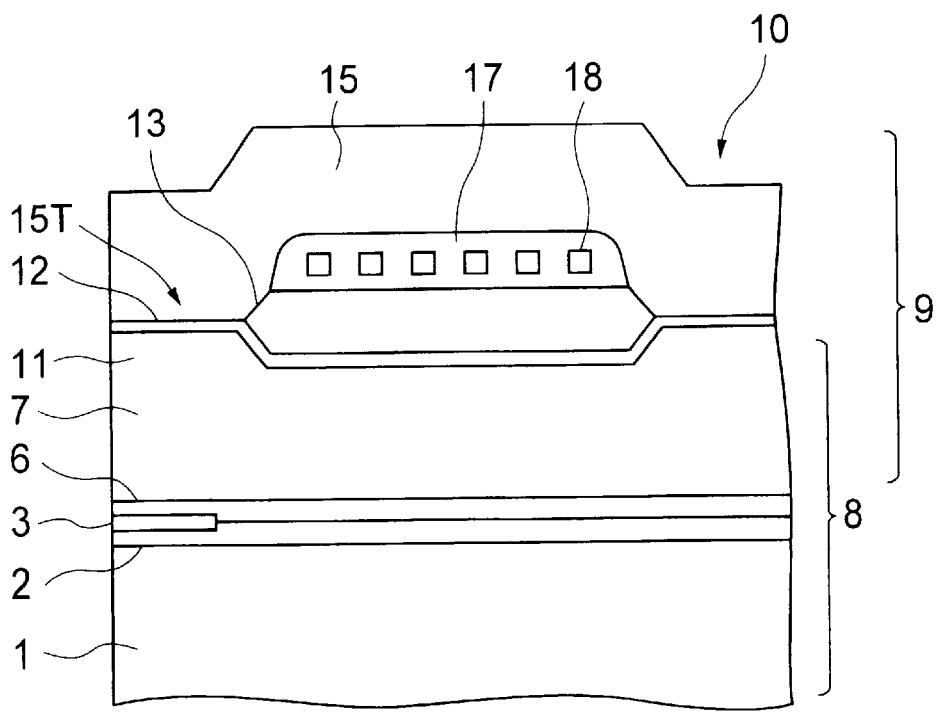
FIG. 2 is a vertical cross-sectional view of the record/reproduce integral magnetic head shown in FIG. 1, taken from the direction normal to the medium facing surface.

First referring to FIGS. 1 and 2, explanation is made on the structure of a magnetic head to be obtained by manufacturing methods according to the first to fifth embodiments of the invention.

FIG. 1 is an elevational view of a record/reproduce integral magnetic head 19A according to the first to fifth embodiments of the invention, which shows the medium facing surface thereof. FIG. 2 is a vertical cross-sectional view of the record/reproduce integral magnetic head shown in FIG. 1, taken from the direction normal to the medium facing surface. In this application, the term "record/reproduce integral head" pertains to a magnetic head including both a reproducing head having a magnetoresistance effect element portion, for example, and a recording head composed of an inductive type magnetic head which are integrally formed to stack vertically.

In FIGS. 1 and 2, numeral 1 denotes a lower magnetic shield layer formed on a $Al_2O_3 \cong TiC$ substrate (not shown), for example. The lower magnetic shield layer 1 is made of a crystalline soft-magnetic material such as NiFe alloy or FeAlSi alloy, or an amorphous soft-magnetic material such as CoZrNb alloy.

On the lower magnetic shield layer 1, a magnetoresistance effect film (MR film) 3 is formed via a lower reproducing magnetic gap 2 made of a non-magnetic insulating material such as $AlO_x$ (for example, $Al_2O_3$).

Usable as the MR film 3 is, for example, an anisotropic magnetoresistance effect film made of $Ni_{80}Fe_{20}$, for example, which varies in electric resistance depending upon the angle between the current direction and the magnetization moment of a magnetic layer, a spin valve film such as $Co_{90}Fe_{10}/Cu/Co_{90}Fe_{10}$ multi-layered film stacking magnetic films and non-magnetic film and exhibiting a so-called spin valve effect, i.e., the effect that the electric resistance varies with angles of magnetization of respective magnetic layers, or an artificial lattice film exhibiting a giant magnetoresistance effect).

At opposite ends of the MR film 3, leads 4 of Cu, or Au or Ta/Au/Ta for example, are formed. An MR element portion is composed of these elements. If necessary, the MR element portion 5 may include a hard magnetic bias film or anti-ferromagnetic bias film for applying a bias magnetic field to the MR film 3.

On the MR element portion 5, an upper reproducing magnetic gap 6 made of a non-magnetic insulating material such as $AlO_x$ is provided. Further provided thereon is an upper magnetic shield layer 7 made of a soft-magnetic material substantially the same as that of the lower magnetic shield layer 1. These elements constitutes a shield-type MR head 8 which functions as a reproducing head.

On the reproducing head composed of the shield-type MR head 8, an inductive type thin film magnetic head 9 is formed as the recording head. The record/reproduce integral magnetic head 10A is made up of these elements.

The lower write pole of the inductive-type thin-film magnetic head 9 is composed of the soft-magnetic layer forming the upper magnetic shield layer 7 on the shield type MR head 8. That is, the upper magnetic shield layer 7 also makes up the lower write pole of the recording head.

On the lower write pole 7 commonly used as the upper magnetic shield layer (hereinbelow simply called lower write pole), a write magnetic gap 12 made of a non-magnetic material such as $AlO_x$, Si or $SiN_x$ is provided.

The lower write pole 7 has a projection as a magnetic pole tip portion (gap facing portion) 11. The top surface of the projecting lower tip portion 11 for contact with the write magnetic gap 12 has the width corresponding to the record track width Tw. The lower write pole tip portion 11 is so-configured that, in its aspect appearing on the medium facing surface, its width converges toward the write magnetic gap 12. That is, the lower write pole tip portion 11 projects and converges its width toward the write magnetic gap 12.

The write magnetic gap 12 is formed to extend along the contour of the lower write pole having the projecting lower write pole tip portion 11. The write magnetic gap 12 may be made only on the lower write pole tip portion 11. On the write magnetic gap 12, a non-magnetic material layer 13 of a non-magnetic insulating material different from that of the write magnetic gap, such as $SiO_x$, is formed to sandwich the lower write pole tip portion (projection) 11 including the write magnetic gap 12 from track width directions.

The non-magnetic material layer 13 has a recess 14 positionally aligned with the projection 11. The recess 14 is so configured that its width appearing on the medium facing surface converges toward the write magnetic gap 12. The recess 14 in positional alignment with the projecting upper write pole tip portion 11 is buried with the magnetic material which constitutes the upper magnetic tip portion (gap facing portion) 16 of the upper write pole 15. The same material as that of the lower magnetic shield layer 1 is used as the material of the upper write pole 15.

The upper write pole tip portion 16 buried and formed in the recess 14 is tapered to project and converge its width toward the write magnetic gap, following the contour of the recess 14. That is, the lower write pole tip portion 11 and the upper magnetic tip portion 16 are so configured that their projections abut, interposing the write magnetic gap 12 between them, and both converge toward the write magnetic gap 12. Further, since the projection 11 and the recess 14 are in positional alignment, the lower write pole tip portion 11 and the upper write pole tip portion 16 are made in positional alignment with a high accuracy so that their centers C1 and C2 be aligned via the write magnetic gap 12. Additionally, these magnetic pole tip portions 11 and 16 are substantially equal in width of the surfaces in contact with the write magnetic gap 12.

On the back side of the upper write pole 15 including the magnetic pole tip portion 16 buried in the recess 14, a coil 18 buried in an insulating layer 17 of polyimide, for example, is provided on the non-magnetic material layer 13 as shown in FIG. 2. The coil 18 is made of Cu (copper), for example.

The record/reproduce integral magnetic head 10A is made up of these components explained above.

(First Embodiment)

Explained below is a method for manufacturing the record/reproduce integral magnetic head, according to the first embodiment.

First made on a substrate is the shield type MR head. This shield type MR head is made by a typical manufacturing process of a shield type MR head.

After that, the recording head, which is the inductive type thin film magnetic head, is made on the shield type MR head as the reproducing head. The process for manufacturing the inductive type thin film magnetic head is explained with reference to FIGS. 3A through 3E.

FIGS. 3A through 3E are rough diagrams showing a manufacturing process of an inductive type thin film magnetic head made on the shield type MR head as the reproducing head, according to the first embodiment of the invention. A part of the structure of the shield type MR head is omitted from illustration of FIGS. 3A through 3E.

Figure 3A:
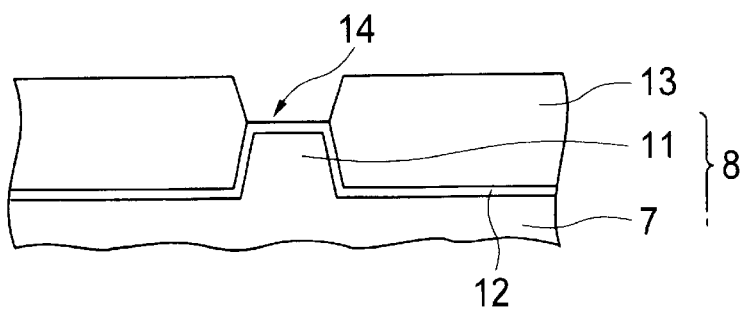
FIGS. 3A through 3E are rough diagrams showing a manufacturing process of an inductive type thin film magnetic head made on a reproducing head, according to the first embodiment.

First as shown in FIG. 3A, in the shield type MR head 8, the write magnetic gap 12 is formed by sputtering, for example, on the lower write pole (upper magnetic shield layer) 7 having the projecting lower write pole tip portion 11, and the non-magnetic material layer 13 having the recess 14 in positional alignment with the projection of the lower write pole 7 is formed. In this status, the write magnetic gap 12 is exposed to the bottom surface of the recess.

Figure 3B:
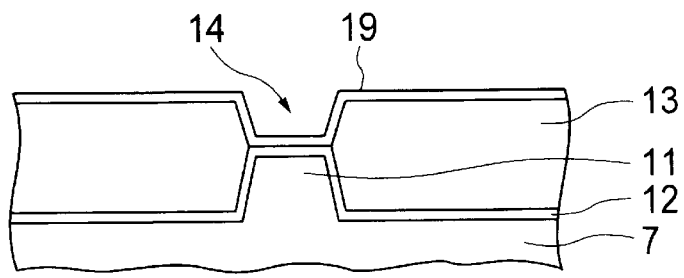

Next as shown in FIG. 3B, a conductive film 19 is formed by sputtering or other method on the surface of the non-magnetic material layer 13 and the exposed write magnetic gap 12. To ensure that the conductive film 19 uniformly grows also on the bottom surface and side walls of the recess 14, a method ensuring a good step coverage, such as sputtering or bias sputtering, is preferably used.

Figure 3C:
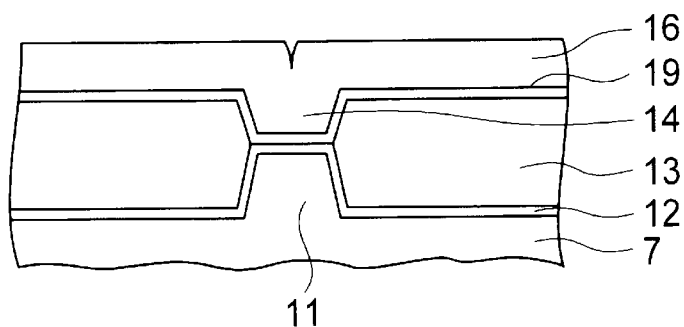

Next as shown in FIG. 3C, an upper write pole material layer, i.e. a soft-magnetic layer (upper write pole tip portion) 16 is grown by plating, by using the conductive film 19 as a plating electrode film for plating.

Figure 3D:
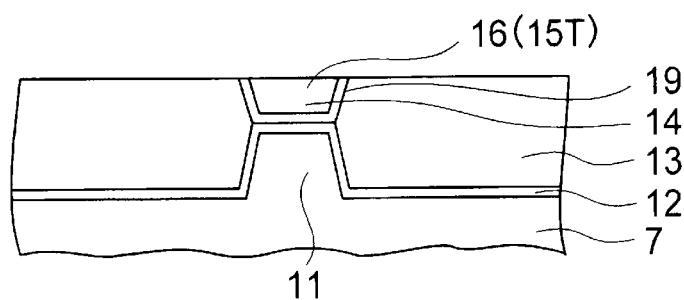

After that, as shown in FIG. 3D, the soft-magnetic material layer and the conductive film are removed while maintaining, however, the soft materiel layer (upper write pole tip portion) 16 buried inside the recess 14, by CMP (chemical mechanical polishing) or etch-back method, for example, so that the non-magnetic material layer and the upper write pole material layer be substantially flush.

Figure 3E:
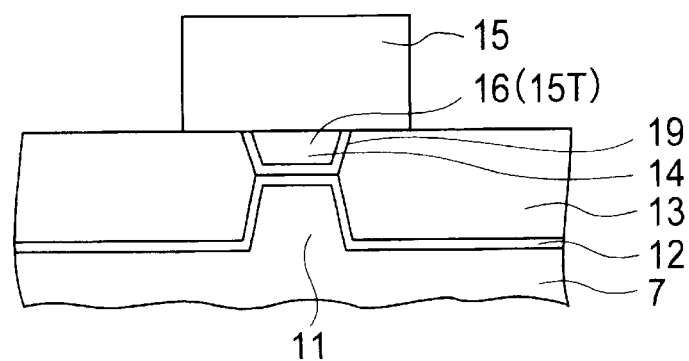

Subsequently, the coil, insulating film burying the coil, etc. are made, and as shown in FIG. 3E, the upper part of the upper write pole 15 is made.

According to the first embodiment, since the plating electrode film is formed for making the upper write pole, and then plating is conducted, there is no need for the use of a conductive material for making the write magnetic gap, and the magnetic property of the magnetic head is not damaged.

Additionally, according to this embodiment, the plating electrode film, which is a conductive layer, can be made over the entire surface of the non-magnetic material layer and the exposed write magnetic gap, and undesired part thereof can be removed later. Therefore, in case of fabricating a plurality of magnetic heads in a wafer, it is possible to use a method used zap to make a wide-area plating electrode film all over the wafer when burying the upper write pole tip portion by plating. As a result, because of the effects shown below, the method is excellent in mass productivity.

That is, 1. even when a plurality of magnetic head are made in a wafer, upper write pole tip portions can be made without fluctuation in film thickness and composition;
2. since the plating electrode film lies as the outer-most layer when plating is conducted, it can be readily taken out as the electrode; and
3. since undesired part of the plating electrode film is removed later, it is not necessary to locate the pattern of the plating electrode film in the wafer separately from the head pattern, and so, the number of heads made out from a single wafer does not decrease.

(Second Embodiment)

Next explained is a manufacturing process of a record/reproduce integral magnetic head, according to the second embodiment of the invention.

First made on the shield type MR head on the substrate as already explained with reference to the first embodiment.

After that, the inductive type thin film magnetic head as the recording head is made on the shield type MR head as the reproducing head. A manufacturing process of this inductive type thin film magnetic head is explained below with reference to FIGS. 4A through 4D.

FIGS. 4A through 4D are rough diagrams showing a manufacturing process of an inductive type thin film magnetic head formed on a reproducing head, according to the second embodiment of the invention. Part of the structure of the shield type MR head is omitted from illustration of FIGS. 4A through 4D.

Figure 4A:
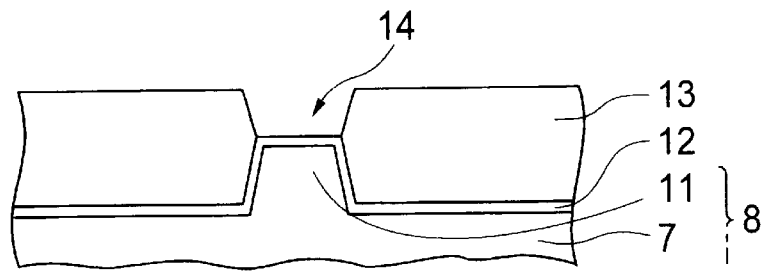
FIGS. 4A through 4D are rough diagrams showing a manufacturing process of an inductive type thin film magnetic head formed on a reproducing head, according to the second embodiment.

First as shown in FIG. 4A, in the shield type MR head 8, the write magnetic gap 12 is formed by sputtering, for example, on the lower write pole (upper magnetic shield layer) 7 having the projecting lower write pole tip portion 11, and the non-magnetic material layer 13 having the recess 14 in positional alignment with the projection of the lower write pole 7 is formed. In this status, the write magnetic gap 12 is exposed to the bottom surface of the recess. Thereafter, the coil, insulating film burying the coil, etc. are made (omitted from illustration).

Figure 4B:
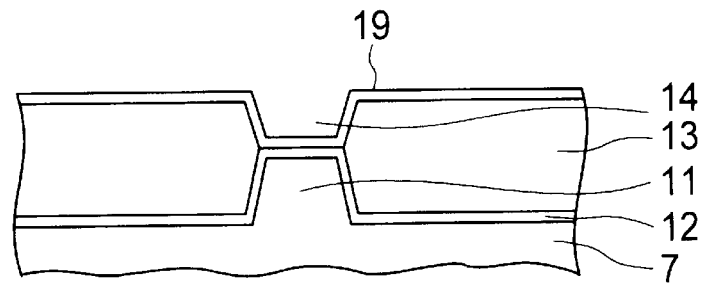

Next as shown in FIG. 4B, a conductive film 19 is formed by sputtering or other method on the surface of the non-magnetic material layer 13 and the exposed write magnetic gap 12. To ensure that the conductive film 19 uniformly grows also on the bottom surface and side walls of the recess 14, a method ensuring a good step coverage, such as sputtering or bias sputtering, is preferably used.

Figure 4C:
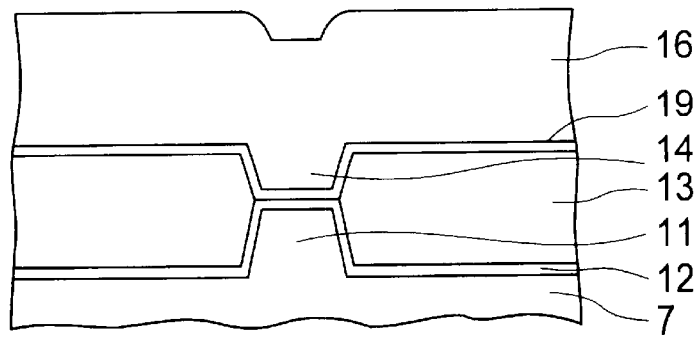

Next as shown in FIG. 4C, an upper write pole material layer, i.e. a soft-magnetic layer (upper write pole tip portion) 16 is grown by plating, by using the conductive film 19 as a plating electrode film for plating.

Figure 4D:
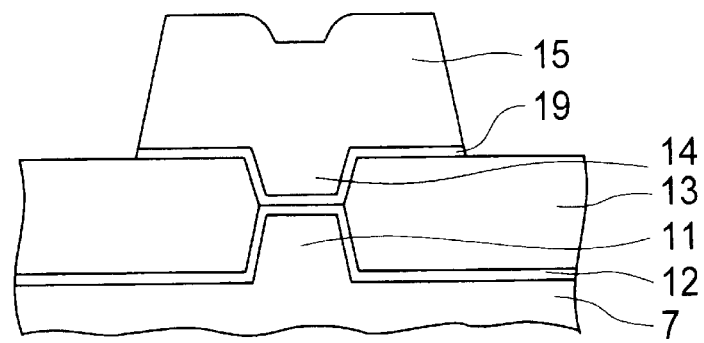

After that, as shown in FIG. 4D, the soft-magnetic material layer and the conductive film are removed by CMP (chemical-mechanical polishing) or etch-back method, for example, to form the upper write pole 15 having a predetermined configuration.

According to the second embodiment, since the plating electrode film is formed for making the upper write pole, and then plating is conducted, there is no need for using a conductive material to make the write magnetic gap, and the magnetic property of the magnetic head is not damaged.

Additionally, according to this embodiment, the plating electrode film, which is a conductive layer, can be made over the entire surface of the non-magnetic material layer, and undesired part thereof can be removed later. Therefore, in case of fabricating a plurality of magnetic heads in a wafer, it is possible to use a method used to make a wide-area plating electrode film all over the wafer when burying the upper write pole tip portion by plating. As a result, because of the effects shown below, the method according to the second embodiment is excellent in mass productivity.

That is,
1. even when a plurality of magnetic head are made in a wafer, the upper write pole tip portion can be made without fluctuation in film thickness and composition;
2. since the plating electrode film lies as the outer-most layer when plating is conducted, it can be readily taken out as the electrode; and
3. since undesired part of the plating electrode film is removed later, it is not necessary to locate the pattern of the plating electrode film in the wafer separately from the head pattern, and so, the number of heads made out from a single wafer does not decrease.

Furthermore, since the upper write pole can be made without dividing into two parts, namely, the tip portion and the upper portion, the manufacturing steps can be reduced, and the process cost can be decreased.

(Third Embodiment)

Next explained is a manufacturing process of a record/reproduce integral magnetic head, according to the third embodiment of the invention.

First made on the shield type MR head on the substrate as already explained with reference to the first embodiment.

After that, the inductive type thin film magnetic head as the recording head is made on the shield type MR head as the reproducing head. A manufacturing process of this inductive type thin film magnetic head is explained below with reference to FIGS. 5A through 5D.

FIGS. 5A through 5D are rough diagrams showing a manufacturing process of an inductive type thin film magnetic head formed on a reproducing head, according to the third embodiment of the invention. Part of the structure of the shield type MR head is omitted from illustration of FIGS. 5A through 5D.

Figure 5A:
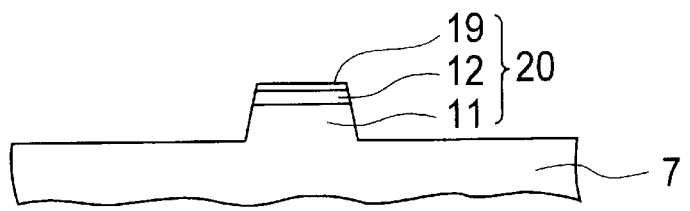
FIGS. 5A through 5D are rough diagrams showing a manufacturing process of an inductive type thin film magnetic head formed on a reproducing head, according to the third embodiment.

First as shown in FIG. 5A, in the shield type MR head, formed on the lower write pole 7 is a projection 20 in which the write magnetic gap 12 and the conductive layer 19 are stacked on the lower write pole tip portion 11. In this case, after stacking, from the bottom, the lower magnetic layer, the layer to be used as the write magnetic gap and the outermost conductive layer, they are shaped into the form of the projection 20.

Figure 5B:
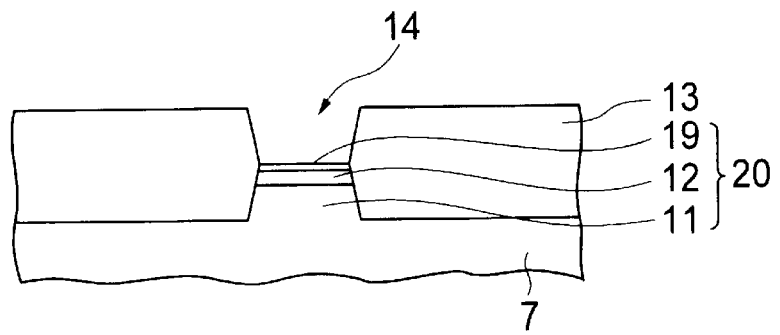

Next as shown in FIG. 5B, the non-magnetic material layer 13 having the recess 14 in positional alignment with the projection 20 is formed on the lower write pole 7. In this case, the conductive layer 19 is exposed on the bottom surface of the recess 14.

Figure 5C:
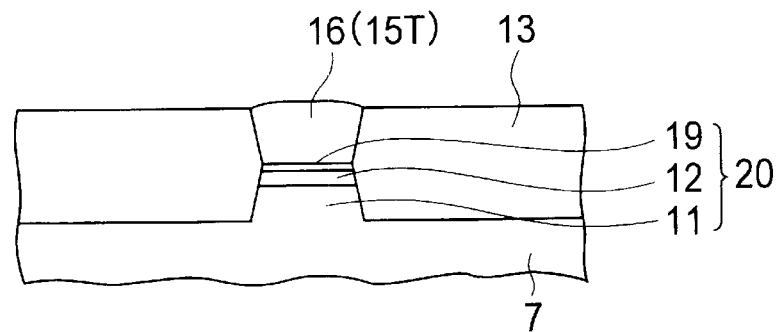

Next as shown in FIG. 5C, using the conductive layer 19 as a plating electrode film, the soft-magnetic layer (upper write pole tip portion) 16 is formed to fill the recess 14 by plating.

Figure 5D:
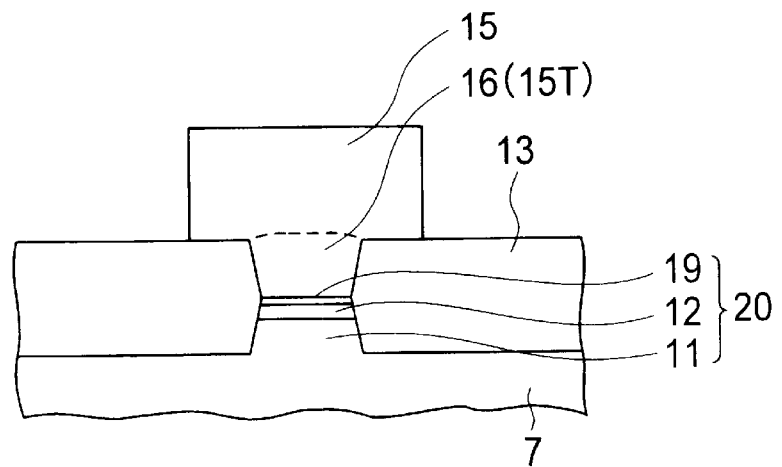

Then, as shown in FIG. 5D, the coil, an insulating film burying the coil, etc. are formed (not shown), and the upper part of the upper write pole 15 is made.

As explained above, according to the third embodiment, there is no need for using a conductive material to make the write magnetic gap, and the magnetic property of the magnetic head is not damaged.

Additionally, when the upper write pole tip portion is made by plating, since it grows in parallel with the plating electrode film on the bottom surface of the recess, a uniform density profile of the material in the recess without voids is ensured. Additionally, also when the use of two materials is desired to make the upper write pole tip portion in the recess, it is possible to make it up of two layers substantially parallel to the recording gap.

(Fourth Embodiment)

Next explained is a manufacturing process of a record/reproduce integral magnetic head, according to the fourth embodiment of the invention.

First made on the substrate is the shield type MR head as already explained with reference to the first embodiment. After that, the inductive type thin film magnetic head as the recording head is made on the shield type MR head as the reproducing head. A manufacturing process of this inductive type thin film magnetic head is explained below with reference to FIGS. 13A through 16C.

FIGS. 13A to 13D, 14A, 14B, 15A to 15D, and 16A to 16C are rough diagrams showing a manufacturing process of an inductive type thin film magnetic head formed on a reproducing head, according to the fourth embodiment of the invention. Part of the structure of the shield type MR head is omitted from illustration of these figures.

Figure 13A:
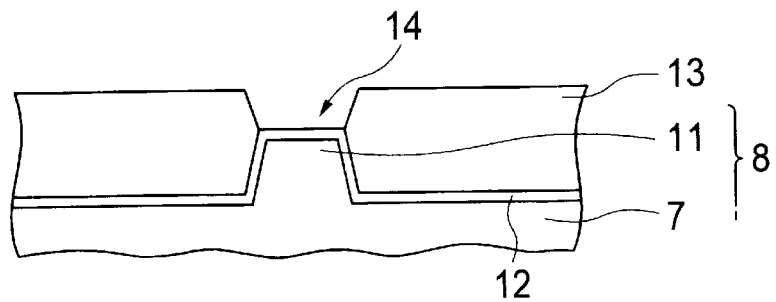
FIGS. 13A through 13D are rough diagrams showing a manufacturing method of an inductive type thin film magnetic head formed on a reproducing head, according to the fourth embodiment of the invention.

First as shown in FIG. 13A, in the shield type MR head 8, the write magnetic gap 12 is formed by sputtering, for example, on the lower write pole (upper magnetic shield layer) 7 having the projecting lower write pole tip portion 11, and the non-magnetic material layer 13 having the recess 14 in positional alignment with the projection of the lower write pole 7 is formed. In this status, the write magnetic gap 12 is exposed to the bottom surface of the recess.

Figure 13B:
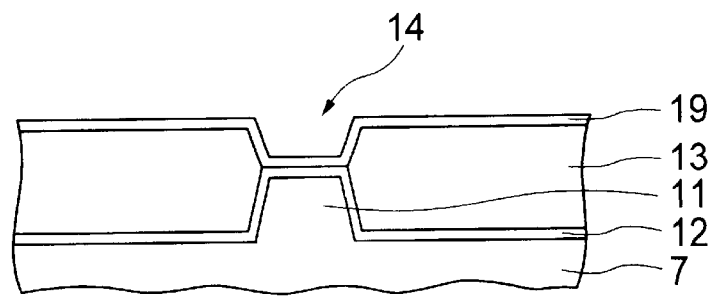

Next as shown in FIG. 13B, a conductive film 19 is formed by sputtering or other method on the surface of the non-magnetic material layer 13 and the exposed write magnetic gap 12. To ensure that the conductive film 19 uniformly grows also on the bottom surface and side walls of the recess 14, a method ensuring a good step coverage, such as sputtering or bias sputtering, is preferably used.

Figure 13C:
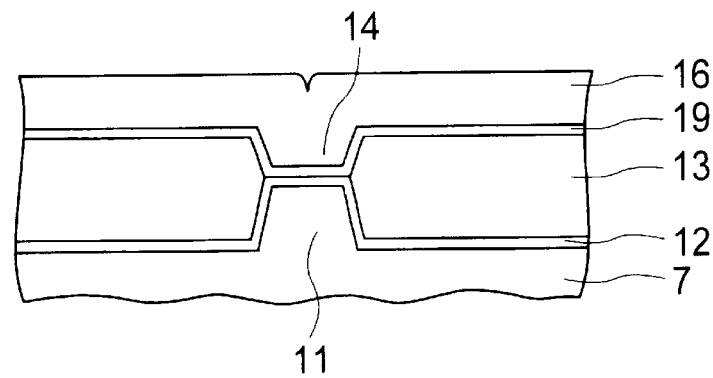

Next as shown in FIG. 13C, an upper write pole material layer, i.e. a soft-magnetic layer (upper write pole tip portion) 16 is grown by plating, by using the conductive film 19 as a plating electrode film for plating.

Figure 13D:
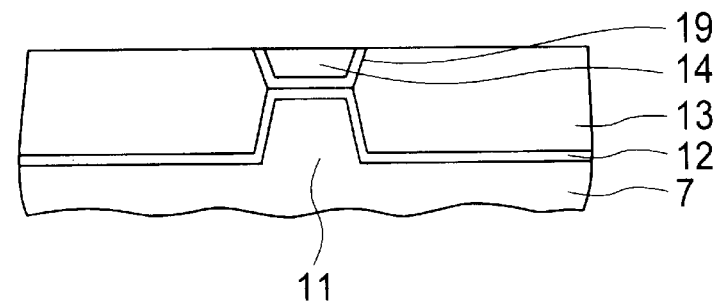

After that, as shown in FIG. 13D, the soft-magnetic material layer and the conductive film are removed by CMP (chemical mechanical polishing) or etch-back method, for example, so that the non-magnetic material layer and the upper write pole material layer be substantially flush.

Through these steps, upper surfaces of the upper write pole tip portion 16 and the non-magnetic layer 13 are made flat and flush. Subsequently, the coil, insulating film burying the coil, etc. are made.

Figure 14A:
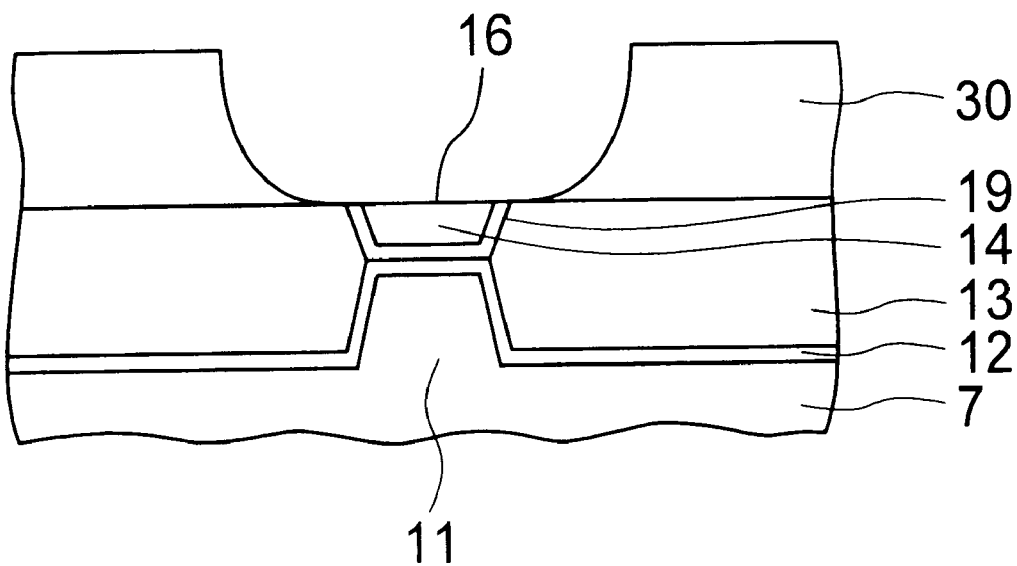
FIGS. 14A and 14B are rough diagrams showing a manufacturing process for making an inductive type thin film magnetic head on a reproducing head, according to the fourth embodiment.

Further, as shown in FIG. 14A, a second non-magnetic layer 30 having a second recess shaped to curve at least on a part of its side surfaces is made on the flushed upper write pole tip portion 16 and non-magnetic layer 13.

Figure 14B:
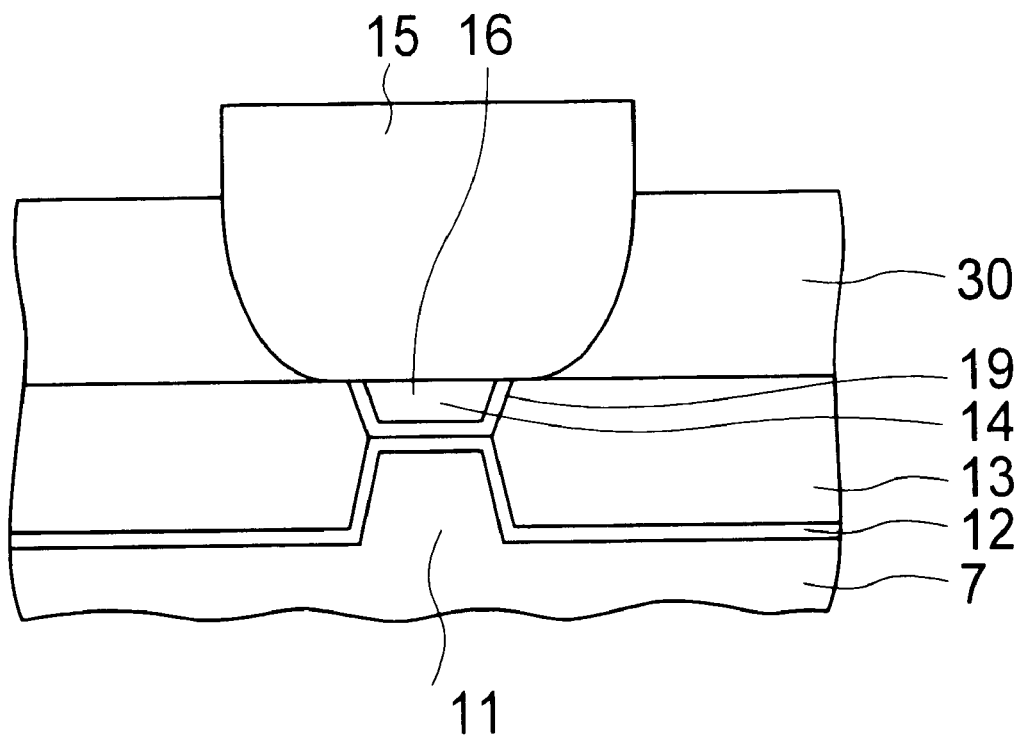

After that, as shown in FIG. 14B, a remainder part of the upper write pole 15 is buried in the second recess.

As explained above, according to the fourth embodiment, the upper write pole 16 can be shaped round by rounding corners on the side toward the magnetic gap on the medium facing surface.

As a result, leakage of the magnetic field intensity from the corners of the upper part of the upper write pole 15 (supplemental magnetic pole portion) nearer to the magnetic gap can be reduced, and it is possible to remove problems such as writing onto an adjacent track or erasure of information from an adjacent track during writing of a signal onto the recording medium.

In the fourth embodiment, the following method is usable to form the second non-magnetic layer 30 having the second recess and the remainder part of the upper write pole 15.

First, the steps shown in FIGS. 13A through 13D are carried out as already explained. In this stage, upper surfaces of the upper write pole tip portion 16 and the non-magnetic layer 13 are flat and substantially flush. Subsequently, the coil, the insulating layer burying the coil, etc. are made.

Figure 15A:
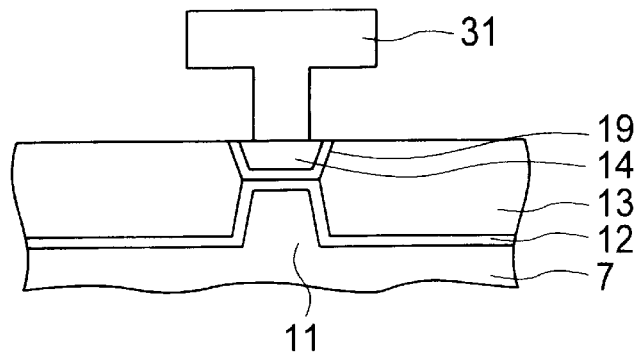
FIGS. 15A through 15D are rough diagrams showing a manufacturing process for making an inductive type thin film magnetic head on a reproducing head, according to the fourth embodiment.

Next as shown in FIG. 15A, a resist layer 31 is formed and patterned on the flush upper write pole tip portion 16 and non-magnetic layer 13. In this case, the resist layer 31 is approximately T-shaped in its cross-sectional configuration. This configuration can be made by surface treatment of the resist after being coated, or by piling the resist in two layers.

Figure 15B:
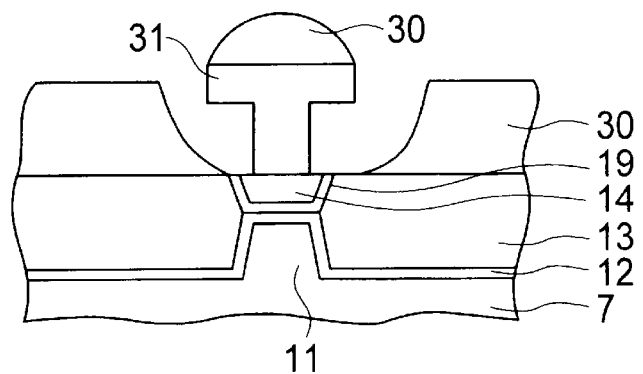
Figure 15C:
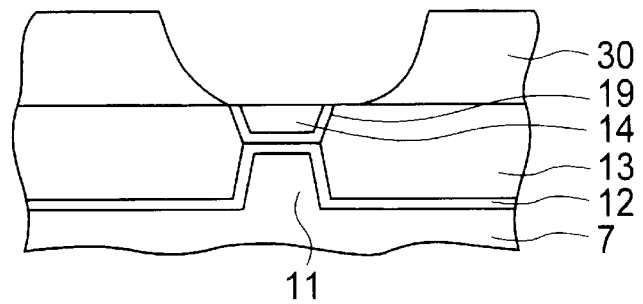
Figure 15D:
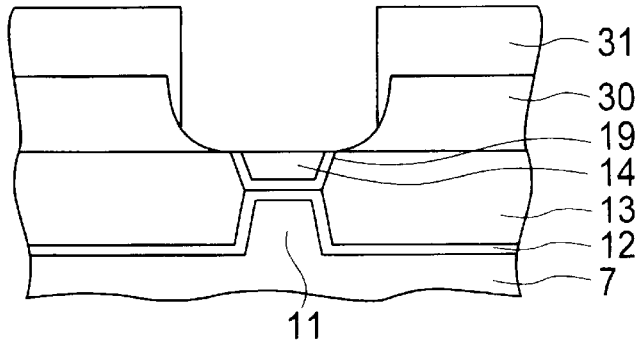

As shown in FIG. 15B, the non-magnetic material layer 30 is stacked on the resist layer 31 and the non-magnetic layer 13 by sputtering, for example. Thereby, the recess of non-magnetic material having a rounded slope with the resist layer 31 shaped like an umbrella thereabove can be made.

Thereafter, when the resist layer 31 is removed together with the non-magnetic material layer 30 thereon, the remainder part of the non-magnetic material layer results in having the second recess whose side surfaces are partly curved.

Further formed on the second non-magnetic layer 30 is a resist layer as a frame 31. On this frame 31, an upper write pole can be made by plating or other process.

In this manner, the non-magnetic layer having the second recess can be obtained by lift-off.

Next explained is another method for making the second non-magnetic layer 30 having the second recess and the remainder portion of the upper write pole 15.

First, the steps shown in FIGS. 13A through 13D are carried out as already explained. In this status, upper surfaces of the upper write pole tip portion 16 and the non-magnetic layer 13 are flat and substantially flush. Subsequently, the coil, the insulating layer burying the coil, etc. are made.

Figure 16A:
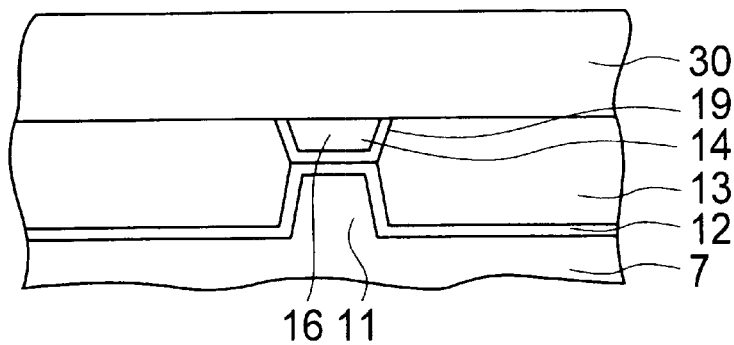
FIGS. 16A through 16C are rough diagrams showing a manufacturing process for making an inductive type thin film magnetic head on a reproducing head, according to the fourth embodiment.

Next as shown in FIG. 16A, the second non-magnetic layer 30 is formed on the flushed upper write pole tip portion 16 and non-magnetic layer 13 by sputtering or other process.

Figure 16B:
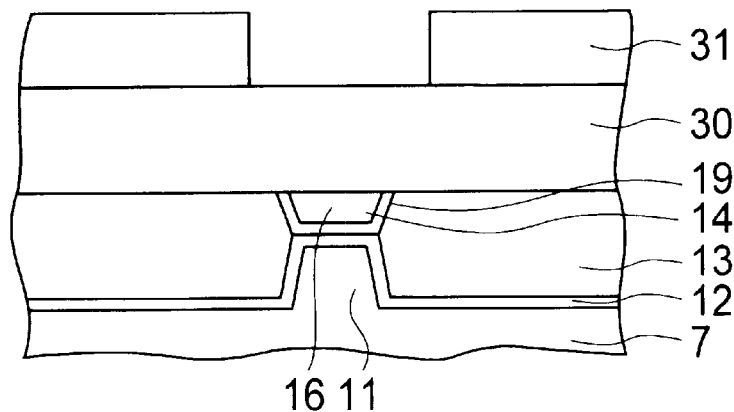

Next as shown in FIG. 16B, the resist layer 31 is formed, and patterned through exposure and development.

Figure 16C:
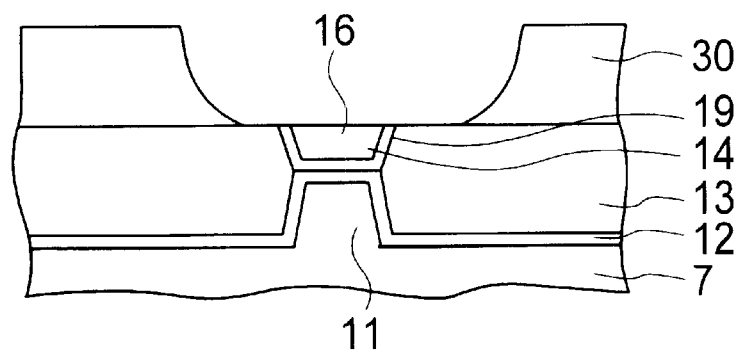

As shown in FIG. 16C, next using CDE (chemical dry etching), RIE (reactive ion etching), ion milling, chemical etching, or the like, the second non-magnetic layer 30 is selectively removed to make a recess having a rounded slope. In this manner, the non-magnetic layer having the second recess can be obtained by etching.

Further formed on the second non-magnetic layer 30 is a resist layer as a frame (not shown) to define the outer shape of the upper write pole. Within this frame, an upper write pole can be made by plating or other process.

(Fifth Embodiment)

Next explained is a manufacturing process of a record/reproduce integral magnetic head, according to the fifth embodiment of the invention.

First made on the substrate is the shield type MR head as already explained with reference to the first embodiment. After that, the inductive type thin film magnetic head as the recording head is made on the shield type MR head as the reproducing head. A manufacturing process of this inductive type thin film magnetic head is explained below with reference to FIGS. 17A through 18B.

FIGS. 17A, 17B, 18A and 18B are rough diagrams showing a manufacturing process for making an inductive type thin film magnetic head on a reproducing head, according to the fifth embodiment of the invention. Part of the structure of the shield type MR head is omitted from illustration of these figures.

Figure 17A:
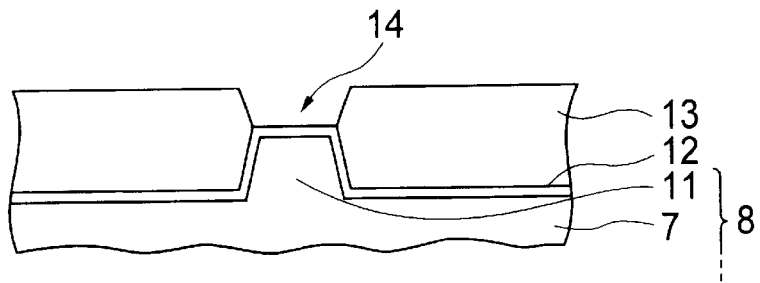
FIGS. 17A and 17B are rough diagrams showing a manufacturing process for making an inductive type thin film magnetic head on a reproducing head, according to the fifth embodiment.

First as shown in FIG. 17A, in the shield type MR head 8, the write magnetic gap 12 is formed by sputtering, for example, on the lower write pole (upper magnetic shield layer) 7 having the projecting lower write pole tip portion 11, and the non-magnetic material layer 13 having the recess 14 in positional alignment with the projection of the lower write pole 7 is formed. In this status, the write magnetic gap 12 is exposed to the bottom surface of the recess.

Figure 17B:
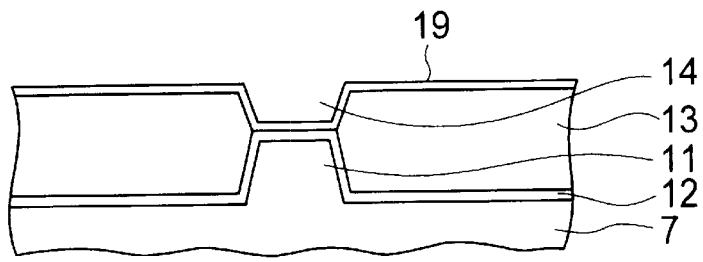

Next as shown in FIG. 17B, a conductive film 19 is formed by sputtering or other method on the surface of the non-magnetic material layer 13 and the exposed write magnetic gap 12. To ensure that the conductive film 19 uniformly grows also on the bottom surface and side walls of the recess 14, a method ensuring a good step coverage, such as sputtering or bias sputtering, is preferably used. Subsequently, the coil, insulating film burying the coil, etc. are made.

Figure 18A:
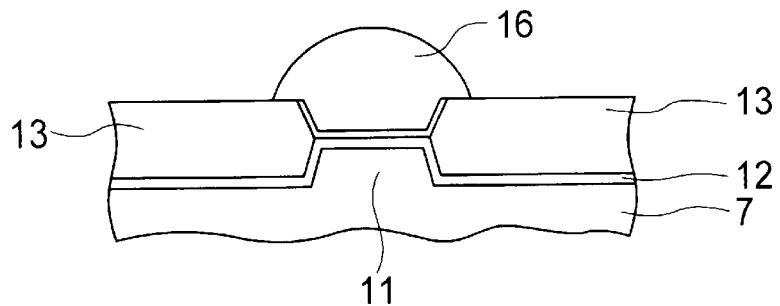
FIGS. 18A and 18B are rough diagrams showing a manufacturing process for making an inductive type thin film magnetic head on a reproducing head, according to the fifth embodiment.
Figure 18B:
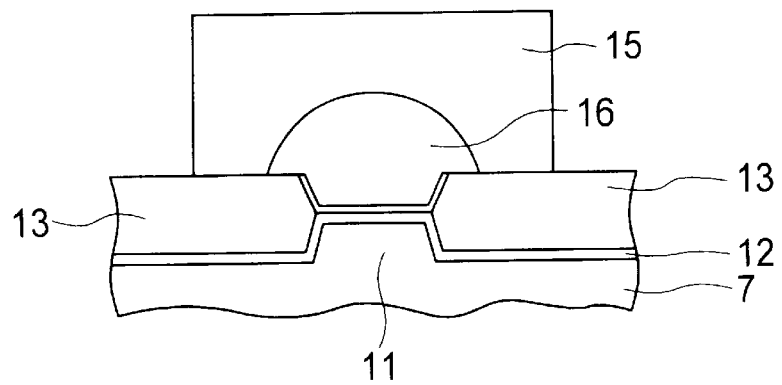

Further, as shown in FIG. 18A, the soft-magnetic layer 16 is formed near the tip portion so as to overflow from the recess 14, and the remainder portion of the upper write pole 15 is made as shown in FIG. 18B.

As explained above, according to the fifth embodiment, when the upper write pole to be separately formed is made in two or more steps, the boundary portion of the magnetic pole separately formed can be brought outside of the recess. As a result, the pseudo gap can be shifted to the portion with less concentration of the magnetic flux, and the cross-sectional area of the boundary region can be increased. Therefore, the magnetic resistance decreases, and the leak magnetic field from the pseudo gap can be reduced. Thus, the embodiment can realize a magnetic head excellent in recording property.

Heretofore explained were the first to fifth embodiments of the invention.

Next explained are the sixth to twelfth embodiments of the invention.

Figure 19:
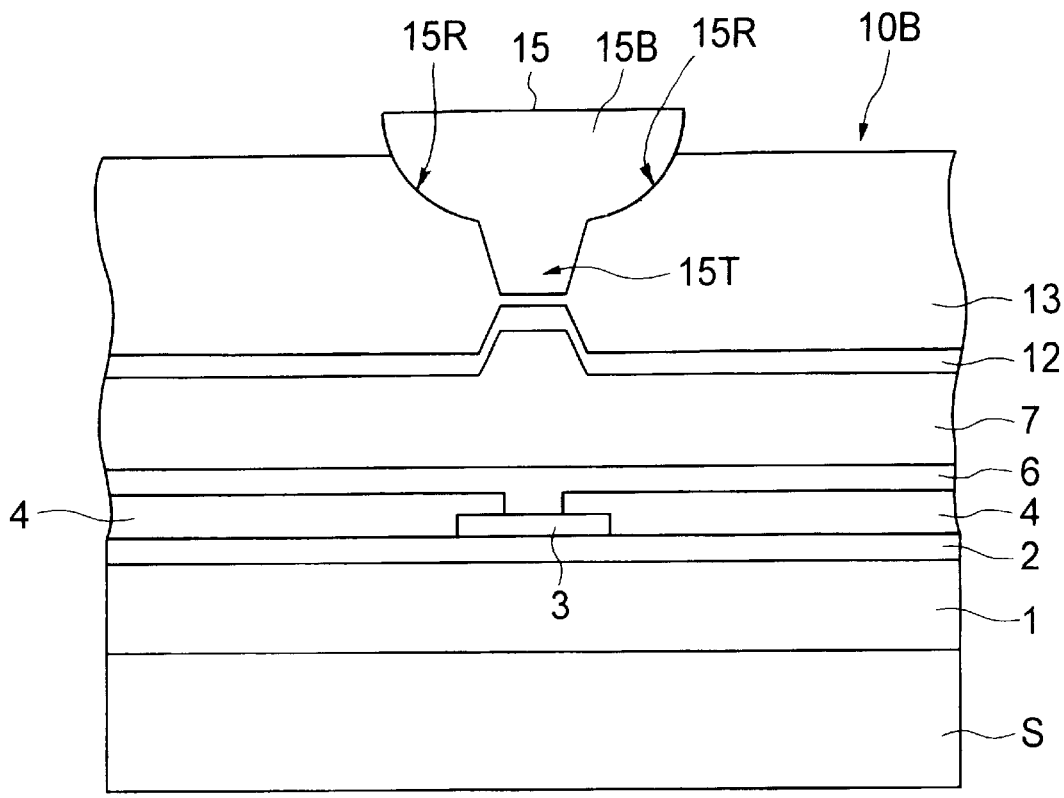
FIG. 19 is an elevational view of a record/reproduce integral thin film magnetic head to be made by manufacturing methods according to the sixth to twelfth embodiments, which shows a medium facing surface thereof.
Figure 20:
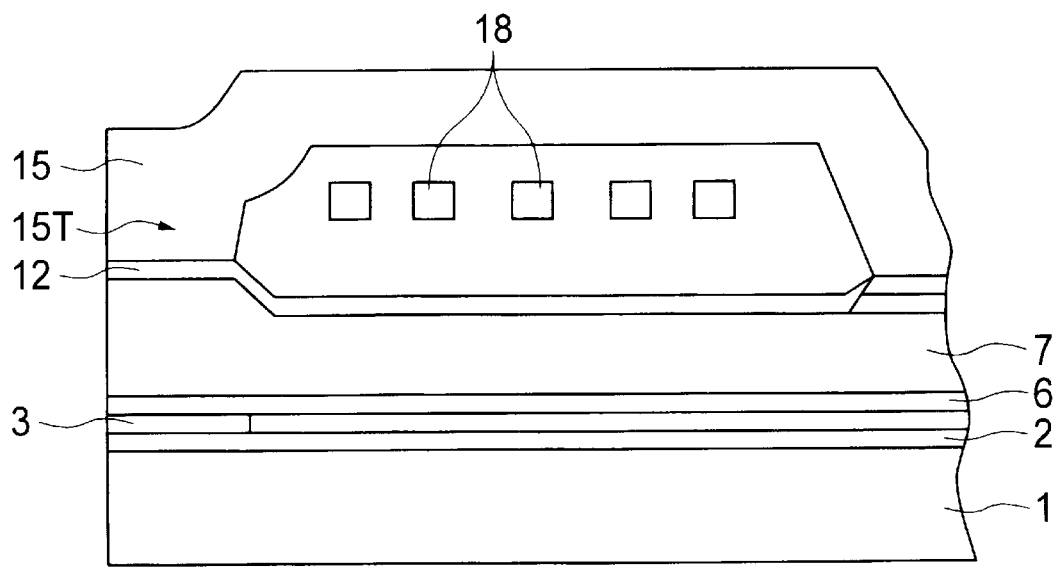
FIG. 20 is a vertical cross-sectional view of the record/reproduce integral magnetic head shown in FIG. 19, taken from the direction normal to the medium facing surface.

First explained is the structure of a magnetic head to be made by methods according to the sixth through eleventh embodiments with reference to FIGS. 19 and 20.

FIG. 19 is an elevational view of the record/reproduce integral magnetic head to be made by methods according to the sixth through twelfth embodiments, showing its medium facing surface.

FIG. 20 is a vertical cross-sectional view of the record/reproduce integral magnetic head shown in FIG. 19, taken from the direction normal to the medium facing surface.

In FIGS. 19 and 20, the components common to those of FIGS. 1 and 2 are labeled with common reference numerals, and detailed explanation thereof is omitted.

A difference of the magnetic head 10B shown in FIGS. 19 and 20 from the magnetic head 10A shown in FIGS. 1 and 2 lies in the cross-sectional configuration of the opposite wing portions extending outward from above the tapered projection 15T of the upper write pole 15. That is, in the magnetic head 10A, as shown by numeral 15F in FIG. 1, opposite wing portions extending outward from above the tapered projection 15T as the tip end of the upper write pole 15 make planes confronted in parallel to the substrate surface. In contrast, in the magnetic head 10B, as shown by numeral 15R in FIG. 19A, the opposite wing portions extending from above the tapered projection 15T as the tip end of the upper write pole 15 have curved planes which are not parallel to the major surface of the substrate S but gently slope to gradually go away from the substrate. These curved planes make a downward convex projection when viewed in FIG. 19. Here is formed, therefore, a two-step projection having the tapered projection 15T at the tip end of the projection 15R having the curved plane.

In other words, on the medium facing surface, opposite wing portions extending outward from above the tapered projection 15T at the tip end of the upper write pole 15 are curved to gradually separate from the magnetic gap 12 toward the outer ends thereof relative to the projection 15T.

As a result, the upper write pole 15 has a cross-sectional configuration like a wine glass as shown in FIG. 19.

The upper write pole 15, so configured, can remarkably reduce the magnetic field intensity which leaks from the portion of the upper write pole 15 other than the tapered projection 15T. Therefore, it is possible to overcome the problems which would otherwise occur during writing of a signal onto a recording medium, such as writing on an adjacent track or erasure of information from an adjacent track.

Explained below are sixth through twelfth embodiments of the invention which are manufacturing methods of the magnetic head 10B shown in FIGS. 19 and 20.

(Sixth Embodiment)

First as the sixth embodiment of the invention, explanation is made on a process combining isotropic etching and anisotropic etching for simultaneously making the two-step projection (curved projection 15R and tapered projection 15T) as shown in FIG. 19.

First made on a substrate S is the shield type MR head as shown in FIGS. 19 and 20. This shield type MR head can be made by a typical manufacturing process of a shield type MR head. Subsequently, the recording head, which is the inductive type thin film magnetic head, is made on the shield type MR head as the reproducing head. The process for manufacturing the inductive type thin film magnetic head is explained with reference to the drawings.

FIGS. 21A through 21D and 22A through 22C are cross-sectional views showing a major part of a magnetic head manufacturing process according to the sixth embodiment of the invention. FIGS. 21A through 22C show, in particular, the process for making the upper write pole 15, and a part of the structure of the shield type MR head is not illustrated in these figures.

Figure 21A:
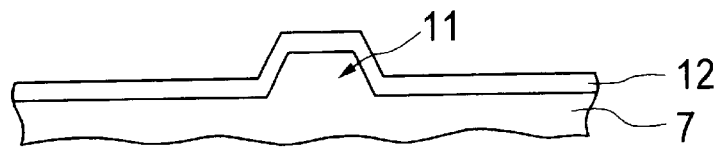
FIGS. 21A through 21D and 22A through 22C are cross-sectional views showing a manufacturing process of a magnetic head, according to the sixth embodiment.

First as shown in FIG. 21A, in the shield type MR head, the write magnetic gap 12 is formed by sputtering, for example, on the lower write pole (upper magnetic shield layer) 7 having the projecting lower write pole tip portion 11. The magnetic gap 12 can be formed only on the tip portion 11 as shown in FIG. 5A, for example.

Figure 21B:
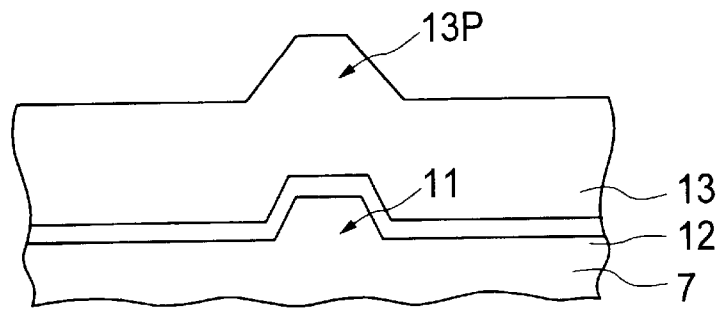

After that, as shown in FIG. 21B, the non-magnetic material layer 13 having a projection 13P in positional alignment with the lower write pole projection 11 is made by sputtering or CVD, for example. In this case, the non-magnetic material layer 13 is stacked thick enough to made the two-step projection on the upper write pole. Usable as the material of the non-magnetic material layer 13 are oxides like silicon oxide ($SiO_2$) and aluminum oxide ($Al_2O_3$), for example, nitrides like silicon nitride and aluminum nitride, for example, and their complex compounds.

Figure 21C:
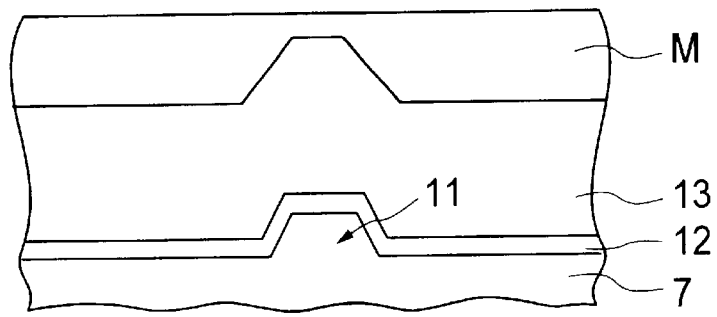

Next as shown in FIG. 21C, a smoothing layer M is formed on the non-magnetic material layer 13. By coating a low-viscosity resist, for example, by using a spinner or other means, the surface can be smoothed. If it is likely to occur that the smoothing layer M does not remain in a later etching step and no longer functions as the etching mask, or the mask configuration changes during etching, another film of non-magnetic material or magnetic material with a higher etching resistivity than the non-magnetic material layer may be formed as a supplemental etching mask on the non-magnetic material layer 13 shown in FIG. 21B before coating the resist.

Figure 21D:
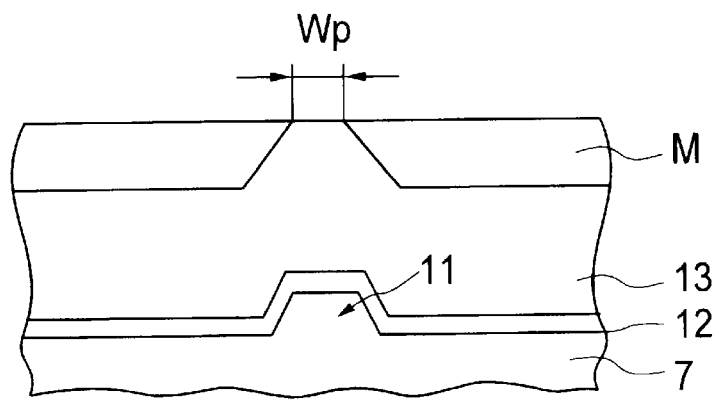

Next as shown in FIG. 21D, the smoothing layer M is thinned by etch-back so as to expose the surface of the projection 13P of the non-magnetic material layer 13 and flush it therewith. For this etching, ion milling, RIE, ICP (inductive coupled plasma) sputter etching on another dry etching, etc. are usable. Width (Wp) of the projection 13P to be exposed in this process may be determined, depending upon the etching amount of the non-magnetic material layer and the smoothing layer M during isotropic etching and anisotropic etching shown in FIGS. 22A and 22B.

In this etch-back process, the selection ratio (E1/E2) defined by the etch rate (E1) of the non-magnetic material layer 13 and the etch rate (E2) of the smoothing layer M is preferably within the range of $0.7<(E1/E2)<1.3$, and more preferably within the range of $0.9<(E1/E2)<1.1$. If the selection ratio (E1/E2) of the smoothing layer M and the non-magnetic material layer 13 is in the range of $0.7>(E1/E2)$ or $(E1/E2)>1.3$, only one of them will be etched vigorously.

Figure 22A:
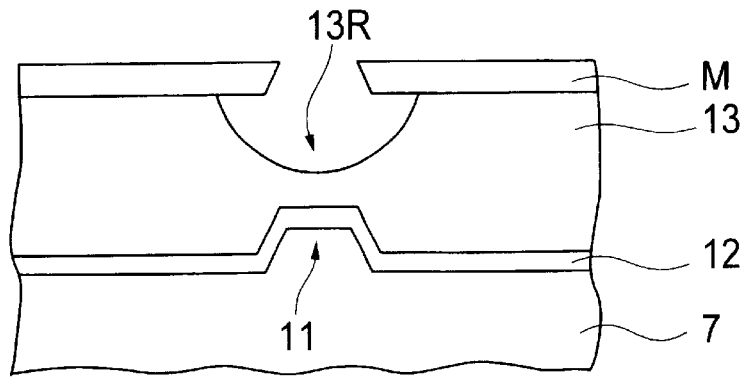

Next as shown in FIG. 22A, using the smoothing layer M as a mask, the exposed non-magnetic material layer 13 is isotropically etched to make the curved recess 13R. Usable as isotropic etching are CDE (chemical dry etching), wet etching, etc.

Figure 22B:
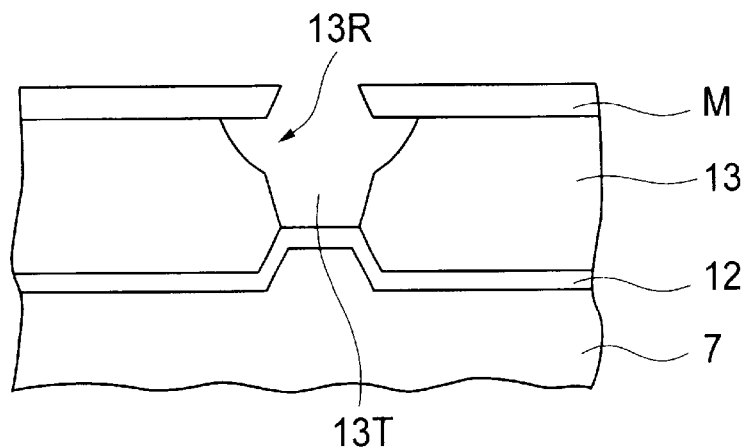

Next as shown in FIG. 22B, using the smoothing layer M as a mask, the bottom of the curved recess 13R is excavated by anisotropic etching to make a tapered recess 13T. Usable as anisotropic etching is a directional plasma etching method such as ion milling, RIE and ICP, for example. Through this process, a two-step recess including the curved recess 13R and the tapered recess 13T necessary for making the upper write pole is made.

Figure 22C:
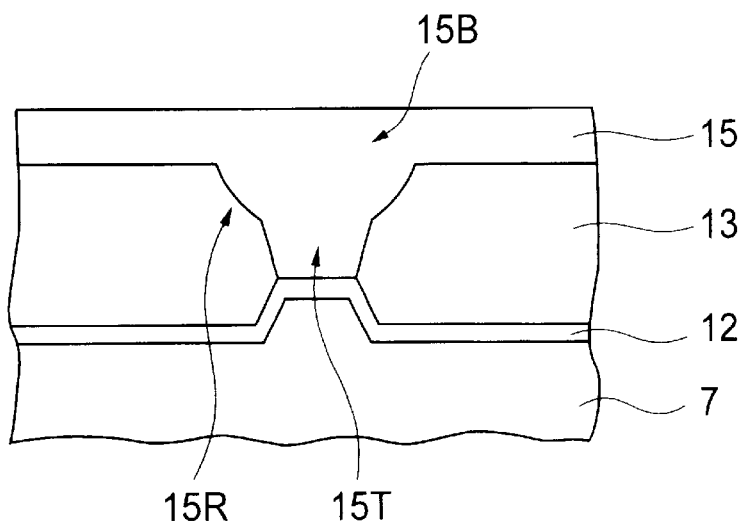

Next as shown in FIG. 22C, by removing the smoothing layer M and stacking a magnetic material, the upper write pole 15 having the two-step projection (tapered projection 15T and curved projection 15R) can be made seamlessly (without a joint line) in self alignment.

As explained above, according to this embodiment, the two-step projection of the upper write pole 15 can be made on the projecting tip portion 11 of the lower write pole in self alignment. As a result, it is possible to restrict leakage of the magnetic field caused by relative deviation of magnetic pole tip portions and prevent undesirable writing into an adjacent track or erasure of data therefrom.

Figure 42:
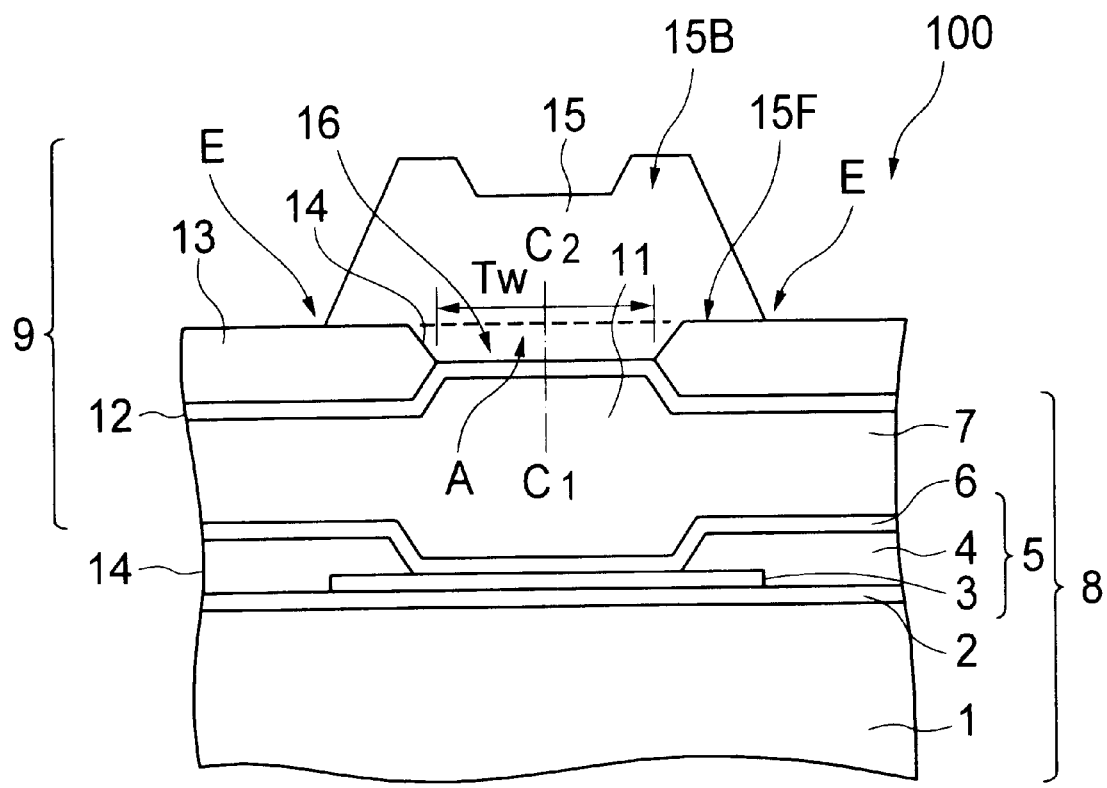
FIG. 42 is an elevational view of a record/reproduce integral thin film magnetic head, which shows a medium facing surface thereof.

Additionally, according to the invention, the upper write pole 15 is integrally formed altogether. That is, unlike the example shown in FIG. 42, the curved projection 15R, tapered projection 15T and supplemental magnetic pole 15B thereabove in the upper write pole 15 are integrally formed seamlessly altogether, and no joint boundary exists. Therefore, no pseudo magnetic gap is formed inside the upper write pole 15, and the problem of leakage of the magnetic flux can be overcome.

(Seventh Embodiment)

Next as the seventh embodiment of the invention, explanation is made on a process for making an intermediate layer in the non-magnetic material layer 13 as a layer behaving as an etching stopper or etching monitor.

FIGS. 23A through 23D and 24A through 24C are cross-sectional views showing a major part of a magnetic head manufacturing process according to the seventh embodiment of the invention. These figures show, in particular, the process for making the upper write pole 15, and a part of the structure of the shield type MR head is not illustrated in these figures.

Figure 23A:
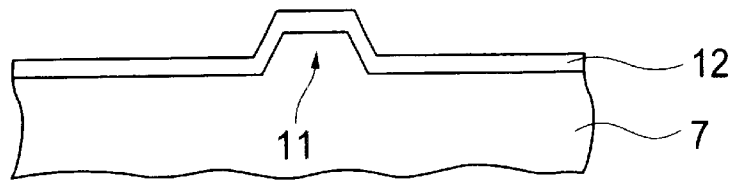
FIGS. 23A through 23D and 24A through 24C are cross-sectional views showing a major part of a magnetic head manufacturing process according to the seventh embodiment of the invention.

First as shown in FIG. 23A, in the shield type MR head, the write magnetic gap 12 is formed by sputtering, for example, on the lower write pole (upper magnetic shield layer) 7 having the projecting lower write pole tip portion 11.

Figure 23B:
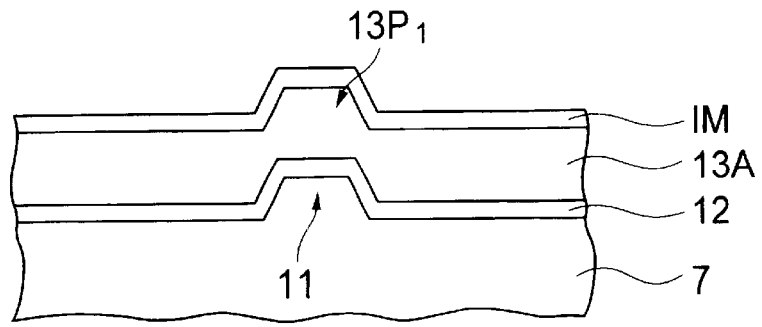

After that, as shown in FIG. 23B, a first non-magnetic material layer 13A having a projection 13P1 in positional alignment with the lower write pole projection 11 is made by sputtering, for example. Usable as the material of the non-magnetic material layer 13 are oxides like silicon oxide ($SiO_2$) and aluminum oxide ($Al_2O_3$), for example, nitrides like silicon nitride and aluminum nitride, for example, and their complex compounds. The first non-magnetic material layer 13A is stacked thick enough to made the tapered projection 15T of the upper write pole 15.

Then, an intermediate layer IM is made on the non-magnetic material layer 13A. As explained later, this intermediate layer IM is made of a material different from the non-magnetic material layer, and functions as an etching stopper or etching stop monitor when the non-magnetic material layer is isotropically etched.

Figure 23C:
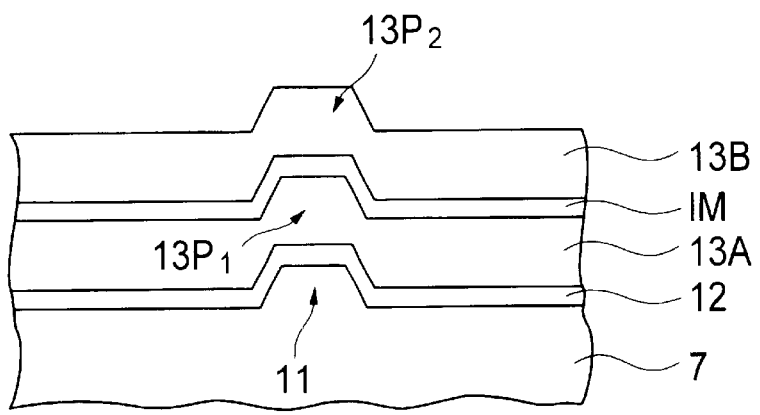

Next as shown in FIG. 23C, a second non-magnetic material layer 13B having a projection 13P2 in positional alignment with the lower write pole projection 11 is made. The second non-magnetic material layer 13B is stacked thick enough to make the curved projection 15R of the upper write pole.

Figure 23D:
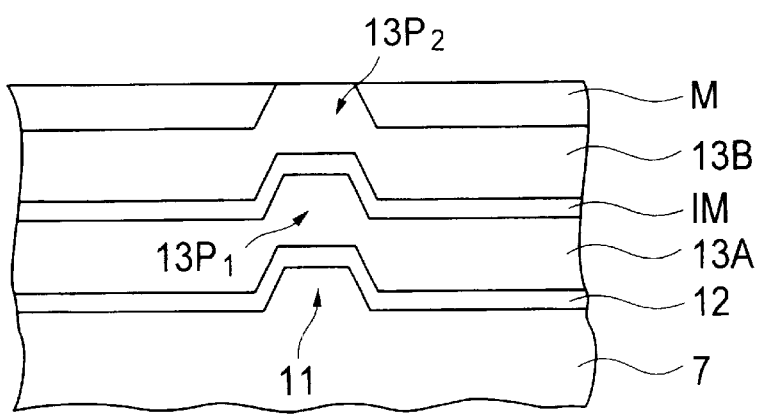

Next as shown in FIG. 23D, a smoothing layer M is formed on the non-magnetic material layer 13B and thinned by etch-back using ion milling, RIE, ICP, or the like, until a predetermined width of the surface of the projection 13P2 of the non-magnetic material layer 13B is exposed on substantially the same level as the non-magnetic material layer. This process is as already explained with reference to FIGS. 21C and 21D.

Figure 24A:
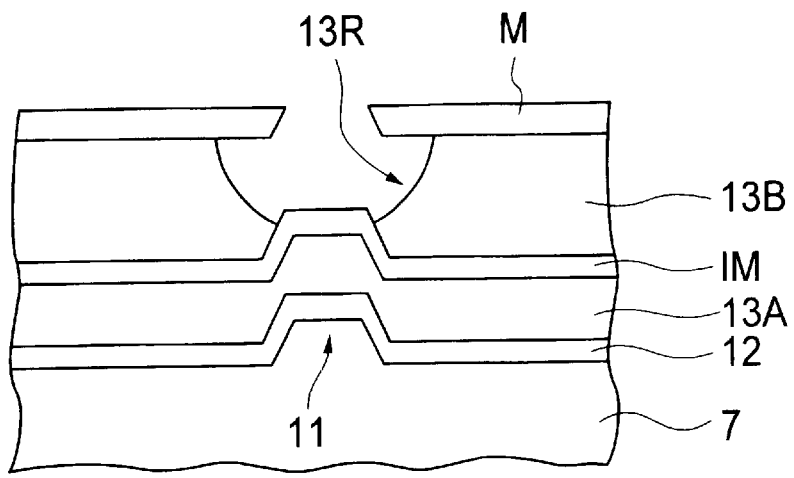

Next as shown in FIG. 24A, using the smoothing layer M as a mask, the exposed non-magnetic material layer 13B is isotropically etched to make the curved recess 13R. Usable as isotropic etching are CDE (chemical dry etching), wet etching, etc.

During this etching, the intermediate layer IM functions as an etching stopper or etching stop monitor. If the non-magnetic material layer 13B is made of a material of the system of oxide silicon ($SiO_2$), the intermediate layer IM is preferably made of amorphous silicon (a-Si) or silicon nitride ($SiN_x$), for example.

In the case where the intermediate layer IM is made of amorphous silicon or silicon nitride, when the non-magnetic material layer 13B is isotropically etched by plasma etching until the etching front reaches the intermediate layer IM, emission intensity of the silicon plasma significantly increases. When the etching further progresses and reaches the end of etching of the intermediate layer IM, the plasma emission intensity suddenly decreases.

Figure 25:
FIG. 25 is a graph showing changes in emission intensity of the silicon plasma.

FIG. 25 is a graph showing changes in emission intensity of the silicon plasma, which were observed during plasma etching. In this manner, by monitoring changes in emission intensity with time, the end of the isotropic etching process can be detected easily and reliably.

Thickness of the intermediate layer IM is, in case of a-Si, preferably from 2 nm to 50 nm, and more preferably from 5 nm to 20 nm. If the thickness is less than 2 nm, the plasma emission time is short, and detection of the end point is difficult. If the thickness is more than 50 nm, although the emission time is enough, there is the possibility that the intermediate layer alone is selectively etched in a later anisotropic etching process under a certain etching condition and the curved recess and the tapered recess are not formed as desired.

According to this embodiment, by monitoring the emission spectra of the intermediate layer IM at appropriate times, condition about contamination in the plasma etching chamber can be monitored together, and the manufacturing process can be controlled easily.

On the other hand, if the intermediate layer IM is made of a material more difficult to remove by etching, it can be used as an etching stopper.

Figure 24B:
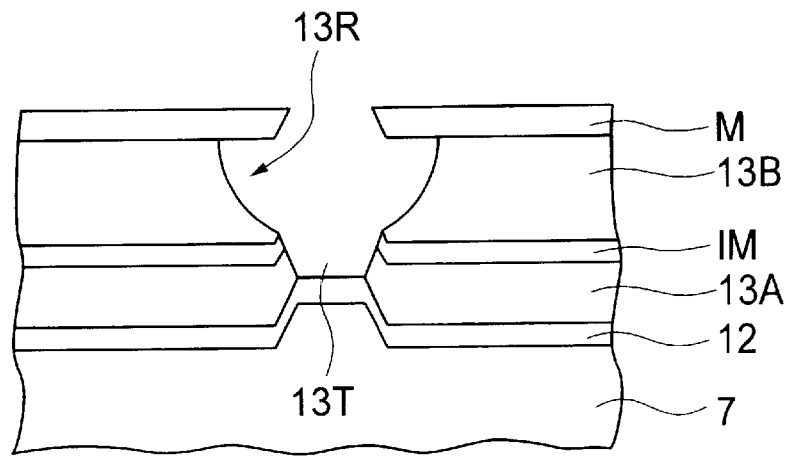
Figure 24C:
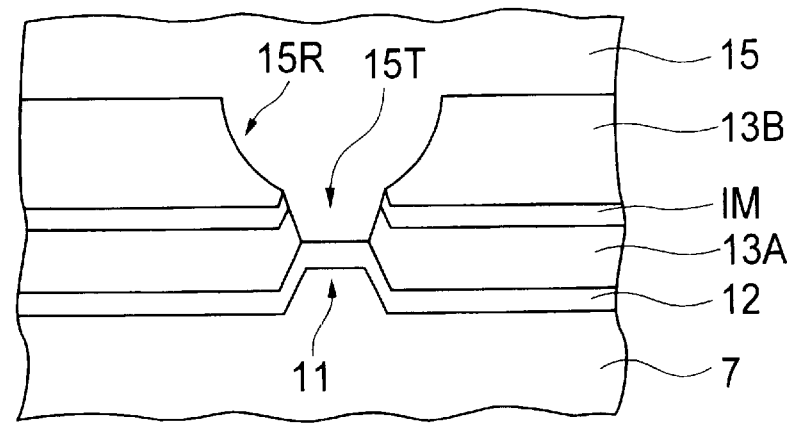

Next as shown in FIG. 24B, using the smoothing layer M as a mask, the tip portion of the intermediate layer IM and the first non-magnetic material layer 13A exposed at the bottom of the curved recess 13R is excavated by anisotropic etching to make a tapered recess 13T. Usable as anisotropic etching is a directional plasma etching method such as ion milling, RIE and ICP, for example. Through this process, a two-step recess including the curved recess 13R and the tapered recess 13T necessary for making the upper write pole is made in a self aligned fashion.

In this etching process, it is sufficient that the etching selection ratio between the non-magnetic material layer 13A and the mask layer M 13A (etch rate of the non-magnetic material layer/etch rate of the mask layer) is not less than 1, and the mask layer M need not exists until the tapering etching finishes.

After that, by burying a magnetic material, the two-step projection including the curved projection 15R and the tapered projection 15T can be made seamlessly (without a joint line) in self alignment.

In this embodiment, shape and depth of the curved recess 13R are determined by the thickness of the non-magnetic material layer 13B, and shape and depth of the tapered recess 13T are determined by the thickness of the non-magnetic material layer 13A. That is, by controlling the thickness of the non-magnetic material layer 13 under the intermediate layer IM and the thickness of the non-magnetic material layer 13B above the intermediate layer IM, shapes and sizes of the tapered recess 13T and the curved recess 13R can be precisely controlled, individually.

(Eighth Embodiment)

Next explained is a manufacturing process according to the eighth embodiment of the invention, directed to making the non-magnetic material layer in a two-layered structure of materials which are different in mode of etching.

FIGS. 26A through 26D and 27A through 27C are cross-sectional views showing a major part of a magnetic head manufacturing process according to the eighth embodiment of the invention. These figures show, in particular, the process for making the upper write pole 15, and a part of the structure of the shield type MR head is not illustrated in these figures.

Figure 26A:
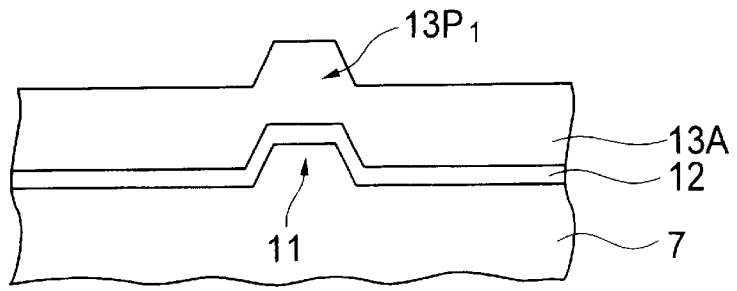
FIGS. 26A through 26D and 27A through 27C are cross-sectional views showing a major part of a magnetic head manufacturing process according to the eighth embodiment of them invention.

First as shown in FIG. 26A, in the shield type MR head, the write magnetic gap 12 is formed by sputtering, for example, on the lower write pole (upper magnetic shield layer) 7 having the projecting lower write pole tip portion 11. Subsequently formed is a first non-magnetic material layer 13A having a projection 13P1 in positional alignment with the lower write pole projection 11 by sputtering, for example.

The non-magnetic material layer 13A is made of a material which is etched at a low etch rate in an isotropic etching step explained later, but preferentially etched in an anisotropic etching step so that the tapered recess 13T can be readily made. The first non-magnetic material layer 13A is stacked thick enough to make the tapered projection 15T of the upper write pole 15 later.

Figure 26B:
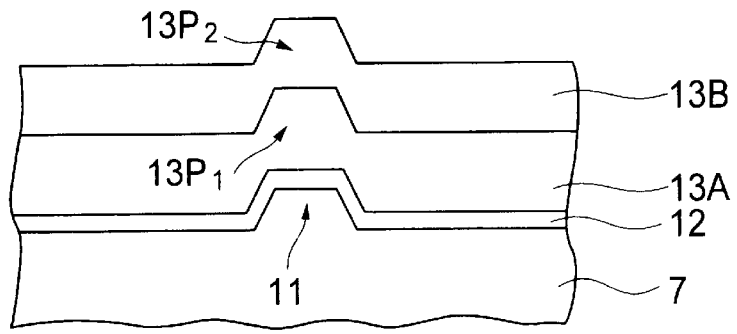

Next as shown in FIG. 26B, a second non-magnetic material layer 13B having a projection 13P2 in positional alignment with the lower write pole projection 11 is made on the first non-magnetic material layer 13A. The non-magnetic material layer 13B is made of a material which is preferentially etched in the isotropic etching step, explained later, so that the curved recess 13R can be readily made, but etched at a low etch rate in the anisotropic etching step. The second non-magnetic material layer 13B is stacked thick enough to make the curved projection 15R of the upper write pole 15 later.

Figure 26C:
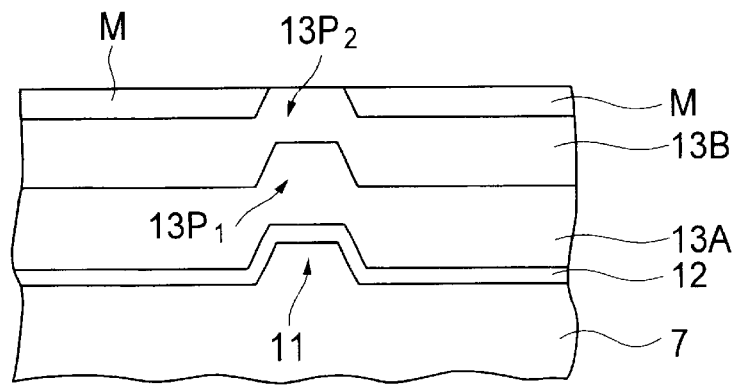

Next as shown in FIG. 26C, a smoothing layer M is formed on the second non-magnetic material layer 13B and thinned by etch-back, until a predetermined width of the surface of the projection 13P2 of the non-magnetic material layer 13B is exposed on substantially the same level as the non-magnetic material layer. Here is preferably used an etching method substantially equalizing the etch rates of the smoothing layer M and the second non-magnetic material layer 13B. Thus, they can be flushed easily. This process is as already explained with reference to FIGS. 21C and 21D.

Figure 26D:
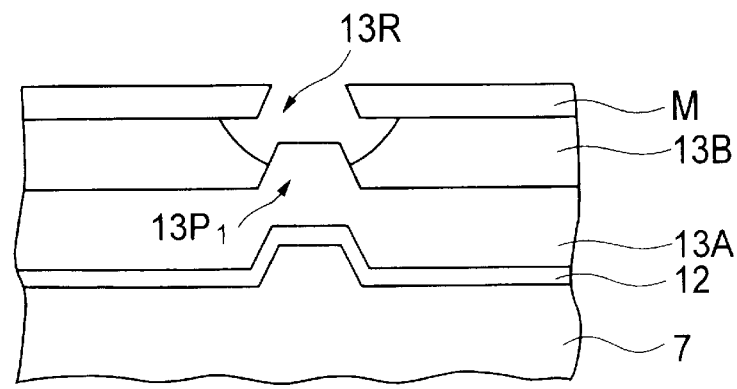

Next as shown in FIG. 26D, using the smoothing layer M as a mask, the exposed non-magnetic material layer 13B is isotropically etched to make the curved recess 13R. Usable as isotropic etching are CDE (chemical dry etching), wet etching, etc.

By making the first non-magnetic material layer 13A of a material with which the etch rate is slow in this etching process, it is not etched so much and can be maintained at the bottom of the curved recess 13R.

Figure 27A:
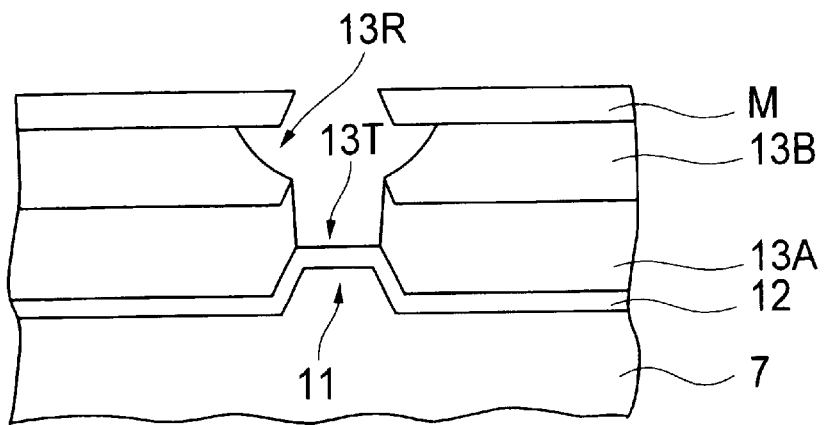

Next as shown in FIG. 27A, using the smoothing layer M and the second non-magnetic material layer 13B as a mask, the first non-magnetic material layer 13A exposed on the bottom of the curved recess 13R is excavated anisotropic etching to make out the tapered recess 13T. Usable as anisotropic etching is a directional plasma etching method such as ion milling, RIE and ICP, for example. By making the second non-magnetic material layer 13B of a material with which the etch rate is slow in this etching process, it is not etched so much and functions as a mask to prevent deformation of the curved recess 13R.

Figure 27B:
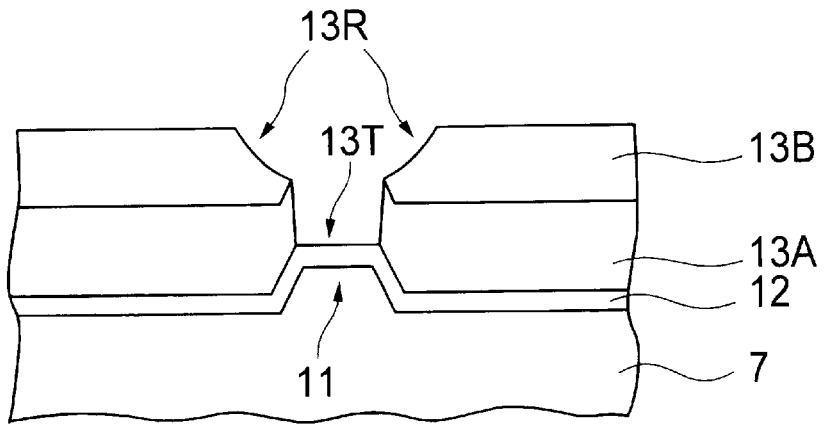
Figure 27C:
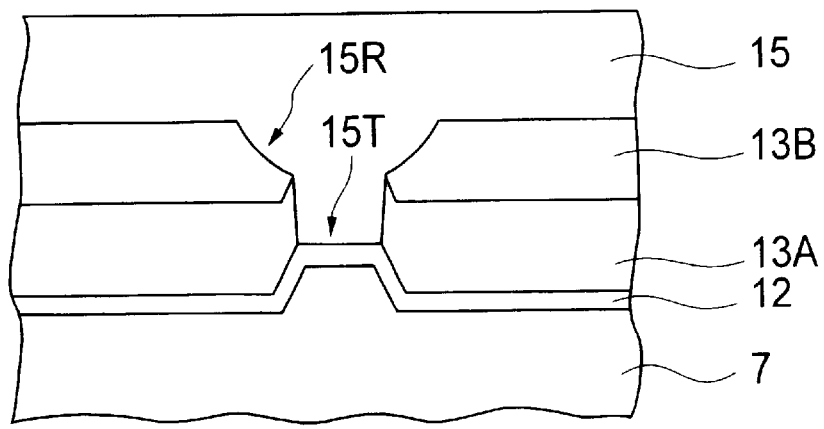

Through these steps, the two-step recess including the curved recess 13R and the tapered recess 13T necessary for making the upper write pole is made in a self aligned fashion as shown in FIG. 27B.

In this etching process, it is sufficient that the etching selection ratio between the non-magnetic material layer 13A (etch rate of the non-magnetic material layer/etch rate of the mask layer) and the mask layer M is not less than 1, and the mask layer M need not exists until the tapering etching finishes.

After that, as shown in FIG. 26C, by burying a magnetic material, the two-step projection including the curved projection 15R and the tapered projection 15T can be made seamlessly (without a joint line) in self alignment.

Here again, shape and depth of the curved recess 13R are determined by the thickness of the second non-magnetic material layer 13B, and shape and depth of the tapered recess 13T are determined by the thickness of the first non-magnetic material layer 13A. That is, by controlling the thickness of the non-magnetic material layer 13 and the thickness of the non-magnetic material layer 13B, shapes and sizes of the tapered recess 13T and the curved recess 13R can be precisely controlled, individually.

(Ninth Embodiment)

Next explained is a manufacturing process according to the ninth embodiment of the invention, directed to making the non-magnetic material layer in a two-layered structure by forming the tapered recess in the first layer, then burying it with a resin, for example, and thereafter forming the second layer.

FIGS. 28A through 28C and 29A through 29C are cross-sectional views showing a major part of a magnetic head manufacturing process according to the ninth embodiment of the invention. These figures show, in particular, the process for making the upper write pole 15, and a part of the structure of the shield type MR head is not illustrated in these figures.

Figure 28A:
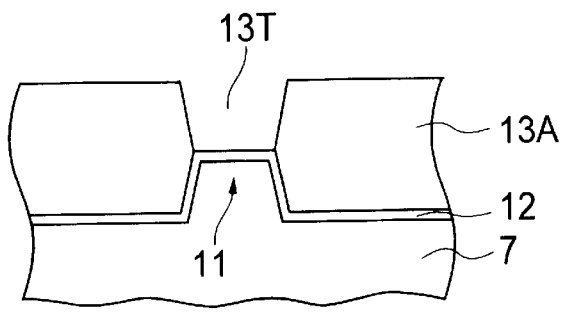
FIGS. 28A through 28C and 29A through 29C are cross-sectional views showing a major part of a magnetic head manufacturing process according to the ninth embodiment of the invention.

First as shown in FIG. 28A, in the shield type MR head, the write magnetic gap 12 is formed by sputtering, for example, on the lower write pole (upper magnetic shield layer) 7 having the projecting lower write pole tip portion 11. Subsequently formed is a first non-magnetic material layer 13A having a projection 13P1 in positional alignment with the lower write pole projection 11 by sputtering, for example. Further, a mask layer, not shown, is formed through the process already explained with reference to FIGS. 21B and 21C, and the projection of the non-magnetic material layer 13A exposed to the surface is anisotropically etched to make out the tapered recess 13T.

Figure 28B:
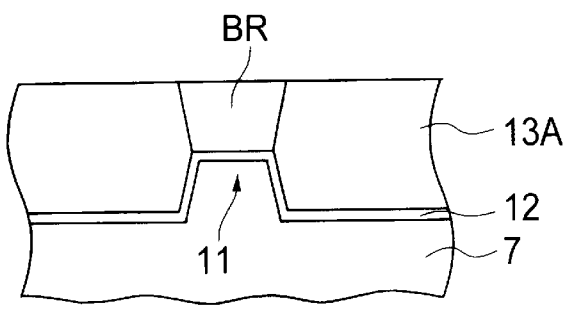

Next as shown in FIG. 28B, the recess 13T is buried. More specifically, by coating a material such as low-viscosity resin, for example, and conducting etch-back thereof, the surface of the non-magnetic material layer 13A can be exposed on substantially the same level as the buried layer BR.

Figure 28C:
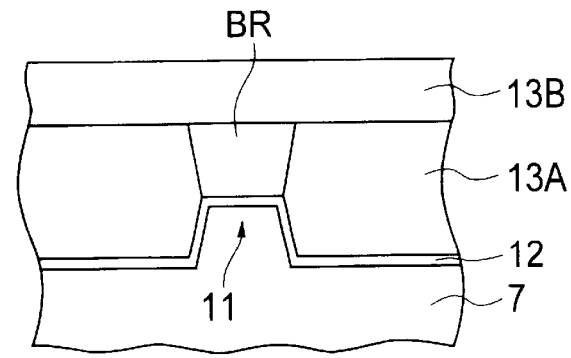

Next as shown in FIG. 28C, the second non-magnetic material layer 13B is formed by sputtering, for example. In this embodiment, materials of the first non-magnetic material layer 13A and the second non-magnetic material layer 13B may be either different or identical.

Figure 29A:
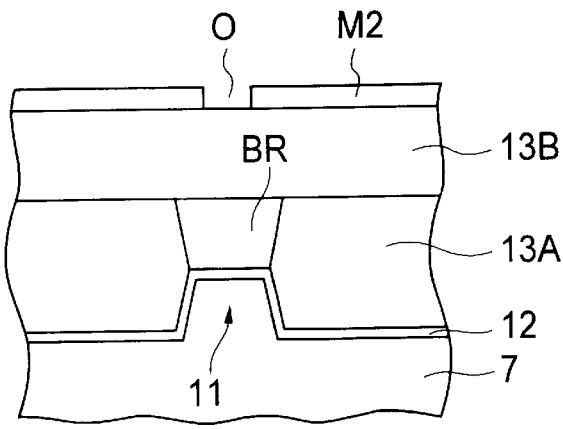

Next as shown in FIG. 29A, a mask M2 is formed on the second non-magnetic material layer 13B by lithography. If a marker, not shown, is formed simultaneously when the lower write pole tip portion 11 is formed, this marker can be used as a target in this photolithographic process to make the mask M2 with an opening O approximately in positional alignment with the tip portion 11.

Figure 29B:
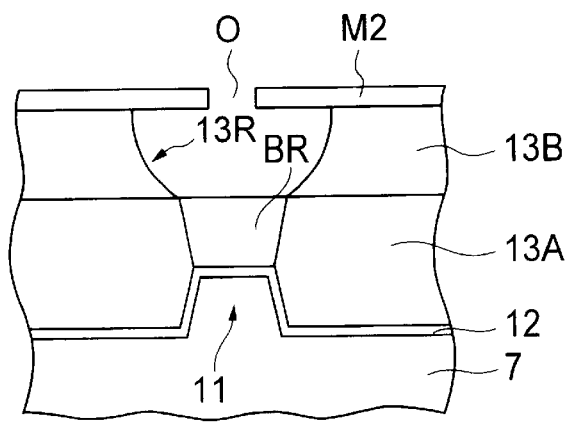
Figure 29C:
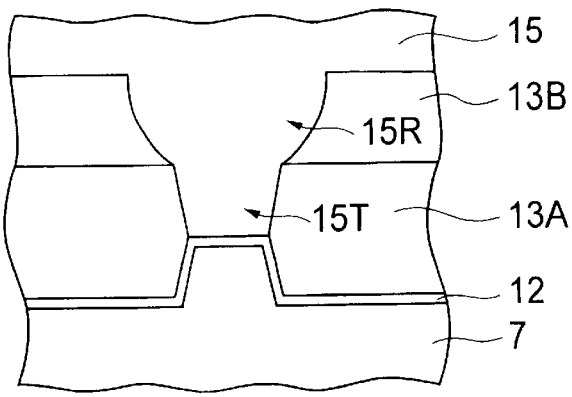

Next as shown in FIG. 29B, the curved recess 13R is made by isotropic etching. Since the preceding step is not configured to ensure full alignment of the opening O of the mask M2, there is the possibility that the position of the opening O is slightly deviated from the lower write pole tip portion 11. However, the positional deviation is alleviated by isotropic etching. Finally, as shown in FIG. 29C, by removing the mask M2 and the buried layer BR and burying a magnetic material, the two-step projection including the curved projection 15R and the tapered projection 15T can be made seamlessly (without a joint line) in self alignment.

(Tenth Embodiment)

Next explained is a manufacturing process according to the tenth embodiment of the invention, directed to making the two-step recess in self alignment by using an umbrella-shaped mask having an overhang.

FIGS. 30A through 30D are cross-sectional views showing a major part of a magnetic head manufacturing process according to the tenth embodiment of the invention. These figures show, in particular, the process for making the upper write pole 15, and a part of the structure of the shield type MR head is not illustrated in these figures.

Figure 30A:
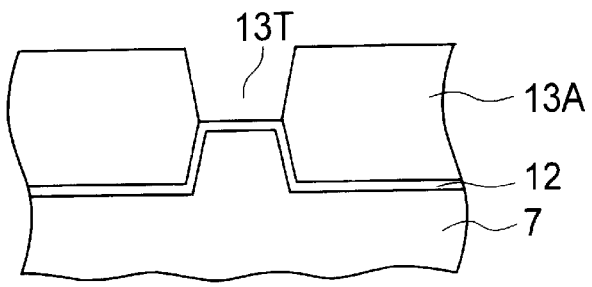
FIGS. 30A through 30D are cross-sectional views showing a major part of a magnetic head manufacturing process according to the tenth embodiment of the invention.

First as shown in FIG. 30A, in the shield type MR head, the write magnetic gap 12 is formed by sputtering, for example, on the lower write pole (upper magnetic shield layer) 7 having the projecting lower write pole tip portion 11. Subsequently formed is a first non-magnetic material layer 13A having a projection 13P1 in positional alignment with the lower write pole projection 11 by sputtering, for example. Further, a mask layer, not shown, is formed through the process already explained with reference to FIGS. 21B and 21C, and the projection of the non-magnetic material layer 13A exposed to the surface is anisotropically etched to make out the tapered recess 13T.

Figure 30B:
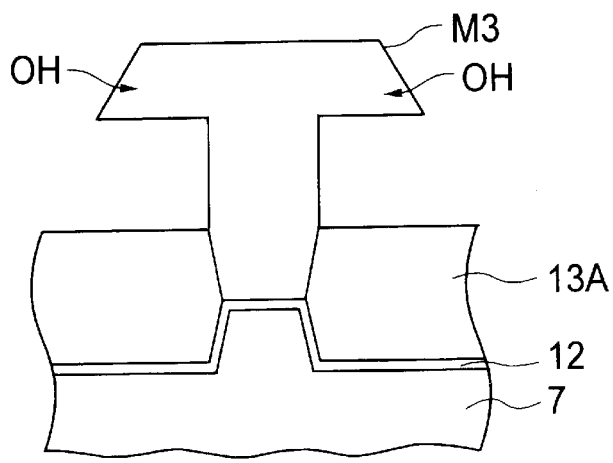

Next formed is, as shown in FIG. 30B, an umbrella-shaped mask M3 having an overhang OH extending to opposite sides at the top end. Any appropriate material that can resist isotropic the following deposition process of the layer 13B may be used as the material of the mask M3.

Figure 30C:
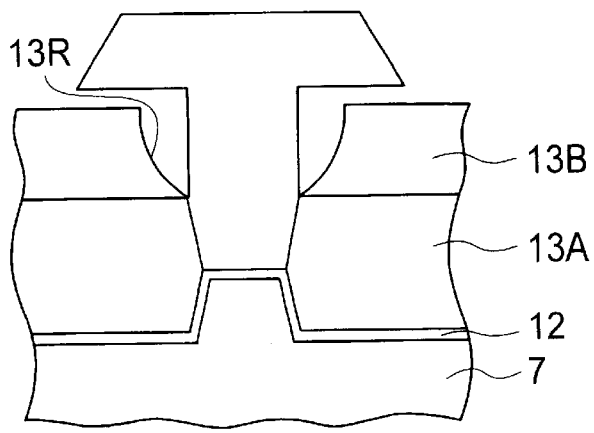

Next as shown in FIG. 30C, the second non-magnetic material layer 13B is stacked by sputtering, for example. In this process, part of the deposition material of 13B comes to reach under the overhand OH of the mask M3 and makes there a thickness profile gradually decreasing toward the trench 13T. In this manner, the curved recess 13R is made in self alignment.

Figure 30D:
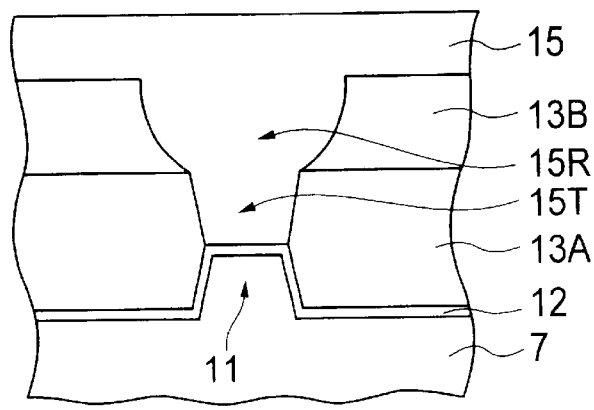

Finally, as shown in FIG. 30D, by removing the mask M2 and the buried layer BR and burying a magnetic material, the two-step projection including the curved projection 15R and the tapered projection 15T can be made seamlessly (without a joint line) in self alignment.

In the embodiment shown here, the umbrella-shaped mask M3 may be made by, for example, first making the smoothing layer M as shown in FIG. 21D, then making a trench by anisotropic etching of the non-magnetic layer 13A, selectively burying the material of the mask M3 to overflow from the trench before removing the smoothing layer M, and thereafter softening the overflow portion above the trench so that it evenly extends out due to its surface tension to form the overhand OH.

(Eleventh Embodiment)

Next explained is a manufacturing process according to the eleventh embodiment of the invention, directed to making the two-step recess in self alignment by using a mushroom-shaped buried layer.

FIGS. 31A through 31D are cross-sectional views showing a major part of a magnetic head manufacturing process according to the eleventh embodiment of the invention. These figures show, in particular, the process for making the upper write pole 15, and a part of the structure of the shield type MR head is not illustrated in these figures.

Figure 31A:
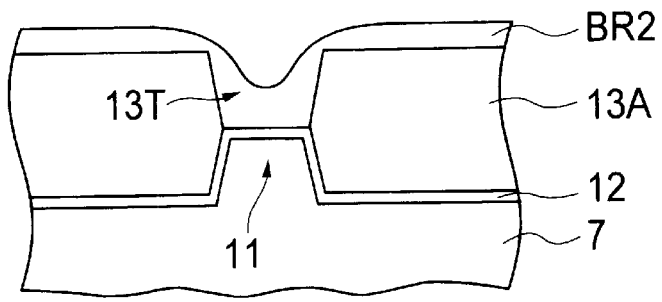
FIGS. 31A through 31D are cross-sectional views showing a major part of a magnetic head manufacturing process according to the eleventh embodiment of the invention.

First as shown in FIG. 31A, the lower write pole (upper magnetic shield layer) 7 and the write magnetic gap 12 are formed, the first non-magnetic material layer 13A is stacked, and the tapered recess 13T is formed in self alignment with the tip portion 11. Details of these steps were already explained with reference to FIG. 28A or FIG. 30A, and are not repeated here. In this embodiment, a self-contractile material BR2 is coated additionally. This material BR2 preferably softens and exhibits self-contractility when heated. For example, a resin may be used.

Figure 31B:
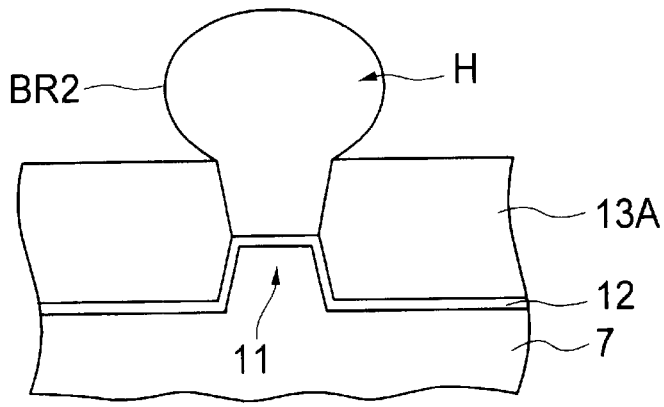

Next as shown in FIG. 31B, the material BR2 is made to contract. For example, when a self-contractile resin material is used, when it is heated, it softens and decreases in viscosity, and then shrinks toward the trench due to its surface tension. As a result, the buries layer BR2 having a round portion H, which spreads out above the trench 13T as illustrated, can be obtained.

Figure 31C:
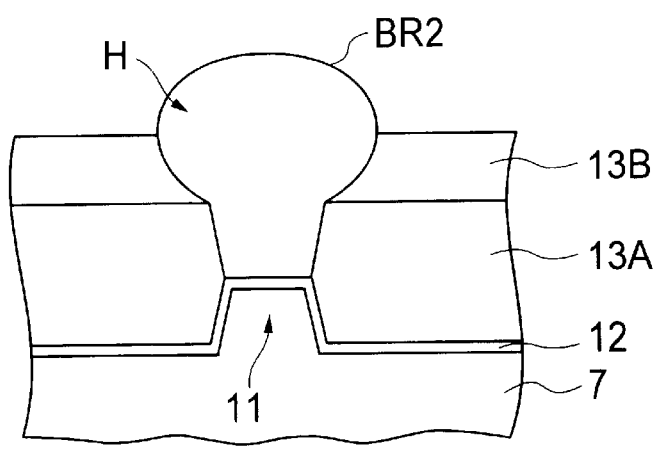

Next as shown in FIG. 31C, the second non-magnetic material layer 13B is formed. In this process, the non-magnetic material is preferably made to spread into under the round portion H of the buried layer BR2 as well.

Figure 31D:
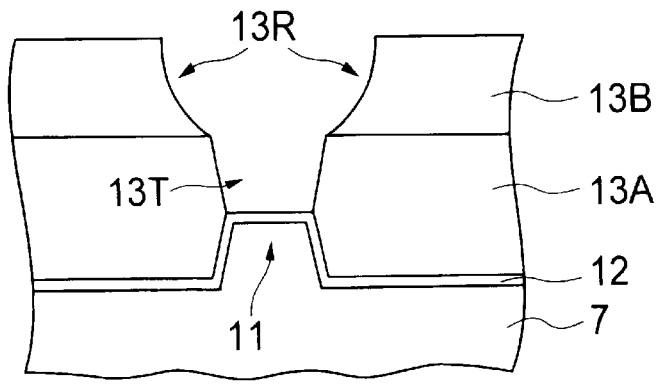

Then, as shown in FIG. 31D, by removing the buried layer BR2, the tapered recess 13T and the curved recess 13R in self alignment can be obtained.

(Twelfth Embodiment)

Next explained is a manufacturing process according to the twelfth embodiment of the invention, directed to trimming the upper write pole having the two-step projection made in self alignment by any of the sixth through eleventh embodiments.

Figure 32A:
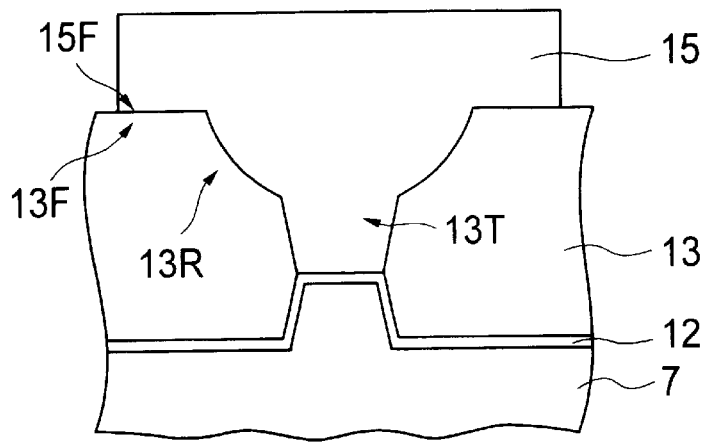
FIGS. 32A through 32C are cross-sectional views showing a major part of a magnetic head manufacturing process according to the twelfth embodiment of the invention.
Figure 32B:
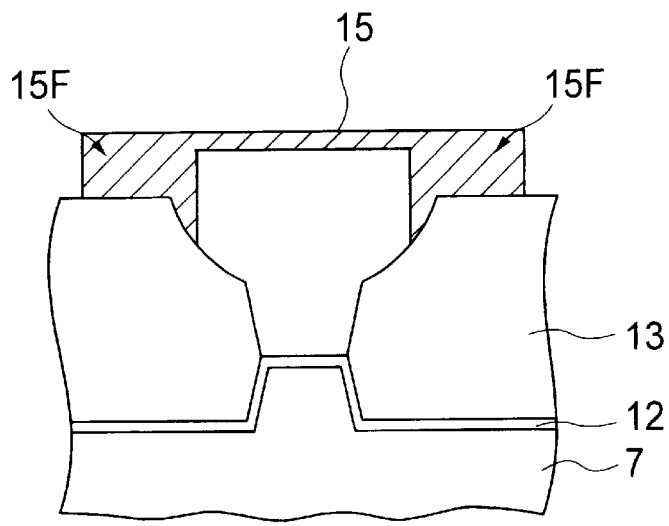
Figure 32C:
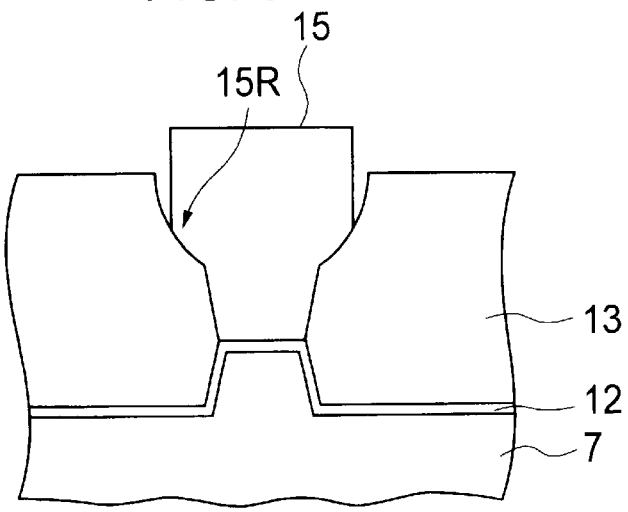

FIGS. 32A through 32C are cross-sectional views showing a major part of a magnetic head manufacturing process according to the twelfth embodiment of the invention. These figures show, in particular, the process for trimming the upper write pole 15, and a part of the structure of the shield type MR head is not illustrated in these figures.

First as shown in FIG. 32A, the upper write pole 15 having a converging configuration is buried and formed in the completely self-aligned trench for the recording magnetic electrode having the curved recess 13R and the tapered recess 13T which are made in self alignment by any of the sixth through eleventh embodiments.

To making the upper write pole 15 here, plating or sputtering may be used. The upper write pole 15 made in this manner often extends also over the flat portion 13F outside the curved recess 13R.

If the upper write pole 15 includes such flat portions 15F, a magnetic flux generated from these portions may cause cross-writing onto an adjacent track. Therefore, the flat portions 15F are removed as shown in FIG. 32B. To remove them, by providing an appropriate mask, IBE (ion beam etching), wet etching, or the like, may be conducted to selectively remove them.

By removing the flat portions 15F in this manner, the upper write pole 15 terminating within the curved recess 15R and having a converging configuration is obtained as shown in FIG. 32C. That is, since the upper write pole 15 no longer includes the flat portions in its surface opposed to the lower write pole 7, side writing onto an adjacent track can be prevented.

Next explained is another method for making the upper write pole 15 without such flat portions.

Figure 33A:
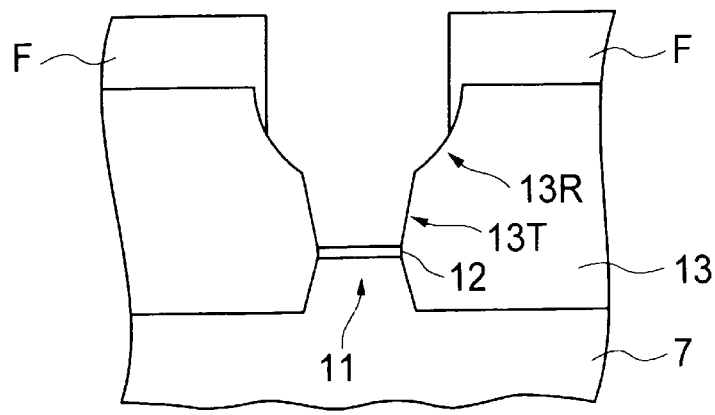
FIGS. 33A through 33C, 34A and 34B are cross-sectional views showing a process for making the upper write pole.
Figure 33B:
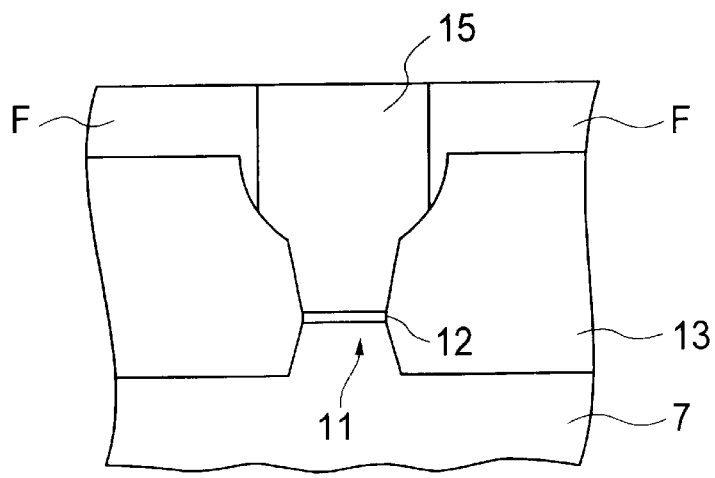
Figure 33C:
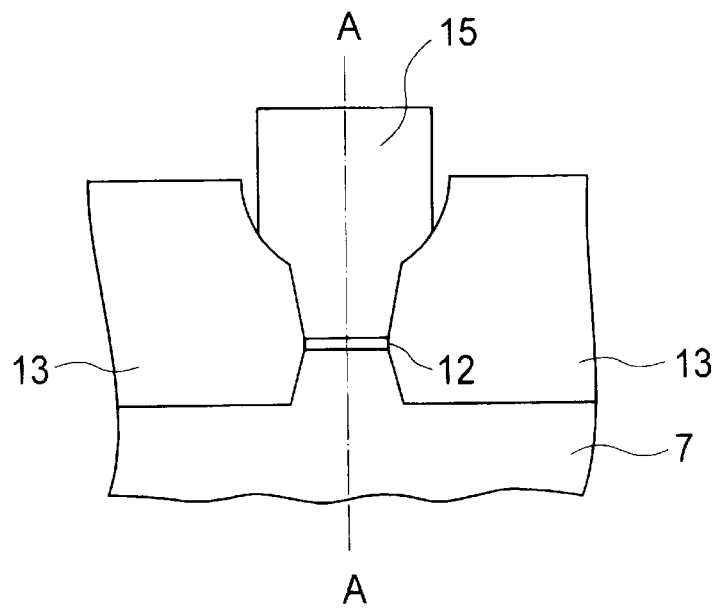

FIGS. 33A through 33C are cross-sectional views showing a process for making the upper write pole.

First as shown in FIG. 33A, using a resist, for example, a frame F for making the upper write pole is formed in the fully self-aligned trench having the curved recess 13R and the tapered recess 13T.

Next as shown in FIG. 33B, the upper write pole 5 is stacked. Plating or sputtering, for example, may be made for this stacking. When the resist frame is removed after the upper write pole 15 is stacked, the upper write pole 15 having no flat portions can be obtained as shown in FIG. 33C.

Figure 34A:
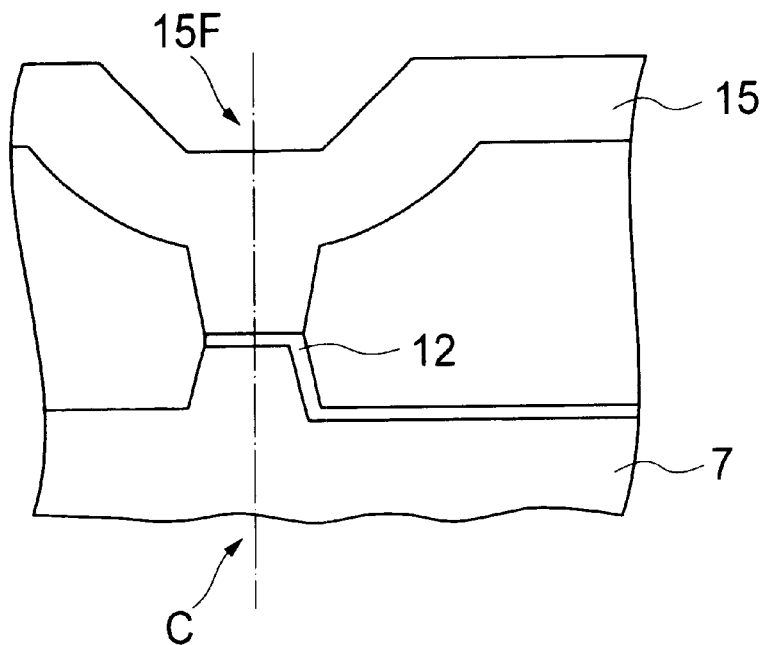

FIG. 34A is a cross-sectional view taken along the A—A line of FIG. 33C. After that, by cutting the structure along the cutting line C shown in FIG. 34A, the surface facing to a medium is obtained. However, if the structure is cut under the status shown in FIG. 34A, the top end 15E of the upper write pole will come too close to a medium, and undesirable writing by a magnetic flux from the top end 15E is worried about during recording.

Figure 34B:
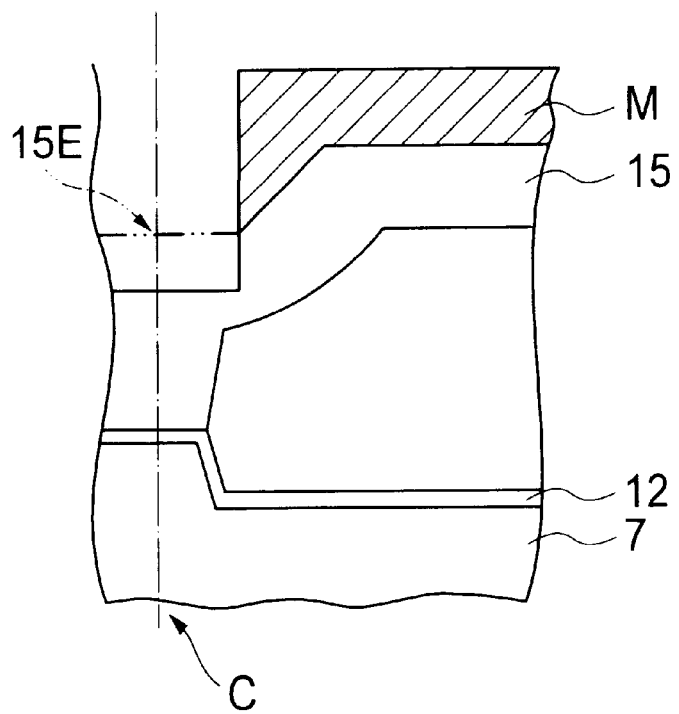

Therefore, to remove the top end 15E, as shown in FIG. 34B, a mask M of a resist, for example, is formed on the upper write pole, and the top end 15E not covered by the mask M is removed by etching such as IBE or ion milling or wet etching, for example. When the recess is made by removing the top end 15E, undesirable writing can be prevented as well.

Figure 35A:
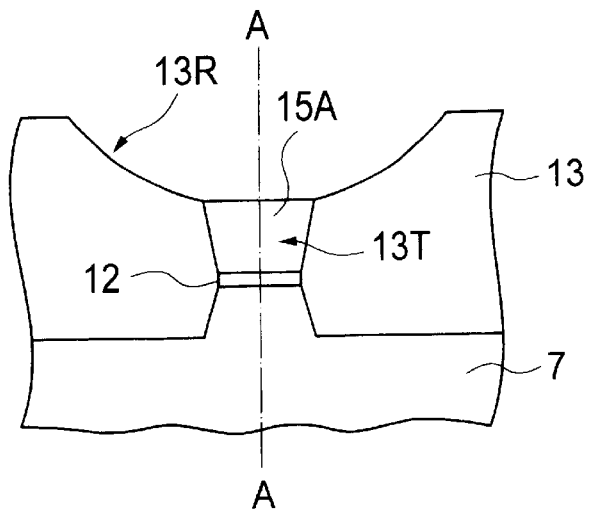
FIGS. 35A through 35C are cross-sectional views showing another process for making the recess in the upper write pole.
Figure 35B:
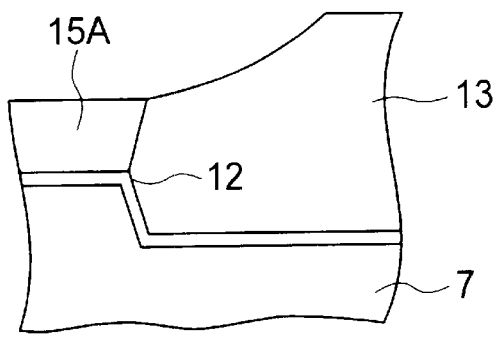
Figure 35C:
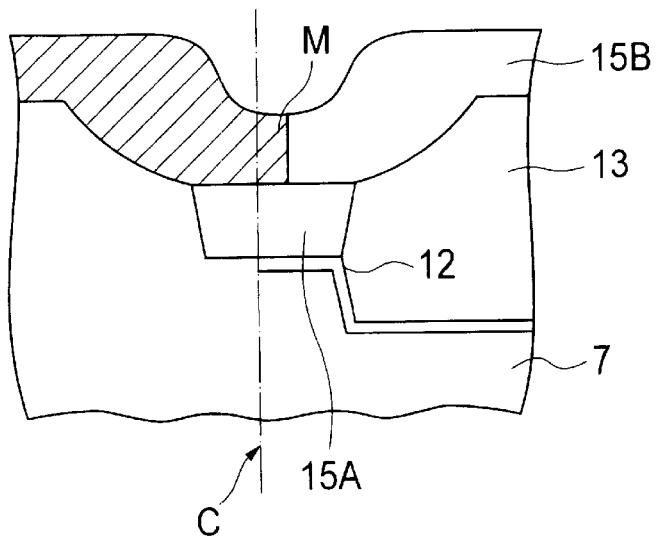

FIGS. 35A through 35C are cross-sectional views showing another process for making the recess in the upper write pole.

First as shown in FIG. 35A, by burying a magnetic material in the tapered recess 13 of the fully self aligned trench having the curved recess 13R and the tapered recess 13T, the tip portion 15A of the upper write pole is once formed. FIG. 35B is a cross-sectional view taken along the A—A line of FIG. 35A.

After that, as shown in FIG. 35C, a mask M of a resist, for example, is formed, and a magnetic material is buried by plating or sputtering, for example, to make a base portion 15B of the upper write pole. When the mask M is removed thereafter, the recording magnetic head having the upper write pole 15 whose top end is recessed from a medium can be obtained.

Heretofore, the first through twelfth embodiments of the invention were explained.

Next explained are specific examples of respective examples.

EXAMPLE 1

First shown is an example of the first embodiment explained above.

Figure 6A:
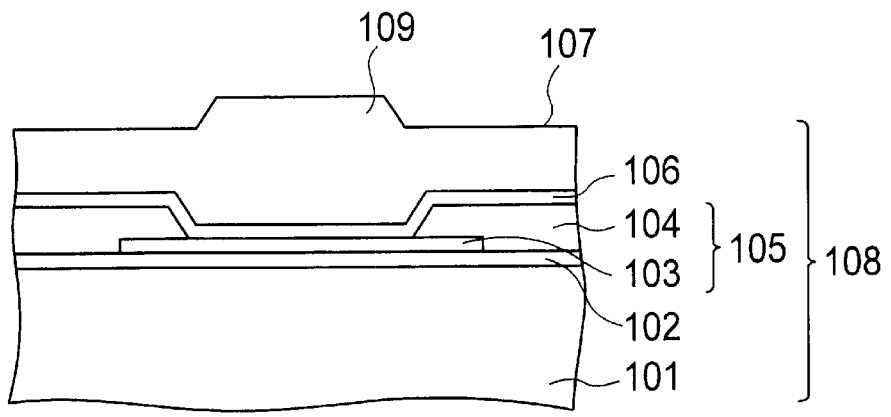
FIGS. 6A through 6C are rough diagrams showing a manufacturing process of a record/reproduce integral magnetic head according to Examples 1 and 2.
Figure 6B:
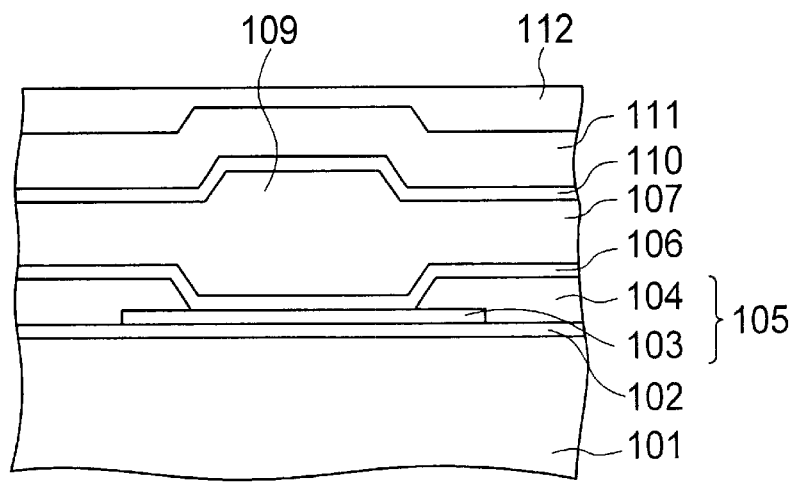

A manufacturing process of a record/reproduce integral magnetic head is explained with reference to FIGS. 6A through 7D. In FIGS. 7A through 7C, the part of the reproducing head is omitted from illustration.

First made on an $Al_2O_3$25 TiC substrate coated by an $Al_2O_3$ layer, for example, is a shield type MR head as the reproducing head. This shield type MR head is made by a typical manufacturing process of a shield type MR head. In FIG. 6A, numeral 101 denotes a lower magnetic shield layer formed on a $Al_2O_3$≅TiC substrate (not shown), for example. The lower magnetic shield layer 1 is made of a crystalline soft-magnetic material such as NiFe alloy or FeAlSi alloy, or an amorphous soft-magnetic material such as CoZrNb alloy. On the lower magnetic shield layer 101, a magnetoresistance effect film (MR film) 103 is formed via a lower reproducing magnetic gap 102. At opposite ends of the MR film 103, leads 104 are formed. These components make up an MR element portion 105. Further provided thereon is an upper magnetic shield layer 107. These elements constitutes a shield-type MR head 108 which functions as the reproducing head.

On the reproducing head composed of the shield-type MR head 108, an inductive type thin film magnetic head is formed.

First, after the upper surface of the lower write pole 107 commonly behaving as the upper magnetic shield layer of the shield type MR head 108 is smoothed by etch-back or polishing, for example, a projection 109 is made as a gap facing portion of the lower write pole 107 (FIG. 6A).

After that, a write magnetic gap 110 made of $AlO_x$ film about 0.2 μm thick, for example, is formed on the lower write pole 107 having the projection 109. Further formed on the write magnetic gap 110 is a non-magnetic material layer 111 of $SiO_x$, for example, to the thickness of 1.5 μm approximately (FIG. 6B).

Figure 6C:
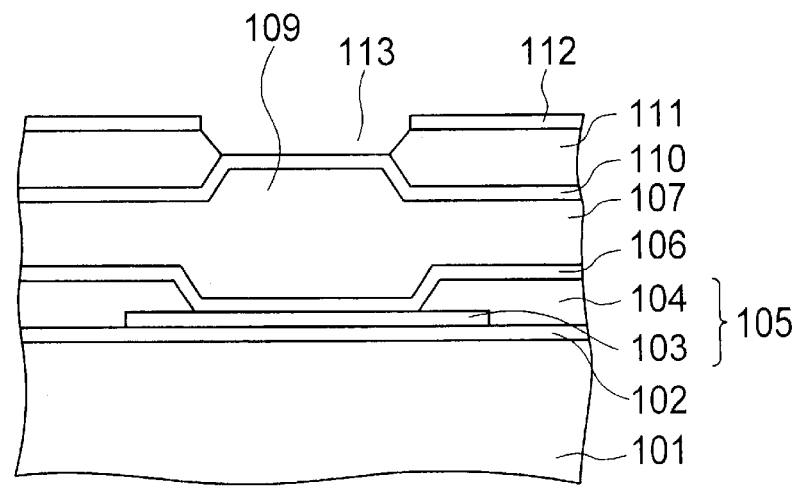
Figure 7A:
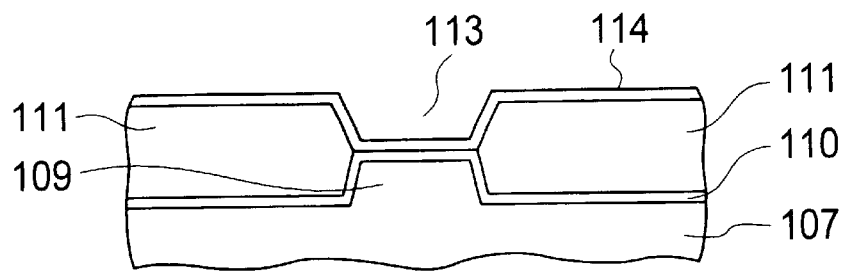
FIGS. 7A through 7D are rough diagrams showing a manufacturing process of a record/reproduce integral magnetic head according to Example 1.
Figure 7B:
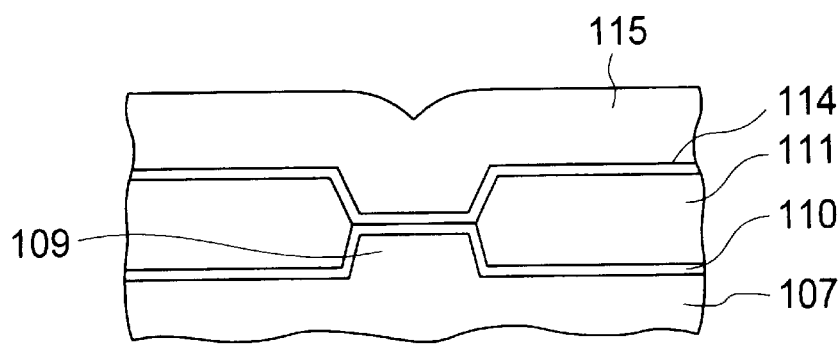
Figure 7C:
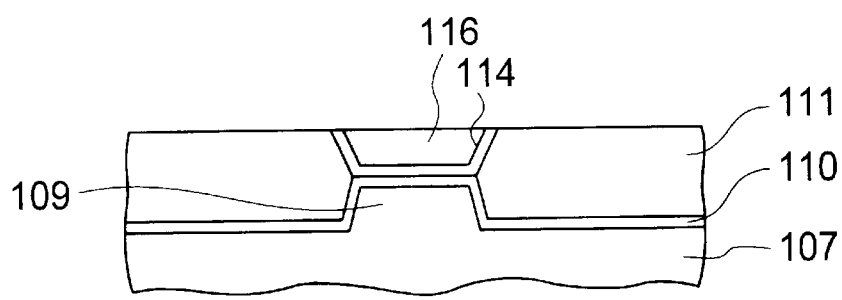

Thereafter, a resin layer 112 having a smoothing effect is formed on the non-magnetic material layer maintaining the contour of the projection 109, and the surface of the resin layer 112 is smoothed (FIG. 6C).

To make the resin layer 112 having the smoothing effect, a low polymeric resin such as novolac resin, for example, is used. Since such a low-polymeric resin fluidizes when heated to about 473 K, by annealing it after coating, its surface can be smoothed.

After that, etching like RIE (reactive ion etching) is conducted by using a fluoric-based reactive gas, for example. The etching condition is set here so that the etch rate of the non-magnetic material layer 111 is larger than that of the resin layer 112. Thus, the non-magnetic material layer 111 on the projection 109 is selectively removed by etching to make a recess 113. When the etching condition is determined to exhibit a selectivity for $SiO_x$, etc. forming the non-magnetic material layer 111 and etch the write magnetic gap 110 made of $AlO_x$, Si, $SiN_x$, or the like, at a slower rate, since the write magnetic gap 110 behaves as an etching stopper layer, a narrow gap structure can be made easily (FIG. 6C).

Through these steps, a multi-layered structure is obtained, which includes the lower write pole 107 having the projection 109, magnetic gap 110 made on the lower write pole 107, and the non-magnetic material layer 111 stacked on the magnetic gap 110, having the recess 113 in positional alignment with the projection 109 and exposing the magnetic gap layer 110 at the bottom of the recess 113.

Next as shown in FIG. 7A, after the resin layer 112 is removed, a plated electrode film 114, which may be made of about 100 nm thick NiFe, is stacked along the surface of the non-magnetic material layer 111 having the recess 113. For this process, sputtering exhibiting a good step coverage is preferably used to ensure uniform growth on the bottom and side walls of the recess (FIG. 7A).

After that, a soft-magnetic material layer 115 is grown on the plated electrode film by plating. During this process, the soft-magnetic material layer is formed to bury the recess 113 as well (FIG. 7B).

Thereafter, a part of the soft-magnetic material layer 111 other than the part buried in the recess 113 is removed by etching like CMP, etch-back, for example, to flush the surface. As a result, an upper write pole tip portion 116 is obtained (FIG. 7C).

Figure 7D:
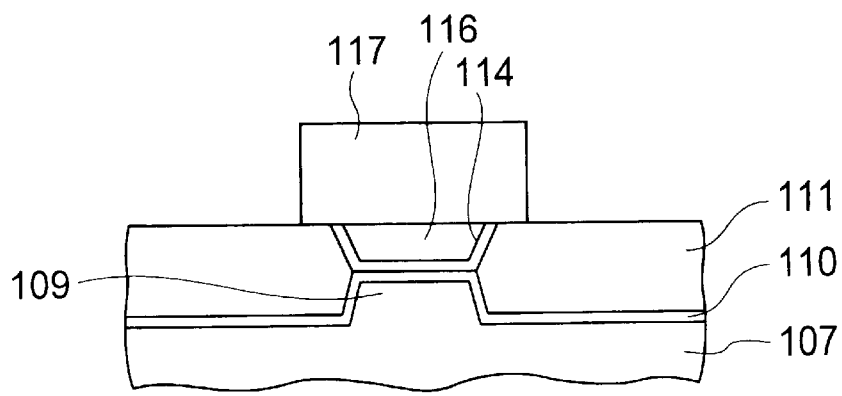

After that, on the non-magnetic material layer 111 on the back side of the upper write pole tip portion 116, an insulating layer of polyimide resin, for example, burying a coil is formed (not shown). Thereafter, a soft-magnetic material for forming the other part of the upper write pole is stacked, and processed by ion milling to make the other part 117 of the upper write pole. Further formed is a protective film of $AlO_x$, for example, not shown. Thus the major part of the record/reproduce integral head is completed (FIG. 7D).

EXAMPLE 2

Next shown is an example of the second embodiment already explained.

Figure 8A:
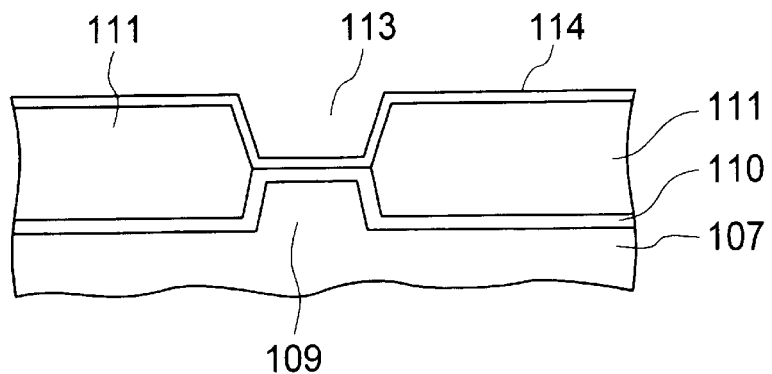
FIGS. 8A through 8C are rough diagrams showing a manufacturing process of a record/reproduce integral magnetic head according to Example 2.
Figure 8B:
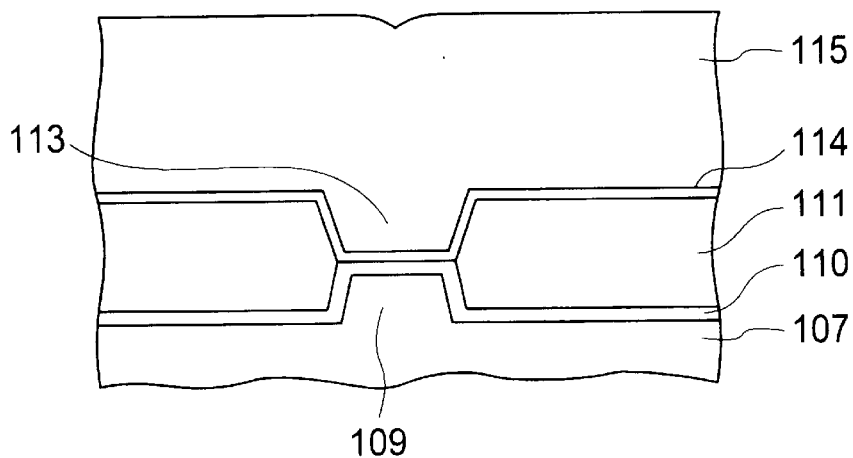
Figure 8C:
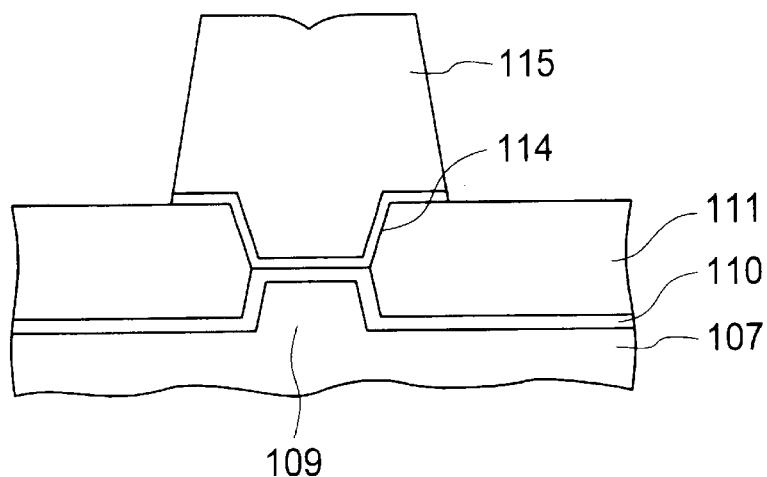

Here is explained a manufacturing process of a record/reproduce integral magnetic head with reference to FIGS. 6A through 6C and 8A through 8C. In FIGS. 8A through 8C, the part of the reproducing head is omitted from illustration.

Similarly to Example 1, first made on the substrate is the shield type MR head as the reproducing head. Further made thereon is an inductive type thin film magnetic head as the recording head. To fabricate the inductive type thin film magnetic head as the recording head, the steps shown in FIGS. 6A through 6C were carried out in the same manner as Example 1.

Through these steps, a multi-layered structure was obtained, which includes the lower write pole 107 having the projection 109, magnetic gap 110 made on the lower write pole 107, and the non-magnetic material layer 111 stacked on the magnetic gap 110, having the recess 113 in positional alignment with the projection 109 and exposing the magnetic gap layer 110 at the bottom of the recess 113.

After the step shown in FIG. 6C, on the non-magnetic material layer 111 behind the recess 113, an insulating layer of polyimide resin, for example, burying a coil of Cu, for example, is formed (not shown).

Subsequent steps are explained with reference to FIGS. 8A through 8C.

Next, following the contour of the recess 113 made in the non-magnetic material layer 111, a plated electrode film 114 of about 100 nm thick NiFe, for example, is formed. For this process, sputtering exhibiting a good step coverage is preferably used to ensure uniform growth on the bottom and side walls of the recess (FIG. 8A).

After that, a soft-magnetic material layer 115 is grown on the plated electrode film 114 by plating. During this process, the soft-magnetic material layer 114 is formed also to bury the recess 113 (FIG. 8B).

Thereafter, the soft-magnetic material layer 115 is shaped into a desired shape of upper write pole by ion milling. The upper write pole is made up of two parts, namely, the plated electrode film 114 and the soft-magnetic material layer 115 made by plating. Further formed is a protective film of $AlO_x$, for example, not shown. Thus the major part of the record/reproduce integral head is completed (FIG. 8C).

EXAMPLE 3

Next shown is an example of the third embodiment already explained.

Here is explained a manufacturing process of a record/reproduce integral magnetic head with reference to FIGS. 9A through 9C, 10A through 10D, 11A and 11B. In these figures, the part of the reproducing head is omitted from illustration.

Similarly to Example 1, first made on the substrate is the shield type MR head as the reproducing head. Further made thereon is an inductive type thin film magnetic head as the recording head. A manufacturing process of this inductive type thin film magnetic head is explained with reference to FIGS. 9A through 9C, 10A through 10D, 11A and 11B.

Figure 9A:
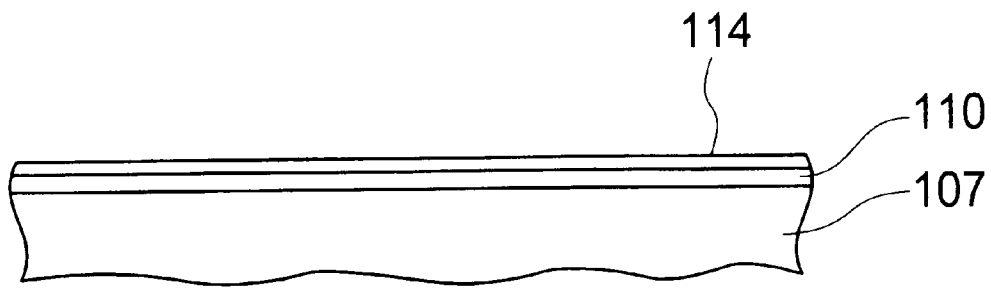
FIGS. 9A through 9C are rough diagrams showing a record/reproduce integral magnetic head according to Examples 3 and 4.

After the upper surface of the lower write pole 107 which commonly forms the upper magnetic shield layer of the shield type MR head is smoothed by etch-back or polishing, for example, a 0.2 $\mu$m thick $SiO_x$ film, for example, is formed as write magnetic gap 110, and a Ti/NiFe film, for example, is formed thereon as the plated electrode film 114 (FIG. 9A).

Figure 9B:
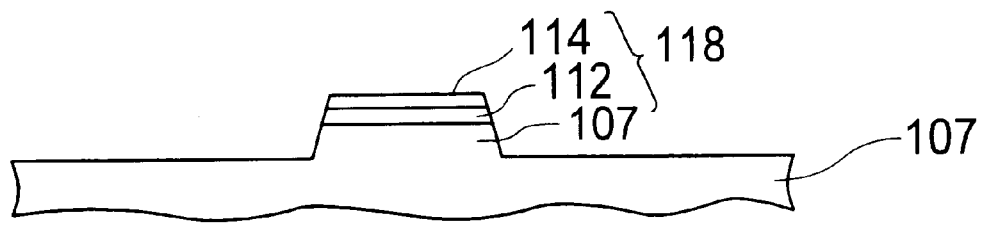

Thereafter, a projection 118 having a width corresponding to the recording track width is made. The projection 118 is made up of, from the top, the plated electrode film 114, write magnetic gap 112 and a part of the lower write pole 107. For making the projection 118, typical PEP (photo engravement process) and ion milling are used (FIG. 9B).

Through these steps, a multi-layered structure is obtained, which includes the lower write pole 107 having the projection, magnetic gap 112 made on the projection tip, and plated electrode film 114 formed on the magnetic gap 112.

Figure 9C:
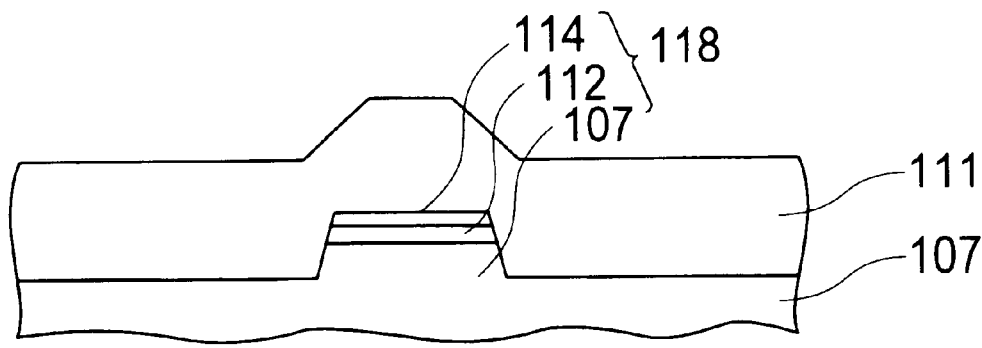

After that, a non-magnetic layer 111 having a thickness of about 1.5 micrometers is formed (FIG. 9C).

Figure 10A:
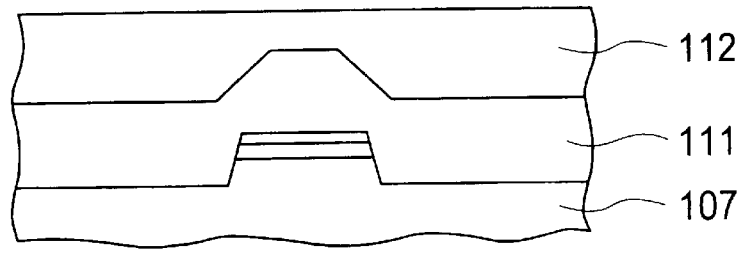
FIGS. 10A through 10D are rough diagrams showing a record/reproduce integral magnetic head according to Examples 3 and 4.

After that, a resin layer 112 having a smoothing effect is formed on the non-magnetic material layer 111 following the contour of the projection 118, and the surface of the resin layer 112 is smoothed (FIG. 10A).

To make the resin layer 112 having the smoothing effect, a low polymeric resin such as novolac resin, for example, is used. Since such a low-polymeric resin fluidizes when heated to about 473 K, by annealing it after coating, its surface can be smoothed.

Figure 10B:
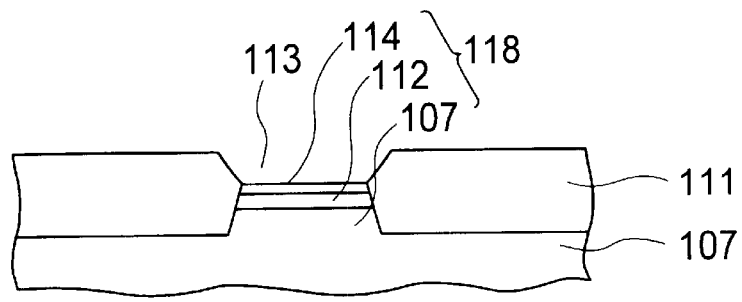

After that, etching like RIE is conducted by using a fluoric-based reactive gas, for example. The etching condition is set here so that the etch rate of the non-magnetic material layer 111 is larger than that of the resin layer 112. Thus, the non-magnetic material layer 111 on the projection 118 is selectively removed by etching to make a recess 113. When the etching condition is determined to exhibit a selectivity for $SiO_x$, etc. forming non-magnetic material layer 111 and etch the plated electrode film 114 made of a metal at a slower rate, since the plated electrode film 114 behaves as an etching stopper layer, a narrow gap structure can be made easily (FIG. 10B).

Through these steps, obtained on the lower write pole 107 is the non-magnetic material layer having the recess 113 in positional alignment with the projection 118 and exposing the plated electrode film 114 at the bottom of the recess 113.

Figure 10C:
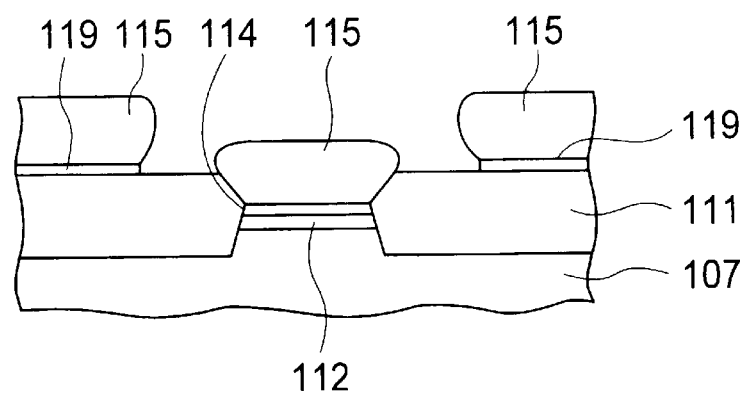

After that, a soft-magnetic material layer 115 is grown on the plated electrode film by plating. Prior to this process, for the purpose of reducing the current profile from a position to another during plating, a conductive layer 119 as a plated electrode film is formed also in a location distant from the recess 113 by about 10 $\mu$m so as to make a configuration similar to a frame plating method. Here is preferably employed the lift-off method to prevent any damage to the recess. Subsequently, the soft-magnetic material layer is grown on the plated electrode films 114, 119. During this process, the plated electrode film 115 is formed to bury the recess 113 as well (FIG. 10C).

Figure 10D:
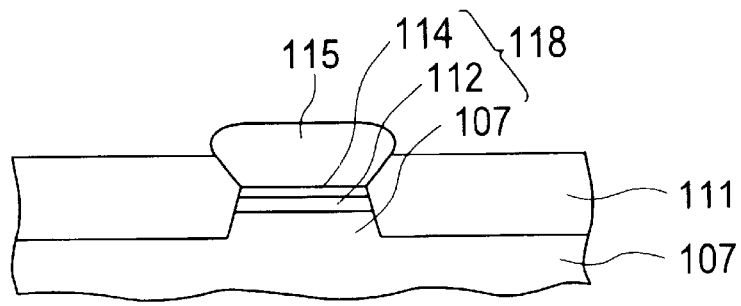

Since the soft-magnetic material layer grown on the plated electrode film 119 is an unnecessary part, it is removed together with the plated electrode film 119 in the next step. In this case, chemical etching is conducted by using a resist mask (FIG. 10D).

Figure 11A:
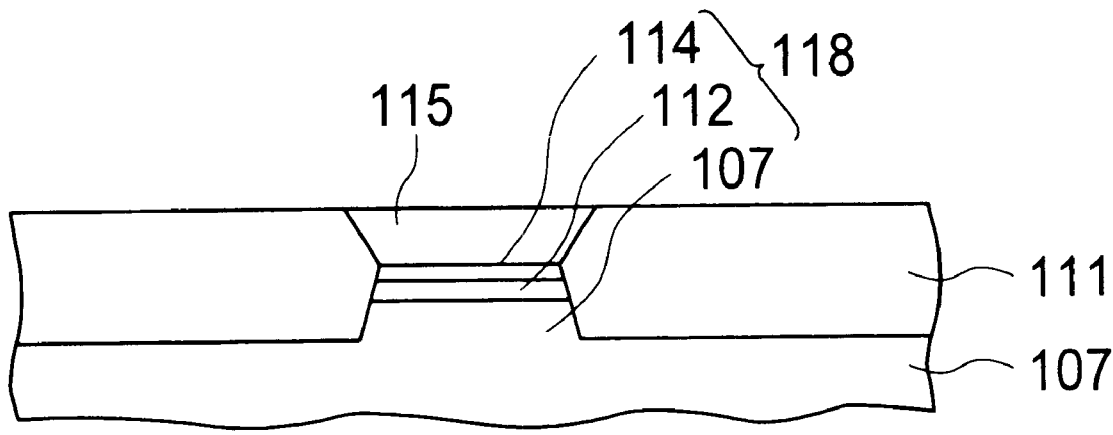
FIGS. 11A and 11B are rough diagrams showing a manufacturing method of a record/reproduce integral magnetic head according to Example 3.

Thereafter, a part of the soft-magnetic material layer 111 other than the part buried in the recess 113 is removed by etching like CMP, etch-back, for example, to flush the surface. As a result, the upper write pole tip portion is made up of the plated electrode film 114 and the soft-magnetic material layer 115. If the soft-magnetic material layer is grown not to overflow from the recess 113 by thinning the plated layer, the smoothing process may be omitted (FIG. 11A).

Figure 11B:
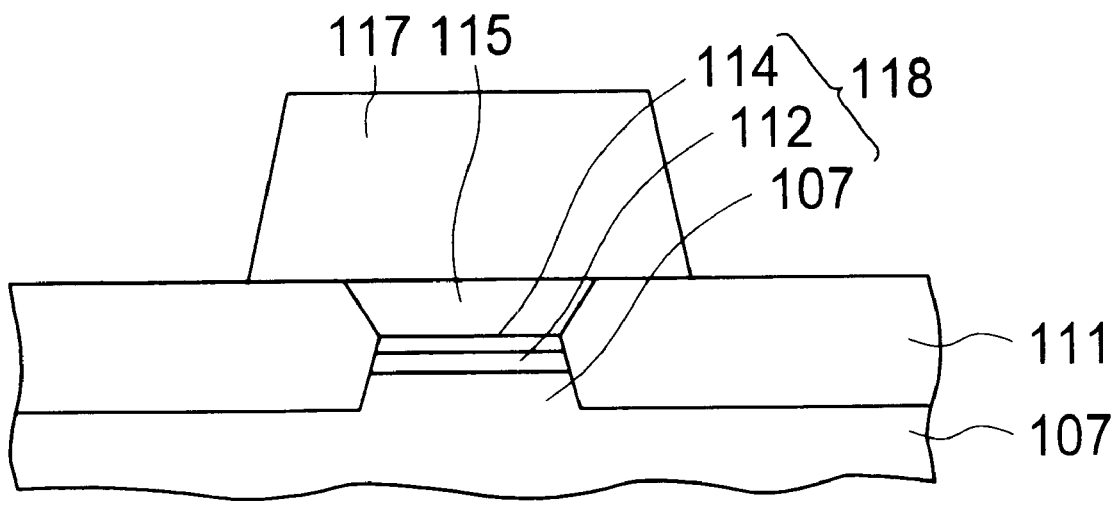

After that, on the non-magnetic material layer 111 on the. back side of the upper write pole tip portion 116, an insulating layer of polyimide resin, for example, burying a coil of Cu, for example, is formed (not shown). Thereafter, a soft-magnetic material for forming the upper half 117 of the upper write pole is stacked, and processed by ion milling to make the upper half 117 of the upper write pole (FIG. 11B).

Further formed is a protective film of $AlO_x$, for example, not shown. Thus the major part of the record/reproduce integral head is completed.

EXAMPLE 4

Next shown is an example of the fourth embodiment already explained.

Here is explained a manufacturing process of a record/reproduce integral magnetic head with reference to FIGS.

9A through 9C, 10A through 10D, and 12A through 12D. Similarly to Example 1, first made on the substrate is the shield type MR head as the reproducing head. Further made thereon is an inductive type thin film magnetic head as the recording head. A manufacturing process of this inductive type thin film magnetic head is explained with reference to FIGS. 9A through 9C, 10A through 10D, and 12A through 12D.

Figure 12A:
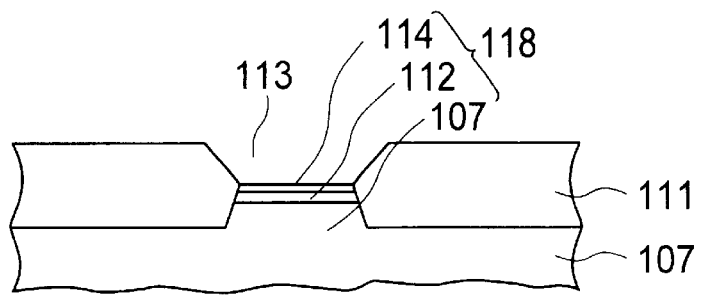
FIGS. 12A through 12D are rough diagrams showing a manufacturing method of a record/reproduce integral magnetic head according to Example 4.
Figure 12B:
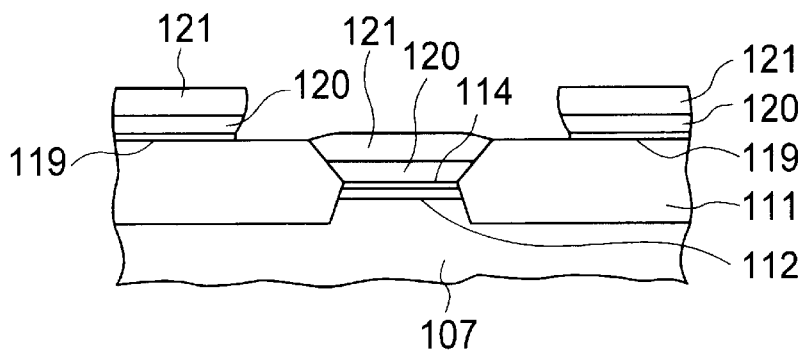

The steps shown in FIG. 9A through FIG. 10B were carried out in the same manner as Example 3 (FIG. 12A).

After that, a soft-magnetic material magnetic material layer of A120 is grown to about 0.3 μm on the plated electrode film 114 by plating. Again by plating, a soft-magnetic material layer B121 if grown to about 0.5 μm. For the head property, saturated magnetic flux densities Bs of the soft-magnetic materials A and B preferably satisfies A>B. These two layers A, B and the plated electrode, film 114 make up the upper write pole tip portion. Here is used a method of locating the conductive layer 119 to be used as the plated electrode film on the non-magnetic material layer 111 in order to stabilize the plating composition (FIG. 1B).

Figure 12C:
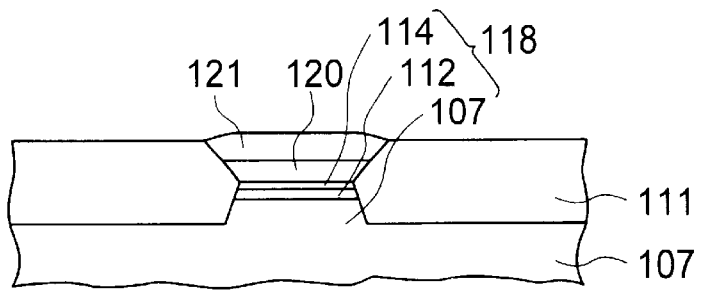

Subsequently, the soft-magnetic material layer grown on the plated electrode film 119 is removed together with the plated electrode film 119 by chemical etching (FIG. 12C).

Figure 12D:
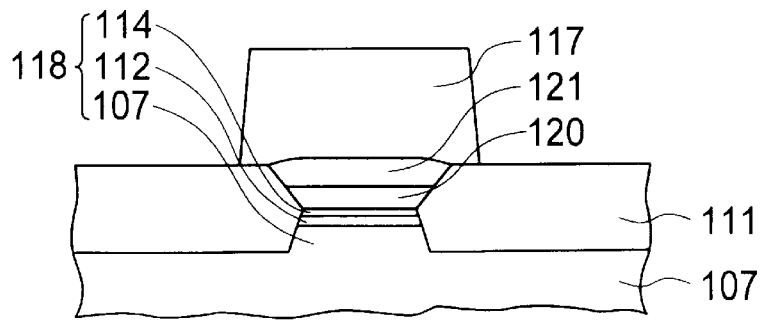

After that, on the non-magnetic material layer 111 on the back side of the upper write pole tip portion, an insulating layer of polyimide resin, for example, burying a coil of Cu, for example, is formed (not shown). Thereafter, a soft-magnetic material for forming the upper half 117 of the upper write pole is stacked, and processed by ion milling to make the upper half 117 of the upper write pole. Further formed is a protective film of AlO$_x$, for example, not shown. Thus the major part of the record/reproduce integral head is completed (FIG. 12D).

EXAMPLE 5

Next shown is an example of the sixth embodiment already explained.

FIGS. 36A through 37F are cross-sectional views showing a major part of a manufacturing process of a recording magnetic head according to the example. In these figures, the part of the reproducing head is omitted from illustration.

First made on an Al$_2$O$_3$≅TiC substrate, for example, is a shield type MR head as the reproducing head. This shield type MR head is made by a typical manufacturing process of a shield type MR head.

On the reproducing head composed of the shield-type MR head, an inductive type thin film magnetic head is formed.

Figure 36A:
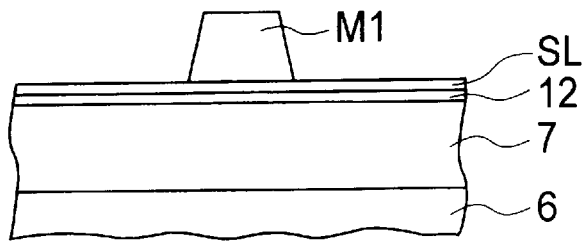
FIGS. 36A through 37F are cross-sectional views showing a major part of a manufacturing process of a recording magnetic head according to Example 5.
Figure 36B:
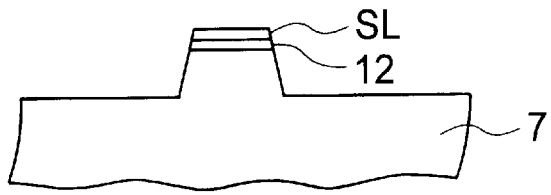

First as shown in FIG. 36A, after the upper surface of the lower write pole 7 commonly behaving as the upper magnetic shield layer of the shield type MR head was smoothed by etch-back or polishing, for example, a magnetic recording gap 12 made of AlO$_x$ film, for example, was stacked to about 0.2 μm on the lower write pole 7.

Thereafter, a seed layer SL which will behaves as an electrode upon making the upper write pole by plating is stacked. The seed layer SL used here was a Ni$_{50}$Fe$_{50}$ (at %) film, about 0.2 μm thick.

After that, a resist mask M1 of PEP for the purpose of making the projection 11 of the lower write pole to be opposed to the gap was made by typical lithography in a size which was 2 μm thick and 1 μm wide, approximately.

After that, the lower write pole 7 was etched by ion milling using Ar ions, and the resist mask M1 left there was removed by oxygen ashing, for example. In this milling, by setting the Ar accelerating voltage at 500 V and fixing the incidence angle at 0° etching was continued for 20 minuets, and then etching was continued for 15 minutes at the incidence angle of 70°. The projection 11 of the lower write pole made in this manner was confirmed to be 0.5 μm high, 0.9 μm wide, and have the tapered angle of 85 degrees, through SEM (scanning electron microscopy) (FIG. 16B).

Figure 36C:
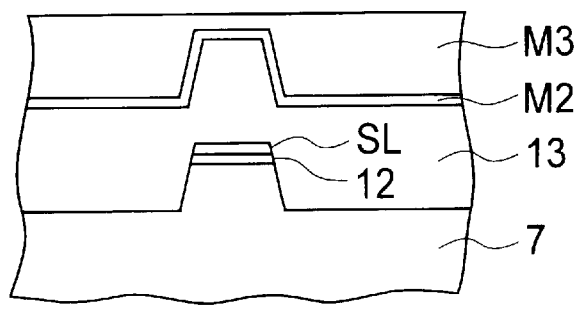

After that, a 2.8 μm thick SiO$_2$ non-magnetic layer 13 was formed on the lower write pole projection 11 by Si reactive sputtering, introducing a mixed gas of oxygen and argon while applying the bias of 150 W in an RF sputtering apparatus. Thereafter, using the same sputtering apparatus, after making a 0.3 μm thick mask M2 by sputtering Al$_2$O$_3$ target, a resin layer M3 having a smoothing effect (in this example, OFPR manufactured by Tokyo Ohka Corporation) was coated to 1.3 μm and baked (cured) in an oven heated to 200° C. to smooth it (FIG. 36C).

The mask M2 used here may be a metal, for example, instead of oxides or nitrides. Used as the resin layer M3 for the smoothing purpose is a low polymeric resin such as Novolac resin. Since such a low-polymeric resin fluidizes when heated to about 473 K, by annealing it after coating, its surface can be smoothed.

Figure 36D:
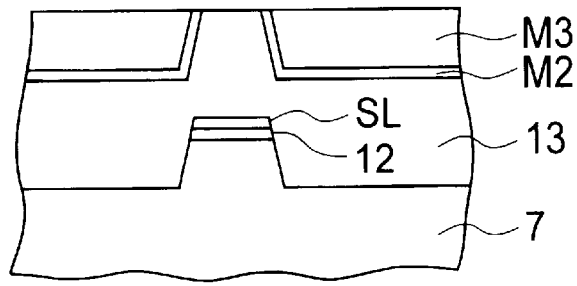

After that, etching is conducted by RIE or ICP using fluoric-based reactive gas, IBE using Ar gas, or RIBE (reactive ion beam etching) using a mixed gas of Ar gas and fluoric-based gas, for example. The etching condition is set here so that the etch rate be substantially equal for the resin layer M3, mask M2 and non-magnetic layer 13, and etching is continued until a predetermined width of the non-magnetic layer 13 is exposed. In this example, RIE was used as the etching method, and etching was continued until the exposed width reaches approximately 1.0 μm. The exposed width was actually confirmed to be 0.9 μm by SEM. Conditions of this etching by RIE are: using CHF$_3$ as a fluoric-based reactive gas, setting the degree of etching vacuum at 0.6 Pa, and the etch rate being 250 A/min. for Al$_{2O3}$ and 230 A/min. for the smoothing resin (FIG. 36D).

Figure 37A:
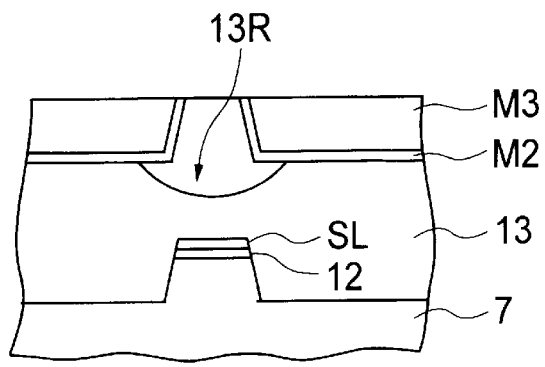

After that, the curved recess 13R for making the upper write pole is made by isotropic etching such as dry etching like CDE or ICP using fluoric-based reactive gas, and wet etching by acetic acid/nitric acid-based etchant (FIG. 37A).

In this etching process, selection ratio (E1/E2) between the etch rate (E1) of the resin layer M3 and the mask layer M2 and the etch rate (E2) of the non-magnetic material layer 13 is preferably as large as possible. In dry etching, conditions and the apparatus design may disturb increasing the selection ratio. Even then, the selection ratio should not be less than 3, and preferably should not less than 5. By so setting the selection ratio, the resin layer M3 and the mask layer M2 can be made thin. In this example, by using CDE as the etching method, etching was carried out until the depth of the curved recess 13R reached about 1.0 μm. In that case, using a mixed gas of CF$_4$ and O$_2$ as the reactive gas, flowing them at the flow rate of 210/90 SCCM respectively, fixing the pressure at 70 Pa and the applied power at 700 W, etching was continued for 60 minutes. The sample after etching was confirmed to have an isotropically etched cross-sectional surface and the depth of 1.0 μm through observation of its cross-sectional surface by SEM. At that time, there was no substantial change in thickness of Al$_2$O$_3$ forming the mask layer M2, and it was confirmed therefrom that the selection ratio between the etch rate of SiO$_2$ forming the non-magnetic material layer 13 and Al$_2$O$_3$ forming the mask layer M2 was substantially infinite.

Figure 37B:
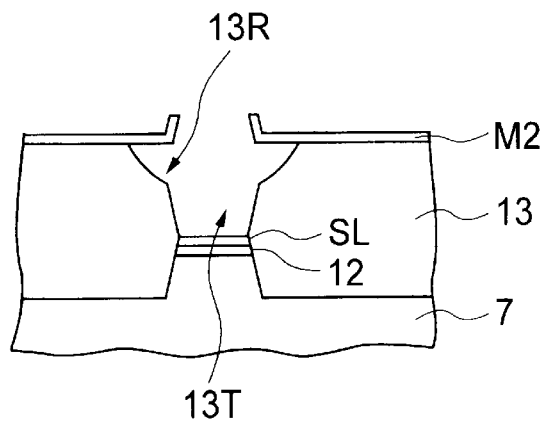

Next as shown in FIG. 37B, the tapered recess 13T is made by anisotropic etching. Usable as this anisotropic etching are RIE or ICP using fluoric-based reactive gas, IBE using Ar gas, or RIBE using a mixed gas of Ar gas and fluoric-based gas, for example. Since the purpose of this etching is making the tapered recess 13T, it is desirable as the etching condition that the selection ratio relative to the mask is high and the directivity is high. However, the selection ratio relative to the mask need not be so high as required upon making the curved recess 13R. In this example, using a RIE apparatus, flowing $CHF_3$ as a fluoric-based gas at 50 SCCM and fixing the pressure at 1 Pa, etching was continued for 15 minutes. At that time, the etch rate was 230 A/min. for $Al_2O_3$ as the second non-magnetic layer and 700 A/min. for $SiO_2$ as the first non-magnetic layer, and 120 A/min. for OFPR as the smoothing resin. The tapered recess made under these etching conditions had the depth of 1.0 μm, the bottom width of 0.9 μm, and the tapered angle of approximately 80 degrees.

Figure 37C:
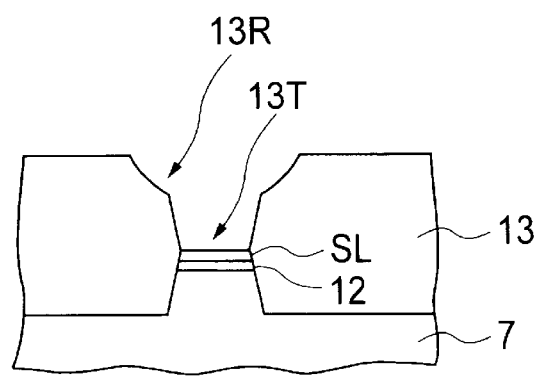

Next as shown in FIG. 37C, the resin layer M3 and the mask layer M2 are removed by wet etching or oxygen ashing, for example. In this example, since they were removed upon the preceding etching for making the tapered recess 13T, this process was omitted. In the case where the seed layer SL for making the upper write pole, or the like, is not formed yet on the lower write pole projection 11, etc. a seed layer SL, or the like, for the plating purpose may be made after this process.

Figure 37D:
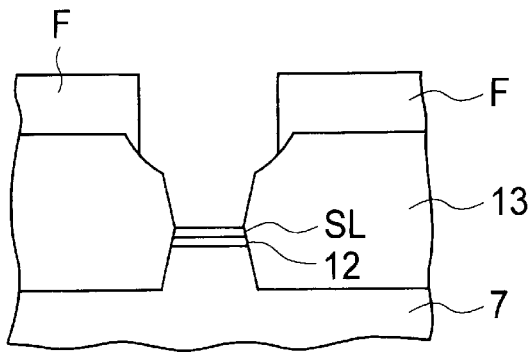

Next as shown in FIG. 37D, for the purpose of regulating the configuration of the upper write pole 15, a resist frame F is formed in the curved recess 13R. In this example, the resist frame F was made in a position about 0.2 μm apart from the end of the curved recess 13R with the height of about 4 μm.

Figure 37E:
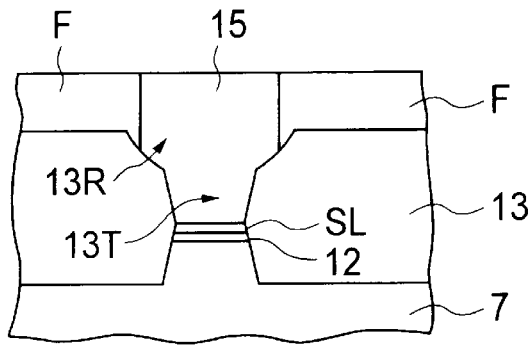

Next as shown in FIG. 37E, the upper write pole 15 was made by plating, using the seed layer SL on the upper write pole projection 11. In this case, the magnetic material may be changed in composition between the part nearer to the lower write pole (inside the tapered recess 13T) and the part inside the curved recess 13 in order to improve the recording efficiency and prevent side writing. Various combinations thereof are possible, such as making a magnetic material of $Ni_{50}Fe_{50}$ (at %) with a high saturation flux density (Hi-Bs) in the tapered recess 13T while making a soft-magnetic material (S-Bs) of $Ni_{80}Fe_{20}$ (at %) in the curved recess 13R, or making a magnetic material of $Fe_{80}Co_{20}$ (at %) with a high saturation flux density (Hi-Bs) in the tapered recess 13T while making a soft-magnetic material (S-Bs) of $Ni_{80}Fe_{20}$ (at %) in the curved recess 13R. Although various magnetic materials are employable as the combination used here, this layer may be made as a single layer as well.

The method for stacking the magnetic material is not limited to plating, but sputtering, CVD or vapor deposition is also usable. In this example, typical electric plating was used to make the upper write pole, and a NiFe alloy having the film composition of $Ni_{45}Fe_{50}$ (at %) with Bs of 1.5 (T) and the thickness around 3 μm was actually made.

Figure 37F:
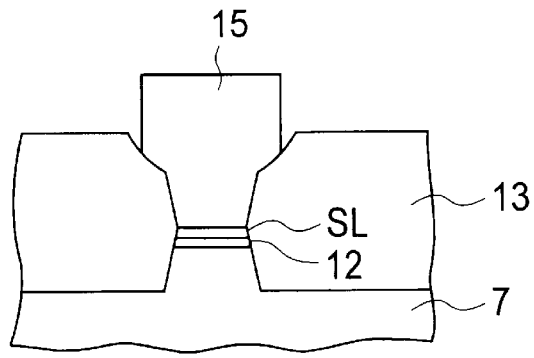

Next as shown in FIG. 37F, by removing the resist frame F, the process of fabricating the upper write pole 15 is completed.

In the present example, the upper write pole 15 actually obtained was approximately 2.5 μm wide and 3 μm high. Before or after the above-explained steps, or in the course thereof, a step of making a coil for generating a magnetic field, step of protection by PEP, or the like, may be added, if the process requires.

With the upper and lower write poles having the converging configuration obtained through those steps, by further carrying on the magnetic head manufacturing process, the magnetic recording head was made and actually used for magnetic recording. It was confirmed thereby that this is a magnetic recording head much less in side writing than conventional type heads.

EXAMPLE 6

Next shown is an example of the seventh embodiment already explained.

FIGS. 38A through 38E are cross-sectional views showing a major part of a manufacturing process of a recording magnetic head according to the example. In these figures, the part of the reproducing head is omitted from illustration.

Figure 38A:
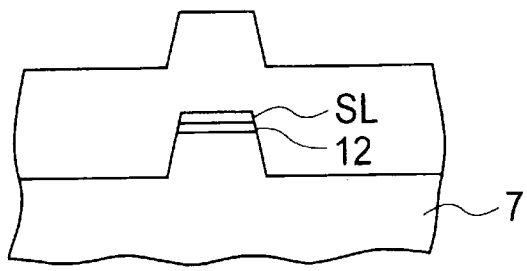
FIGS. 38A through 38E are cross-sectional views showing a major part of a manufacturing process of a recording magnetic head according to Example 6.

First as shown in FIG. 38A, layers were stacked up to the non-magnetic material layer 13A. That is, in the same manner as Example 5 already explained, after making lower write pole 7 having the projection 11 0.5 μm wide and 0.3 μm high, magnetic gap layer 12 of 0.15 μm thick $Al_2O_3$, and seed layer SL of 0.1 μm thick $Ni_{50}Fe_{50}$ (at %), 1.0 μm $SiO_2$ was stacked as the non-magnetic material layer 13A in self alignment with the projection 11 by reactive sputtering.

Figure 38B:
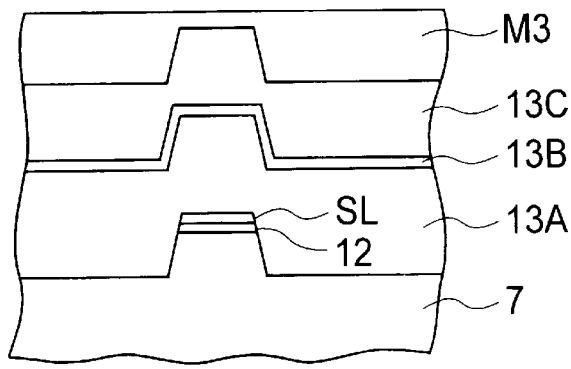

Next as shown in FIG. 38B, a non-magnetic material layer 13B, non-magnetic material layer 13C and resin layer M3 were coated on the non-magnetic material layer 13A to smooth the surface. The non-magnetic material layer 13B is preferably made of a material which functions as an etching stopper or etching monitor (for example, emission monitor) upon an isotropic etching process. In this Example, silicon (Si) exhibiting a very large emission intensity during plasma etching was stacked to the thickness of 20 μm.

Also when a nitride compound such as SiN, TiN or AlN is used as the material of the non-magnetic material layer 13B, it can be used as an etching stopper or etching monitor.

As the material of the non-magnetic material layer 13C, this Example used the same material as the non-magnetic material layer 13A, and it was stacked to the thickness of 1.0 μm. However, not limited to this, the material of the non-magnetic material layer may be any non-magnetic insulator that can be isotropically etched.

Figure 38C:
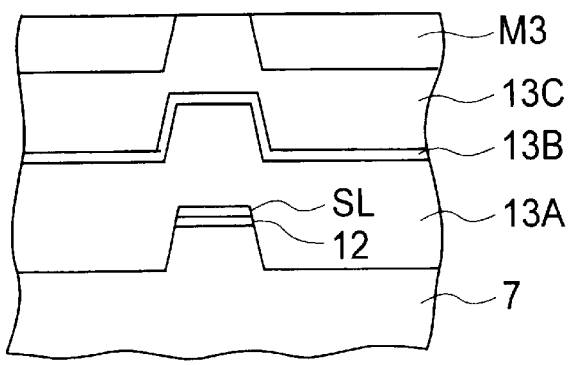

Next as shown in FIG. 38C, in the same manner as Example 5, smoothing etching was conducted until the non-magnetic material layer 13C is exposed on the surface by the width of about 0.3 μm. The Inventor measured the configuration of the non-magnetic material layer 13C by length-measuring SEM, and confirmed that the exposed width was a predetermined size. At that time, the remainder thickness of the resin layer M3 was about 0.4 μm.

Figure 38D:
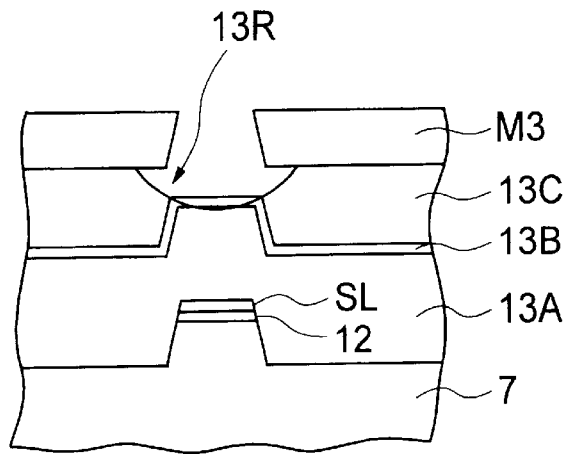

Next as shown in FIG. 38D, using the resin layer M3 as a mask, isotropic etching by CDE was carried out under the same condition as Example 1, and the curved recess 13R was made by etching or about 1 μm. At that time, an emission spectral monitor was set on a side surface of the CDE chamber to watch the progress of the etching, and the emission status of silicon (Si) was monitored at all times during the etching. As a result, at the time when the etching front appeared to reach the silicon layer, the intensity of the emission spectrum of silicon suddenly increased. Then, etching was stopped at the point of time when the intensity decreased.

After finishing the isotropic etching process, the configuration after etching was observed by FIB-SEM. Etching was actually stopped when the surface of the non-magnetic material layer 13A was slightly etched. The remainder thickness of the resin layer M3 was about 0.3 μm.

Figure 38E:
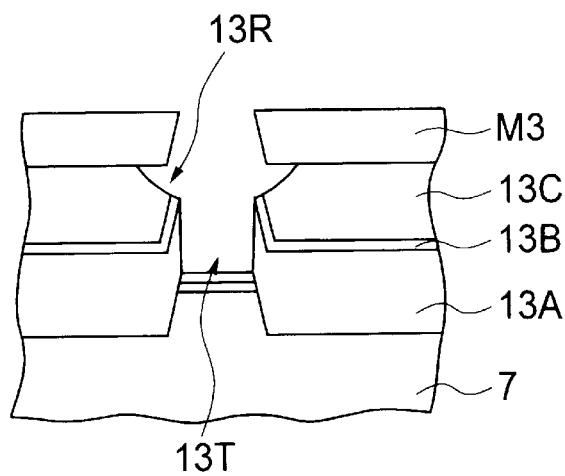

Next as shown in FIG. 38E, using the remainder resin layer M3 as a mask, anisotropic etching was carried out by ICP. At that time, using $CHF_3$ as the reactive gas, the non-magnetic material layer 13A was anisotropically etched by about 0.5 μm, to make out the tapered recess 13T.

After that, the resin layer M3 was removed by a resist removal process used in a typical semiconductor manufacturing process. The cross-sectional configuration was observed by SEM, and it was confirmed that the trench had the curved recess 13R and the tapered recess 13T with a very fine etched surface. After that, in the same manner as Example 1, the head property was evaluated, and a good recording property was confirmed.

EXAMPLE 7

Next explained is an example of the ninth embodiment already explained.

FIGS. 39A through 39H are cross-sectional views showing the major part of a manufacturing process of a recording magnetic head according to the Example. In these figures, the part of the reproducing head is omitted from illustration.

Figure 39A:
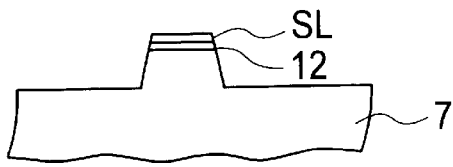
FIGS. 39A through 39H are cross-sectional views showing the major part of a manufacturing process of a recording magnetic head according to the Example 7.

First as shown in FIG. 39A, the magnetic gap layer 12 and the seed layer SL were made on the projection 11 of the lower write pole 7. More specifically, in the same manner as Example 5, the lower write pole 7 having a 0.5 μm wide and 0.3 μm high projection 11 was made, the magnetic gap layer 12 of 0.15 μm thick $Al_2O_3$ was formed thereon, and the seed layer SL of 0.1 μm thick $Ni_{50}Fe_{50}$ (at %) was stacked thereon.

Figure 39B:
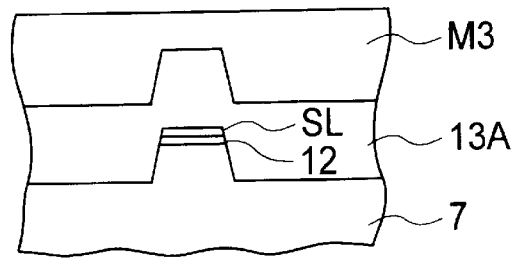

Next as shown in FIG. 39B, after 1.5 μm thick $Al_2O_3$ was stacked as the non-magnetic material layer 13A in self alignment with the projection 11 by RF sputtering, the smoothing resin layer M3 was coated to the thickness of about 1.0 μm, and baked to smooth the surface. Then, etching was conducted by RIE until a part of the non-magnetic material layer 13 as wide as 0.3 μm was exposed to the surface.

Figure 39C:
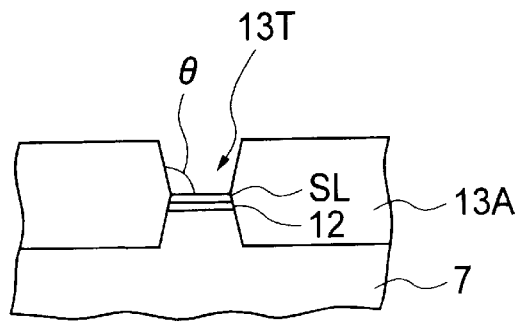

Next as shown in FIG. 39C, using the resin layer M3 as a mask, the tapered recess 13T was made by ICP etching. As a result, the trench having the recess 13T with the taper angle − of 70 degrees and the 0.5 μm wide bottom was obtained.

Figure 39D:
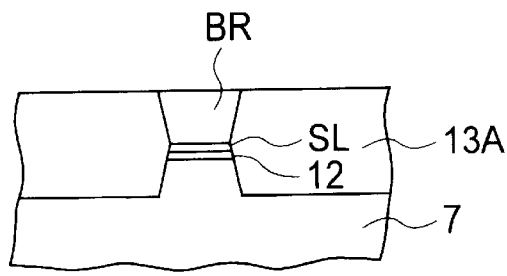

Next as shown in FIG. 39D, a resin was buried in the tapered recess 13T. More specifically, a low-viscosity smoothing resin BR was coated to the thickness of about 1.3 μm to bury the recess 13T. Thereafter, etching by IBE was conducted until the opening of the tapered recess 13T was exposed. The etching method used here is not limited to IBE, but any other method capable of etching the resin BR may be used.

Figure 39E:
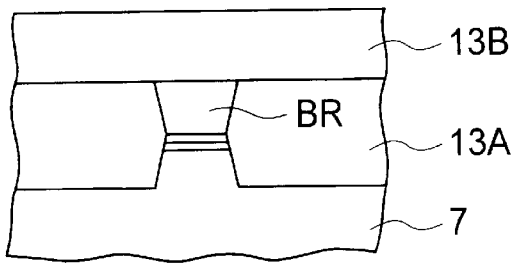

Next as shown in FIG. 39E, $Al_2O_3$ is stacked to the thickness of 0.6 μm as the non-magnetic material layer 13B by sputtering.

Figure 39F:
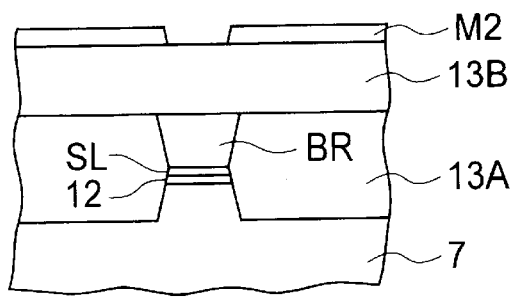

Next as shown in FIG. 39F, a resist for the purpose of making a pattern was coated to the thickness of about 1.0 μm on the non-magnetic material layer 13B, and using a positioning mark for the projection 11 as the reference, the resist was exposed and developed. After that, it was baked at 140° C. to make the mask M2 having a resist pattern with the taper angle of 60 degrees and the opening width of 0.4 μm.

Figure 39G:
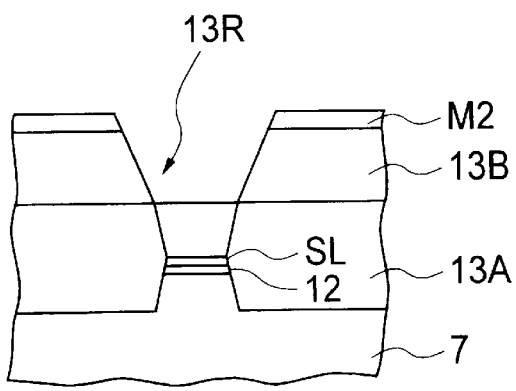

Next as shown in FIG. 39G, using IBE from above the mask M2, etching is carried out to make a gently tapered opening 13H in the non-magnetic material layer 13B. In this Example, by conducting IBE for 50 minutes, fixing the beam incident angle at 30 degrees and beam acceleration voltage at 500 V, there was obtained the opening 13R in which the tapered angle of the non-magnetic material layer 13B was 45 degrees and the opening width was 1.7 μm.

Figure 39H:
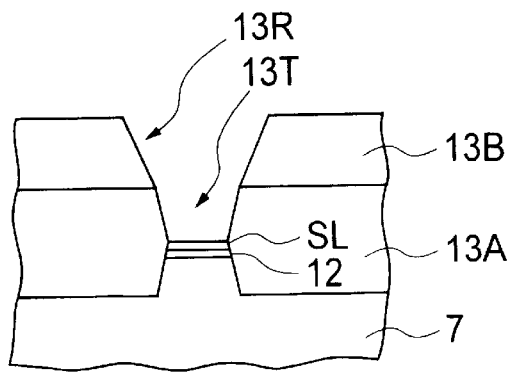

Finally, as shown in FIG. 39H, by removing the remainder resist mask M2, there was obtained the two-step recessed trench for the purpose of making the upper write pole, which includes the tapered recess 13T having the 0.5 μm wide bottom and the taper angle of 70 degrees, and the gently sloped recess 13R having the taper angle of 45 degrees.

EXAMPLE 8

Next explained is another example of the ninth embodiment already explained, with reference to FIGS. 28A through 29C.

Using $Al_2O_3$ as the non-magnetic material layer 13A and $SiO_2$ as the non-magnetic material layer 13B, the steps shown in FIGS. 28A through 28C were carried out essentially in the same process flow as Example 7 already explained.

Using the sample prepared in this manner, a resist pattern, not shown, is made by patterning using the projection 11 as a mark, and Ni—Fe to be used as a mask is made thereon to the thickness of 0.1 μm. After that, by lift-off for removing the resist, the mask M2 having the 0.2 μm wide opening O was made as shown in FIG. 29A.

Next as shown in FIG. 29B, isotropic etching was carried out. In this Example, wet etching by a fluoric-based solution and isotropic etching by CDE used in Example 5 were employed for this the etching process.

In any of these etching methods, the buried resin BR certainly functioned as the etching stopper, and it was confirmed that the etched configuration 13R turned out as a curved recess. However, the horizontal extension of the recess 13R was wider by 0.2 μm in case of wet etching than CDE.

Next as shown in FIG. 29C, by removing the Ni—Fe film as the mask M2 by acid-based wet etching or dry etching and removing the buried resin BR by using an organic solvent, the two-step trench including the curved recess 13R and the tapered recess 13T was obtained.

EXAMPLE 9

Next explained is an example of the tenth embodiment already explained, with reference to FIGS. 30A through 30D.

First as shown in FIG. 30A, the trench in self alignment with the projection 11 of the lower write pole 7 is made in the same manner as any of the foregoing Examples.

Then, after coating a resist A corresponding to the foot of the umbrella-shaped mask M3 shown in FIG. 30B, a resist B corresponding to the roof of the umbrella-shaped mask M3 is coated. In this Example, the resist A was coated 0.7 μm thick, and the resist B was coated 0.8 μm thick.

After that, the resist B corresponding to the roof of the umbrella-shaped mask M3 is patterned by exposure process, and the resist A is developed by using the resist B as the mask.

At that time, materials of the resist A, resist B and their developing solutions are preferably combined so that the resist B does not dissolve so much with the developing solution of the resist A. By two times of development in this manner, the umbrella-shaped mask M3 having the roof width of 2.5 μm and the foot width of 0.5 μm is obtained as shown in FIG. 30B.

Next as shown in FIG. 30C, the non-magnetic material layer 13 was stacked. In this Example, 0.6 μm thick $Al_2O_3$ was stacked as the non-magnetic material layer 13 by sputtering under the pressure of 1 mTorr in degree of vacuum. The curved recess 13R made in this manner was confirmed to have a slope slanted by 20 through 40 degrees. Then, by finally removing the umbrella-shaped mask M3 by oxygen ashing or by using an organic solution, the trench having very good curved recess 13R and tapered recess 13T was obtained.

EXAMPLE 10

Next explained is an example of the twelfth embodiment already explained, with reference to FIGS. 32A through 32C.

First as shown in FIG. 32A, in the same manner as any of the foregoing Examples, the trench having the curved recess 13R and the tapered recess 13T is made, and the upper write pole 15 having a converged configuration is formed by frame plating, sputtering or CVD, for example. In this Example, $Ni_{50}Fe_{50}$ (at %) was stacked to the thickness of 3.5 μm by frame plating. In general, however, it is very difficult to precisely make the frame inside the curved recess, and it may invites an increase of the manufacturing cost. Taking it into consideration, this Example made the frame at a location offset outward from the curved recess 13R by about 0.5 μm. Therefore, the upper write pole 15 includes flat portions 15F.

Next as shown in FIG. 32B, the flat portions 15F are removed by etching. In this Example, etching by IBE was carried out for 40 minutes, fixing the incident angle at 10 degrees, to make the entirety including the flat portions withdraw. The etching amount is 0.5 μm in thickness of Ni50Fe50 (at %). Wet etching or sputtering, for example, is also usable here.

In this manner, the magnetic pole having the upper write pole 15 made inside the curved recess 13R was obtained as shown in FIG. 32C.

EXAMPLE 11

Next explained is another example of the twelfth embodiment already explained, with reference to FIGS. 33A through 35C.

In the self-aligned trench having the curved recess 13R and the tapered recess 13T prepared by any of the foregoing Examples, a resist frame for regulating the upper write pole 15 is made as shown in FIG. 33A.

Next as shown in FIG. 33B, $Ni_{50}Fe_{50}$ (at %) was stacked inside the tapered recess 13T of the lower write pole by plating, and $Ni_{80}Fe_{20}$ (at %) was next stacked inside the curved recess 13R up to the thickness of about μm.

Next as shown in FIG. 33C, the upper write pole 15 was made by removing the frame resist F.

FIGS. 34A is a cross-sectional view taken along the A—A line of FIG. 33C. If the structure is finished as the magnetic head under the status shown in FIG. 34A, the top end 15E of the upper write pole (also called upper magnetic yoke) will come too close to a medium running surface, and undesirable writing from this portion onto the medium is worried about during magnetic recording.

To solve this problem this Example employed the following two countermeasures.

The first one, as shown in FIG. 34B, makes a resist frame M, about 3 μm thick, was formed on a part of the upper write pole 15 closer to the coil, which was made in the step shown in FIG. 33C, and the portion corresponding to the medium running plane is removed by ion milling by the depth of about 1 μm. Thereby, this Example made it distant by about 0.5 μm from the medium running plane. (This amount of removal is also called "recess amount".)

The second one is explained with reference to FIGS. 35A through 35C. First as shown in FIG. 35A, an upper write pole 15A is formed inside the tapered recess 13T. Its cross-sectional configuration is as shown in FIG. 35B.

Thereafter, the resist frame M for the purpose of making the upper write pole 15B is formed in the position to be recessed, and the upper write pole 15B is made by plating, for example.

Next explained is a magnetic recording apparatus having the magnetic head according to the invention.

Any of the magnetic head made by the method according to any of the above-explained embodiments is incorporated in a magnetic recording and/or reproducing apparatus.

Figure 40:
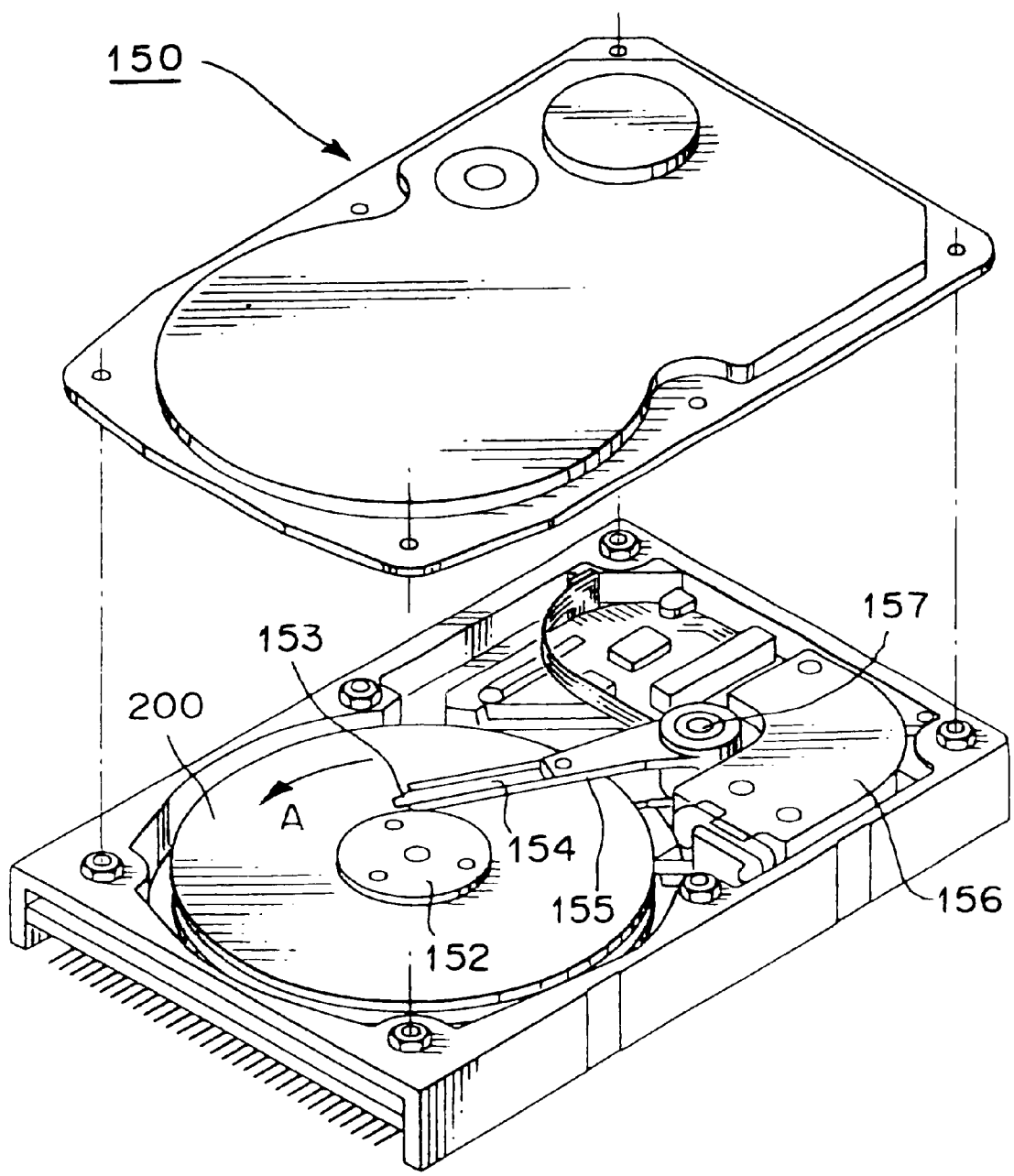
FIG. 40 is a fragmentary perspective view showing an outline structure of a magnetic recording apparatus.

FIG. 40 is a fragmentary perspective view showing an outline structure of a magnetic recording apparatus of this type. The magnetic recording apparatus 150 according to the invention is an apparatus of a type using a rotary actuator. In FIG. 40, a magnetic disc 200 is set on a spindle 152 and rotated by a motor, not shown, which is responsive to a control signal from a drive apparatus controller, not shown. A head slider 153 is attached to one end of a thin-film shaped suspension 154, which is held in a floating status from the magnetic disc 200. The head slider 153 includes a magnetic head according to any of the foregoing embodiments as a part of its element for recording or reproducing information.

When the magnetic disc 200 rotates, a surface (air bearing surface) of the head slider 153 opposed to the medium is held above the surface of the magnetic disc 200 by a predetermined floating amount.

The suspension 154 is connected to one end of an actuator arm 155 having a bobbin portion for holding a driving coil, not shown. Mounted at the other end of the actuator arm 155 is a voice coil motor 156 which is a kind of linear motor. The voice coil motor 156 is made up of a driving coil, not shown, wound up on the bobbin of the actuator arm 155, and a magnetic circuit made of a permanent magnet and opposed yokes which are positioned to sandwich the coil from opposite directions.

The actuator arm 155 is held by ball bearings, not shown, which are provided at upper and lower two positions of a fixed shaft 157 to be rotated or slidably moved by the voice coil motor 156.

Figure 41:
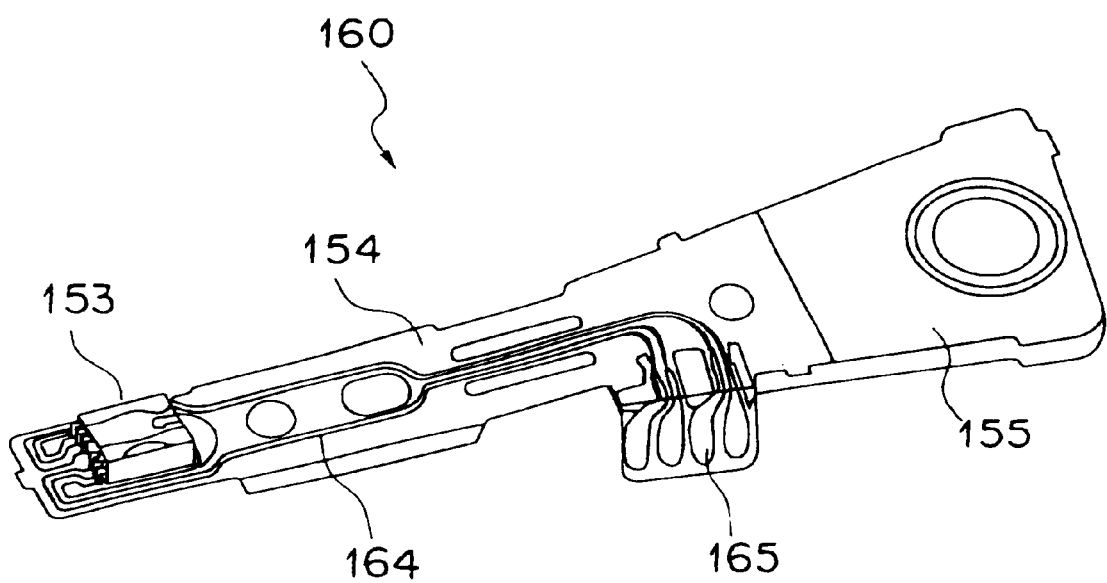
FIG. 41 is a fragmentary perspective view showing an outline structure of the magnetic head assembly 160 from its medium-facing side.

FIG. 41 is a fragmentary perspective view showing an outline structure of the magnetic head assembly 160 from its medium-facing side. An electrical wiring 164 is made to connect the magnetic head mounted on the slider 153 with an external circuit through the electrode pads 165.

According to the invention, by using any of the magnetic head according to the foregoing embodiments and Examples, high-density recording without side-writing of cross-erasing can be realized. These effects enable to make narrower tracks and decrease the height of elements, and contributes to realization of a magnetic recording apparatus available for high-density magnetic recording.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The entire disclosure of Japanese Patent Application No.H11-087089 filed on Mar. 29, 1999 including specification, claims, drawings and summary is incorporated herein by reference in its entirety.

What is claimed is:

1. A method for manufacturing a magnetic head which includes a lower write pole having a projection, an upper write pole having a projection opposed to the projection of the lower write pole, and a magnetic gap interposed between the projection of the upper write pole and the projection of the upper write pole, comprising the steps of:

forming the magnetic gap on the projection of the lower write pole;

forming a non-magnetic material layer on the lower write pole, the non-magnetic material layer having a projection on its top surface in positional alignment with the projection of the lower write pole;

forming a mask layer on the non-magnetic material layer, the mask layer having an opening in which the top surface of the projection of the non-magnetic material layer is exposed;

forming a first recess in the non-magnetic material layer by isotropically etching the non-magnetic material layer through the opening of the mask layer;

forming a second recess down from the bottom of the first recess by anisotropically etching the non-magnetic material layer through the opening of the mask layer; and forming the projection of the upper write pole by burying a magnetic material in the second recess and the first recess.

2. The method for manufacturing a magnetic head according to claim 1, further comprising a step of forming a conductive seed layer on the magnetic gap layer, wherein the step of forming the projection of the upper write pole includes a step of burying the magnetic material by plating using the seed layer as a plating electrode.

3. The method for manufacturing a magnetic head according to claim 1, wherein the step of forming a mask layer includes a step of smoothing the surfaces of the mask layer and the non-magnetic material layer after forming the material of the mask layer on the non-magnetic material layer.

4. The method for manufacturing a magnetic head according to claim 1, wherein the step of forming the projection of the upper write pole includes a step of making a frame in the second recess before burying the magnetic material or a step of etching and trimming edge portions of the magnetic material already buried.

5. The method for manufacturing a magnetic head according to claim 3, wherein the step of forming the non-magnetic material layer includes a step of making on the lower write pole a first non-magnetic material layer having a projection extending from its top surface in positional alignment with the projection of the lower write pole, a step of making on the first non-magnetic material layer an intermediate layer having a projection extending from its top surface in positional alignment with the projection of the first non-magnetic material layer, and a step of making on the intermediate layer a second non-magnetic material layer having a projection extending from its top surface in positional alignment with the projection of the intermediate layer;

the step of forming the first recess includes a step of making a first recess by isotropically etching the second non-magnetic material layer through the opening of the mask layer to the depth reaching the intermediate layer; and the step of forming the second recess includes a step of making an approximately tapered recess down from the bottom of the first recess by anisotropically etching the intermediate layer and the first non-magnetic material layer through the opening of the mask layer.

6. The method for manufacturing a magnetic head according to claim 5, further comprising a step of making a conductive seed layer on the magnetic gap layer, wherein the step of forming the projection of the upper write pole includes a step of burying the magnetic material by plating using the seed layer as a plating electrode.

7. The method for manufacturing a magnetic head according to claim 5, wherein the etch rate of the intermediate layer against the etching in the step of forming the first recess is lower than the etch rate of the second non-magnetic material layer so that the intermediate layer functions as an etching stopper during the etching.

8. The method for manufacturing a magnetic head according to claim 5, wherein the intermediate layer is made of a material different in composition from the first non-magnetic material layer and the second non-magnetic material layer, and functions as an etching monitor for detecting the end point of etching during the etching.

9. The method for manufacturing a magnetic head according to claim 5, the step of forming the projection includes a step of making a frame before burying the magnetic material or a step of burying the magnetic material and thereafter etching and trimming edge portions of the magnetic material.

10. The method for manufacturing a magnetic head according to claim 1, wherein the step of forming the non-magnetic material layer includes a step of making on the lower write pole a first non-magnetic material layer having a projection extending from its top surface in positional alignment with the projection of the lower write pole, and a step of making on first non-magnetic material layer a second non-magnetic material layer having a projection extending from its top surface in positional alignment with the projection of the first non-magnetic material layer;

the step of forming a first recess includes a step of making a first recess by isotropically etching the second non-magnetic material layer through the opening of the mask layer; and the step of forming a second recess includes a step of making the second recess down from the bottom of the first recess by anisotropically etching the first non-magnetic material layer through the opening of the mask layer.

11. The method for manufacturing a magnetic head according to claim 10, wherein the step of forming the magnetic gap includes a step of making a conductive seed layer on the magnetic gap layer, and the step of forming the projection includes a step of burying the magnetic material by plating using the seed layer as a plating electrode.

12. The method for manufacturing a magnetic head according to claim 10, wherein the etch rate of the second non-magnetic material layer against the etching in the step of forming a first recess is higher than the etch rate of the first non-magnetic material layer.

13. The method for manufacturing a magnetic head according to claim 10, wherein the etch rate of the first non-magnetic material layer against the etching in the step of forming a second recess is higher than the etch rate of the second non-magnetic material layer.

* * * * *